US009798955B2

(12) United States Patent
Bao et al.

(10) Patent No.: US 9,798,955 B2
(45) Date of Patent: Oct. 24, 2017

(54) IMAGE PROCESSING APPARATUS, PHOTOGRAPHIC SUBJECT IDENTIFYING METHOD AND PROGRAM

(71) Applicant: NEC Corporation, Minato-ku, Tokyo (JP)

(72) Inventors: Ruihan Bao, Tokyo (JP); Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/100,694

(22) PCT Filed: Dec. 25, 2014

(86) PCT No.: PCT/JP2014/084254
§ 371 (c)(1),
(2) Date: Jun. 1, 2016

(87) PCT Pub. No.: WO2015/099016
PCT Pub. Date: Jul. 2, 2015

(65) Prior Publication Data
US 2016/0300122 A1 Oct. 13, 2016

(30) Foreign Application Priority Data
Dec. 26, 2013 (JP) .................. 2013-268852

(51) Int. Cl.
*G06K 9/50* (2006.01)
*G06K 9/62* (2006.01)
*G06K 9/46* (2006.01)

(52) U.S. Cl.
CPC .......... *G06K 9/6211* (2013.01); *G06K 9/4609* (2013.01); *G06K 2009/6213* (2013.01)

(58) Field of Classification Search
CPC ............ G06K 9/6211; G06K 9/00281; G06K 2009/4666; G06K 2009/6213; G06K 9/4609; G06K 9/6272
(Continued)

(56) References Cited

U.S. PATENT DOCUMENTS 6,711,293 B1 3/2004 Lowe
2010/0296736 A1 11/2010 Shiiyama et al.
(Continued)

FOREIGN PATENT DOCUMENTS

JP 2004-341940 A 12/2004
JP 2009-163682 A 7/2009
(Continued)

OTHER PUBLICATIONS

International Search Report for PCT Application No. PCT/JP2014/084254, mailed on Mar. 3, 2015.
(Continued)

*Primary Examiner* — Daniel Mariam

(57) ABSTRACT

Image processing apparatus includes a local amount generation unit, a correspondence point calculation unit, a relative correspondence point information calculation unit, a correspondence point selecting unit and a decision unit. The local feature value generation unit calculates, for a first image, a set of information about first local feature values including a first feature point(s). The correspondence point calculation unit calculates, for a second image, as information about correspondence point(s), a correspondence relation between the first and second feature point(s) contained in a set of information about second local feature values calculated from the second image. The relative correspondence point information calculation unit calculates relationships of scales of feature points, as the information about the relative scale sizes of correspondence points, based on the set of information about the first local feature values and the
(Continued)

set of information about the second local feature values on the information about correspondence point(s).

10 Claims, 64 Drawing Sheets

(58) Field of Classification Search
USPC .......................................... 382/201, 218, 225
See application file for complete search history.

(56) References Cited

U.S. PATENT DOCUMENTS

| | | |
|---|---|---|
| 2012/0183228 A1 | 7/2012 | Huggett |
| 2012/0269392 A1 | 10/2012 | Saruta et al. |
| 2014/0254940 A1* | 9/2014 | Shiiyama ............ G06K 9/4671 382/201 |

FOREIGN PATENT DOCUMENTS

| | | |
|---|---|---|
| JP | 2011-113197 A | 6/2011 |
| JP | 2012-230501 A | 11/2012 |

OTHER PUBLICATIONS

Written opinion for PCT Application No. PCT/JP2014/084254.
Extended European Search Report for EP Application No. EP14874117.6 dated Jul. 20, 2017.

* cited by examiner

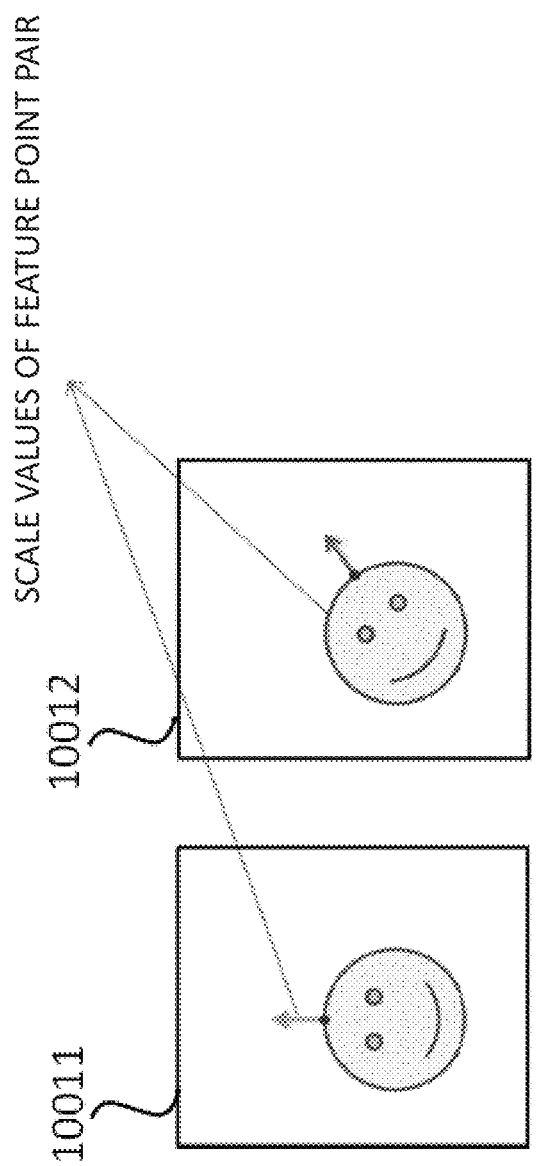

IMAGE PROCESSING APPARATUS, PHOTOGRAPHIC SUBJECT IDENTIFYING METHOD AND PROGRAM

DESCRIPTION OF RELATED APPLICATION

The present application is a National Stage Entry of PCT/JP2014/084254 filed Dec. 25, 2014, which is based on and This application claims is based upon and claims the benefit of the priority of Japanese Patent Application No. 2013-268852, filed Dec. 26, 2013, the disclosure disclosures of all of which is are incorporated herein in its their entirety by reference thereto. This invention relates to an image processing apparatus, a photographic subject identifying method and a program.

TECHNICAL FIELD

Background

With a view to robustly identifying a photographic subject in an image, such as a commodity, a building or a printed mater, against changes in a shooting size or angle, or occlusion, there has been proposed a system of extracting a characteristic point in the image, referred to below as a feature point, and extracting a feature value or amount in a local region around each feature point, referred to below as a local feature value or amount. As typical of such system, an apparatus that uses a SIFT (Scale Invariant Feature Transform) feature or feature value to identify a photographic subject has been disclosed in Patent Literature 1. Such a technique that forms an index of an image being retrieved, using a feature value, and calculates a degree of image similarity based on the so prepared index, has been disclosed in Patent Literature 2.

Patent Literature 1: U.S. Pat. No. 6,711,293
Patent Literature 2: JP Patent Kokai Publication No. JP2004-341940A

SUMMARY

The disclosures of the above technical literatures are incorporated herein by reference. The following analysis is made from the perspective of the present invention.

In the technique shown in Patent Literature 1, a photographic subject which is the same or similar between different images is identified on the basis of a distance between each local feature value of a set of first local feature values and each local feature value of a set of second local feature values. Thus, if, in the technique disclosed in Patent Literature 1, an error is caused in matching between the feature points under the influence of a noise or the like, identifying precision becomes lower the severer the error caused in correlation or matching. This applies for the case of Patent Literature 2 as well, that is, the severer the error caused in the feature point matching, the lower is the precision in the degree of similarity calculated.

There is a need in the art to contribute to suppression of deterioration of subject identifying precision even in case there is an error caused in matching the feature points.

In a first aspect of the present invention, there is provided an image processing apparatus having the following functions. The image processing apparatus includes a first local feature value generation unit that detects one or more of first feature points from a first image, and calculates, from a region of a preset range encompassing each first feature point detected, a set of information about the first local feature values corresponding to each first feature point.

The image processing apparatus also includes a correspondence point calculation unit that calculates, as information about correspondence point(s), a correspondence relation between the first feature point(s) and a second feature point(s) contained in a set of information about second local feature values calculated from a second image.

The image processing apparatus also includes a relative correspondence point scale size calculation unit that calculates, as information about relative scale sizes of correspondence points, a relationship between a scale(s) of the first feature point(s) and a scale(s) of the second feature point(s), based on the set of the first local feature value information, the set of the information about the second local feature values, and the information about correspondence points.

The image processing apparatus also includes a correspondence point selecting unit that, based on the information about the relative scale size of the correspondence points, performs clustering on at least one out of the first feature point(s) and the second feature point, and selects at least one feature point based on an outcome of the clustering.

Moreover, the image processing apparatus includes a decision unit that, based on the feature point(s) selected by the correspondence point selecting unit, compares the first image and the second image to each other, from cluster to cluster, and decides on possible photographic subject identity.

In a second aspect of the present invention, there is provided a photographic subject identifying method, comprising detecting one or more of first feature points from a first image, calculating, from a region of a preset extent encompassing each first feature point detected, a set of information about first local feature values corresponding to each first feature point, calculating, as information about correspondence points, a correspondence relation between the first feature point(s) and a second feature point(s) contained in a set of information about second local feature values calculated from a second image, and calculating, as information about the relative scale size of the correspondence points, a relationship between a scale of the first feature point(s) and a scale of the second feature point(s), based on the set of information about first local feature value, the set of information about second local feature values and the information about correspondence points.

The method also includes performing clustering on at least one out of the first feature point(s) and the second feature point(s), based on the information about the relative scale sizes of the correspondence points, and selecting at least one feature point based on an outcome of the clustering, and comparing the first image and the second image with each other, based on the feature point(s) selected, from cluster to cluster, and deciding on possible photographic subject identity.

It should be noted that the present method is bound up with a particular machine which is an image processing apparatus that decides on identity of a photographic subject within a first image with another photographic subject within a second image.

In a third aspect of the present invention, there is provided a non-transitory computer readable storage medium storing a program that causes a computer controlling an image processing apparatus to perform the processing of detecting one or more of first feature points from a first image to calculate, from a region of a preset extent encompassing each first feature point detected, a set of information about first local feature values, corresponding to each first feature point detected, calculating, as information about correspondence points, a correspondence relation between the first feature point(s) and a second feature point(s) contained in a set of information about second local feature value calculated from a second image, and calculating, as information about the relative scale size of correspondence points, a relationship between a scale of the first feature point(s) and a scale of the second feature point(s), based on the set of the information about the first local feature values, the set of the information about the second local feature values and the information about correspondence points.

The program also causes the computer to perform the processing of performing clustering on at least one out of the first feature point(s) and the second feature point(s), based on the information about the relative scale size of the correspondence points, and selecting at least one feature point based on an outcome of the clustering, and comparing the first image and the second image with each other, based on the feature point(s) selected, from cluster to cluster, and deciding on possible photographic subject identity.

It should be noted that the present program can be recorded on a computer-readable storage medium which may be a non-transitory memory such as optical storage medium. The present invention may be implemented as a computer program product.

In the above aspects of the present invention, there is provided an image processing apparatus, a photographic subject identifying method or a program in which it is possible to contribute to suppression of deterioration of subject identifying precision even in case there is an error caused in matching the feature points.

BRIEF DESCRIPTION OF THE DRAWINGS

FIG. 64 is a schematic view showing example orientations of feature points.

PREFERRED MODES

Figure 1:
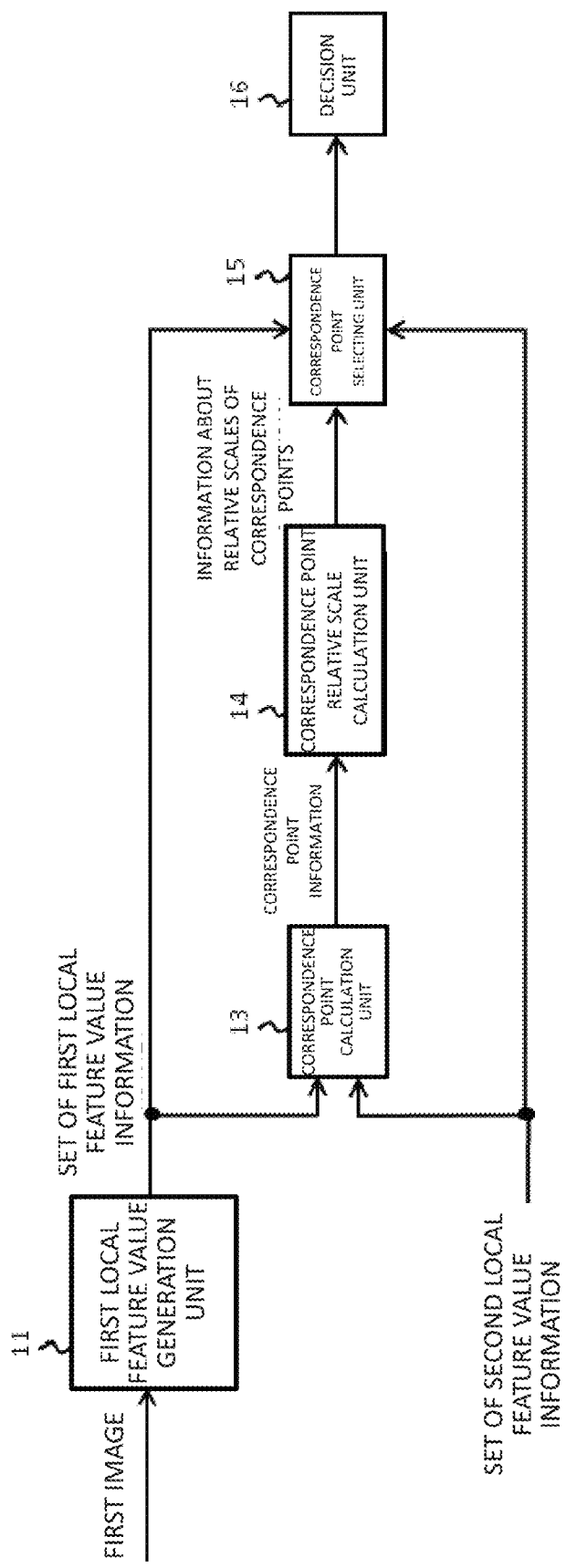
FIG. 1 is a block diagram showing a configuration of a conventional image processing apparatus.

In the present disclosure, there are various possible modes, which include the following, but not restricted thereto. First, an outline of an exemplary embodiment of the present invention will be described with reference to the drawings. In the following outline, various components are denoted by reference characters for the sake of convenience.

Initially, a preferred mode will be clarified as a summary in reference to FIG. 1. It should be noted that symbols used in the drawings are entered in the present summary merely as examples to assist in understanding and are not intended to restrict the scope of the present invention.

As discussed above, an image processing apparatus is desired in which it is contribute to suppression of deterioration of subject identifying precision even in case there is an error caused in matching the feature points.

An image processing apparatus 10, shown in FIG. 1, is thus presented as an example. The image processing apparatus 10 includes a first local feature value generation unit 11, a correspondence point calculation unit 13, a relative correspondence point scale size calculation unit 14, a correspondence point selecting unit 15 and a decision unit 16.

The first local feature value generation unit 11 detects one or more first feature point from a first image. Also, the first local feature value generation unit 11 calculates a set of first local feature value information, corresponding to each such first feature point, from a region of a preset extent or range encompassing each first feature point detected.

The correspondence point calculation unit 13 calculates, as information about correspondence points, a correspondence relation between the first feature point(s) and a second feature point contained in a set of second local feature value information as calculated from a second image. By the information about correspondence points is herein meant the information indicating to which feature point in the second image an optional feature point of the first image is matched.

The relative correspondence point scale size calculation unit 14 calculates, as information about relative scale size of the correspondence points, a relationship between a scale of the first feature point and a scale of the second feature point, based on the set of the first local feature value information, the set of the second feature value information and the information about correspondence points.

The correspondence point selecting unit 15 performs clustering on at least one out of the first feature point(s) and the second feature point, based on information about the relative scale size of the correspondence points, and selects at least one feature point based on an outcome of the clustering. The correspondence point selecting unit 15 thus selects the feature points, grouped to a cluster satisfying a preset condition, by clustering, based on scale relationships of the feature points. Thus, even if the correspondence point calculation unit 13 has found a mistaken or erroneous correspondence relation, it is possible for the correspondence point selecting unit 15 to exclude the feature point(s) exhibiting the mistaken correspondence relation.

The decision unit 16 compares the first and second images with each other, from cluster to cluster, based on the feature points as selected by the correspondence point selecting unit 15.

Thus, with the image processing apparatus 10, in which the feature points exhibiting the mistaken correspondence relationship can be eliminated, it is possible to prevent a photographic subject from being erroneously identified based on the non-correct feature points. Consequently, the image processing apparatus 10 contributes to suppression of deterioration of subject identifying precision even in case there is an error caused in matching the feature points.

Exemplary Embodiment 1

Figure 2:
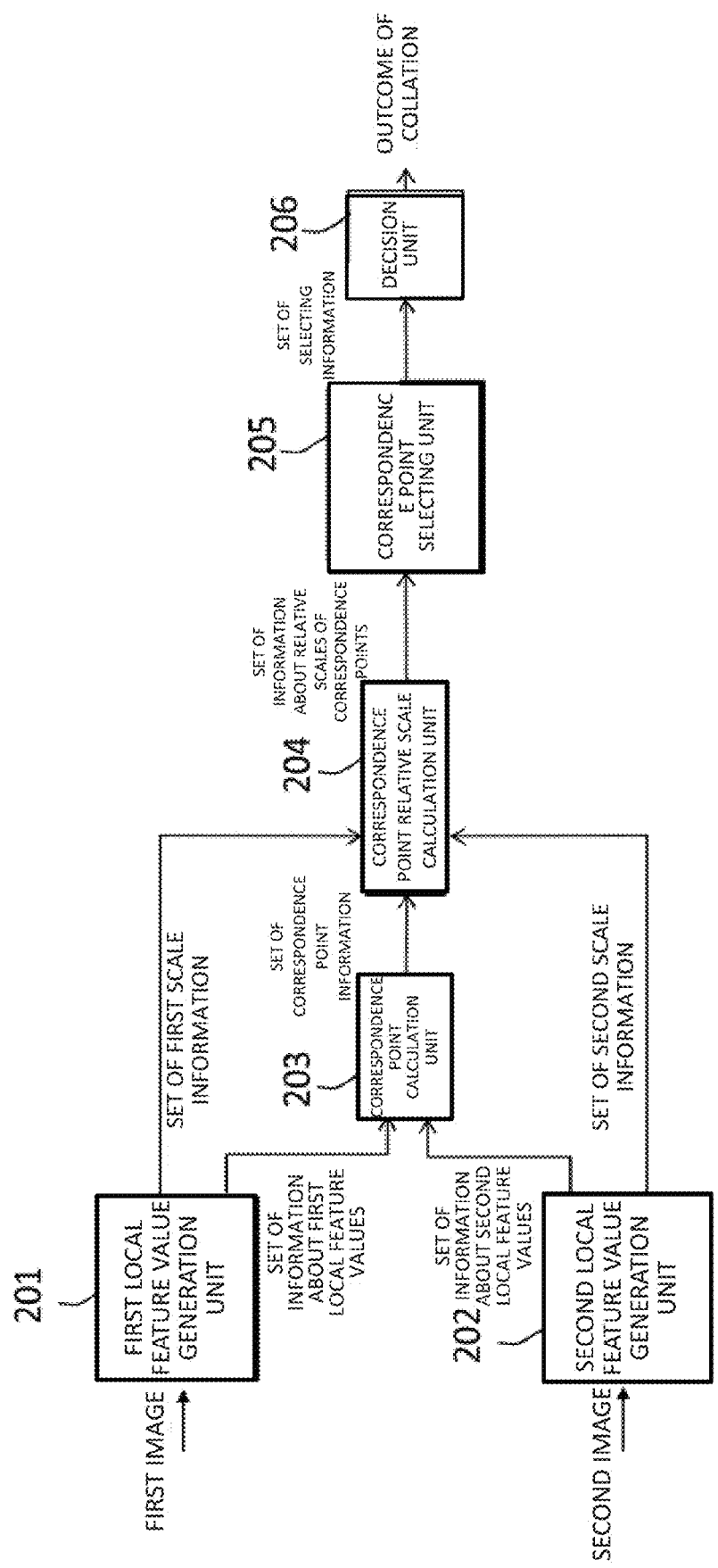
FIG. 2 is a block diagram showing a configuration of an exemplary embodiment 1.

An exemplary embodiment 1 will now be described in detail with reference to the drawings.
(Configuration of Exemplary Embodiment 1)
Referring to FIG. 2, the exemplary embodiment 1 will be described. FIG. 2 depicts a block diagram showing a functional configuration of an image processing apparatus 20 of the present exemplary embodiment 1. As shown in FIG. 2, the image processing apparatus 20 includes a first local feature value generation unit 201, a second local feature value generation unit 202, a correspondence point calculation unit 203, a relative correspondence point scale size calculation unit 204, a correspondence point selecting unit 205 and a decision unit 206. Incidentally, it is not intended to limit the image processing apparatus 20 to the configuration shown in FIG. 2. In the following explanation, it is assumed that the first image includes one or more of the same or similar photographic subjects and the second image a sole photographic subject, only by way of illustration, for it is not intended to limit the first and second images to the configuration illustrated.

(Generation of Feature Value)

The first local feature value generation unit 201 detects feature points, wherein the number of the feature points satisfies a preset condition, from the first image, and generates a local feature value for an ambient or neighboring region of each detected feature point including the feature point itself. For example, the preset condition may state that the number of the feature points is to surpass a preset threshold.

Specifically, the first local feature value generation unit 201 outputs a set of first scale information, made up of scale sizes of respective feature points detected, to the relative correspondence point scale size calculation unit 204. The first local feature value generation unit 201 generates a local feature value from the coordinate values of each feature point detected, and outputs a set of first local feature values, made up of the local feature values generated, to the correspondence point calculation unit 203.

The scale size of the feature value is e.g., the information about the size or magnitude, ancillary to each feature point, and is calculated from an ambient image region of each feature point inclusive of the feature point itself. Preferably, the scale size of the feature point is varied with an increasing or decreasing size of the ambient region inclusive of the feature point. Such variation of the scale size, attendant to the increasing or decreasing size of the ambient region may e.g., be linear, logarithmic or exponential.

The second local feature value generation unit 202 operates similarly to the first local feature value generation unit 201 to generate a set of second local feature values, made up of local feature values of respective feature points of the second image, and a set of second scale information, made up of scale sizes of the respective feature points of the second image. The second local feature value generation unit 202 outputs the set of the second local feature values to the correspondence point calculation unit 203. The second local feature value generation unit 202 also outputs the set of the second scale information to the relative correspondence point scale size calculation unit 204. In a total of exemplary embodiments, herein disclosed, the local feature values of respective feature points of the second image may be generated at the outset and stored in e.g., a database. That is, the set of local feature values, thus prepared at the outset and stored in the database instead of being stored in the second local feature value generation unit 202 may be used.

(Calculation of Correspondence Points)

The correspondence point calculation unit 203 generates a number satisfying a preset condition of correspondence points, using the set of first local feature values that the first local feature value generation unit 201 has output, and the set of the second local feature values that the second local feature value generation unit 202 has output. The preset condition may state that the number of the information about correspondence points is to surpass a preset threshold.

Specifically, the correspondence point calculation unit 203 calculates a distance between an optional feature point of the first image and an optional feature point of the second image as a distance between the local feature values. The correspondence point calculation unit 203 calculates a number satisfying a preset condition of relations of matching between the set of the first local feature values and the set of the second local feature values, based on the distances between the local feature values calculated.

As the distance between the feature points, a Euclidean distance, for example may be used. The feature points having the smallest distance values may be calculated as being the matching feature points. There may be feature points not exhibiting the correspondence relation. The possible presence of the correspondence relationship may be decided using a ratio between the smallest distance value and the second smallest distance value as a measure for evaluation. The technique of feature point detection is desirably decided as appropriate such that the technique shown above is merely illustrative and is not intended for limitation.

The correspondence point calculation unit 203 outputs a set of information about correspondence points, made up by the relations of matching calculated, to the relative correspondence point scale size calculation unit 204.

(Calculation of Relative Scale Size of Correspondences Points)

The relative correspondence point scale size calculation unit 204 calculates a number exceeding a preset condition of relationships of scale sizes of feature points, correlated between the images, referred to below as correspondence points, using the set of the information about correspondence points that the correspondence point calculation unit 203 has output, a set of the first scale information that the first local feature value generation unit 201 has output, and a set of the second scale information that the second local feature value generation unit 202 has output. The relative correspondence point scale size calculation unit 204 outputs a set of information about the relative scale size of the correspondence points, made up by the relationships calculated, to the correspondence point selecting unit 205.

Specifically, the relative scale size of the correspondence points may e.g., be a ratio of scale sizes of the correspondence points. For example, an equation 1

$$\sigma = s(q)/s(p) \qquad \text{[Equation 1]}$$

may be used to calculate the ratio of the scale sizes. In the above equation, $\sigma$ denotes a scale ratio of the correspondence points, $s(q)$ a scale size of a q'th feature point, as detected from the first image, and $s(p)$ a scale size of a p'th feature point, as detected from the second image. The logarithms of the scale sizes of the feature points, for example, may be used to calculate the scale ratio.

In case the scale size, having the property of a logarithmic function, is extracted from the feature points, the relative scale size of the correspondence points may e.g., be a difference of the scale sizes of the correspondence points. To calculate the difference of the scale sizes, an equation 2, for example, may be used:

$$\sigma' = s'(q) - s'(p) \qquad \text{[Equation 2]}$$

where $\sigma'$ denotes a difference value of the scale sizes of the correspondence points, $s'(q)$ a scale size of a q'th feature point, as detected from the first image, and $s'(p)$ a scale size of a p'th feature point, as detected from the second image.

Figure 62:
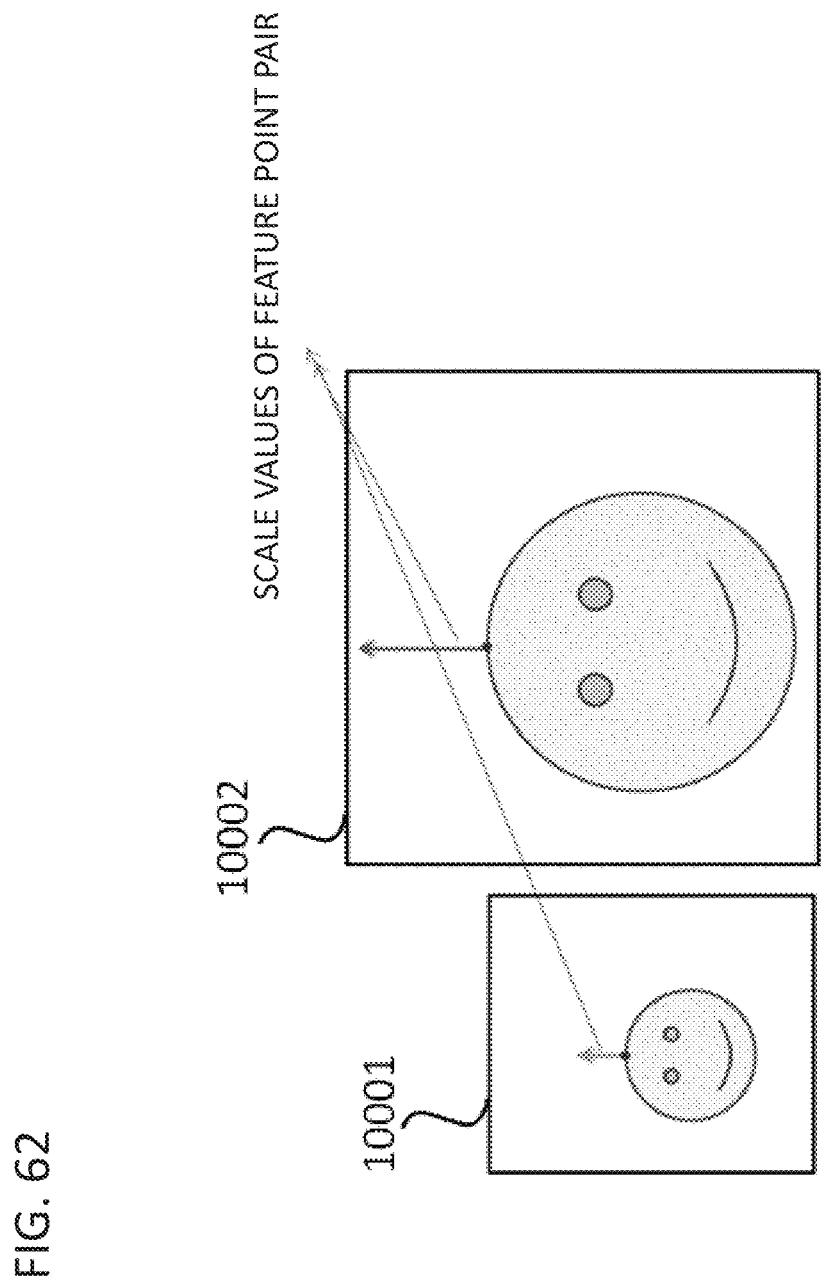
FIG. 62 is a schematic view showing an example scale size of a feature point.

Referring to FIG. 62, a characteristic of the scale size of the feature point will be set out. FIG. 62 shows an example in which a photographic subject of an image 10001 captured is of a double size in an image 10002. The size of an arrow indicates the size of the scale size. The scale size of the feature point has a characteristic that it is varied in relation to the size of the photographic subject in the image. That is, as shown in FIG. 62, the scale size of the feature point has such characteristic that, if the size of the photographic subject in the image is doubled, the scale size of the feature point is doubled. Moreover, the scale size of the feature point has such characteristic that, if the photographic subject size in the image is halved, the scale vale is halved. Viz., the relative scale size of the correspondence point, calculated by the equations 1 and 2, has a characteristic that it becomes constant from one photographic subject to another in case of correct matching between the feature point of the first image and that of the second image.

(Selecting of Correspondence Points)

The correspondence point selecting unit 205 performs clustering on feature points, contained in the first image, using the set of the information about the relative scale size of the correspondence points that the relative correspondence point scale size calculation unit 204 has output. The correspondence point selecting unit 205 selects the feature points based on an outcome of the clustering. Specifically, the correspondence point selecting unit 205 may select the feature points contained in an optional cluster in case the number of the correspondence points contained in an optional cluster is not less than a preset threshold.

The correspondence point selecting unit 205 outputs a set of the selecting information, made up of the set of the information about the so selected matching feature points and the cluster information, to the decision unit 206.

The clustering on the feature points will now be described in detail.

For performing clustering on the feature points, such a method may be used in which a distance between a location of a relative scale size of an optional matching feature point that is contained in a first image and that has been correlated with a feature point in another image and a center of each cluster is calculated and the feature point in the first image is grouped to a cluster in which the distance calculated is smallest. If, in this case, such feature point having a measure of similarity of the relative scale size of the correspondence point less than a preset threshold is contained in an optional cluster, such feature point having the relative scale size of the correspondence points with a longer distance to the cluster center may be removed from the optional cluster and grouped to a different cluster. Incidentally, a Euclid distance, a Mahalanobis' distance or a street block distance may be used as the distance between the cluster center and the location of the relative scale size of the correspondence points.

In performing clustering on the feature points, such a method may be used in which the distances between the total of values are calculated and the distances so calculated are selected by clustering using a graph cut. In this case, such a graph is generated in which the feature points contained in the first image and correlated with another image are nodes and the distances between the feature points are edges between the nodes. For the graph cut, a normalized cut, a known technique, or a Markov cluster algorithm, may be used. As for details of the normalized cut or Markov cluster algorithm, the corresponding description is dispensed with.

In selecting the feature points by clustering, the k-means method, a known technique, an LBG (Linde-Buzo-Gray) method or an LBQ (Learning Bayesian Quantization) method may be used. As for details of the k-means method, the LBG method or the LBQ method, the corresponding description is dispensed with.

In selecting the feature points by clustering, such a method may be used in which, for each analysis region of an optional size, the number of feature points contained therein is counted and, if the count value is not less than a preset threshold, the feature points contained in the analysis region in question are grouped to the same cluster.

To generate the analysis region, such a method may be used in which the first image is split into grids, each of an optional size, each such grid then being used as the analysis region. The analysis region may or may not be overlapping with another analysis region. The size of the analysis region may be fixed or variable. If the size of the analysis region is variable, such a method may be used in which the nearer the center of the analysis region to the image center, the smaller is the size of the analysis region, or the larger the distance between the center of the analysis region and the image center, the greater is the size of the analysis region.

In selecting the feature points by clustering, such a method may be used in which the feature points contained in an analysis region, in which the count value is not less than a preset threshold, are grouped to the same cluster, or in which the feature points, contained in the analysis region and in an ambient analysis region, are grouped to the same cluster. Such a method may also be used in which, if a plurality of analysis regions, each with the count values not being less than a preset threshold, are neighbored or overlapping, the feature points contained in such analysis regions are grouped to the same cluster, or to different clusters.

By selecting the feature points by clustering, in this manner, the processing speed may be higher than in case the Markov cluster algorithm, k-means method or the LBS method is used.

(Decision)

The decision unit 206 decides on a photographic subject, which is the same or similar between different images, from one cluster to another, using the set of the selecting information that the correspondence point selecting unit 205 has output. For example, such decision may be made that, if the number of the feature points selected exceeds a given threshold, a cluster of interest is a photographic subject which is the same as or similar to the second image. The decision unit 206 outputs an outcome of the decision.

The processing of decision will now be detailed.

For example, the decision unit 206 may decide that, if the number of the feature points selected exceeds a certain (predetermined) threshold, a cluster of interest is the same as or similar to a photographic subject of the second image.

The decision unit 206 may also perform geometrical validation, using a correspondence relationship between feature points of different images, as found out, so as to decide on photographic subject identity or similarity. For example, it is possible to assume that the geometrical relationship among the coordinate values of correspondence points is homography, and estimate homography parameters using a robust estimation technique to find outliers of the input correspondence relationship with respect to the estimated parameters so as to give a decision of possible photographic subject identity or similarity based on the number of the outliers. There is no limitation to the robust estimation method used, such that RANSAC (RANdom Sample Consensus) or the least square method, for example, may be used.

The decision unit 206 may estimate changes in scales or rotation from coordinate values of two correspondence points forming a correspondence point pair, in which the two correspondence points belong to a cluster of interest. The decision unit 206 may then estimate changes in scales or rotation based on the relative scale size or the difference in the orientation information of the two correspondence points. The decision unit 206 may then compare the changes in the scales or rotation, calculated by the respective methods, with each other. If there is sufficient similarity between the so compared changes in scales or rotation, the cluster of interest may be decided to be the same as a second image. Specifically, two correspondence points, forming a correspondence point pair, are taken in a cluster of interest, and a line segment, having the two feature points, forming the correspondence point pair, belonging to a first image, as terminal points, is compared to a line segment having two feature points, belonging to the second image, respectively matched to the above mentioned two feature points, as terminal points. The decision unit 206 calculates changes in scales or rotation of the two line segments. The decision unit 206 compares the so calculated changes in the scales or rotation with changes in the scales or rotation calculated on the basis of the relative scale size or the difference between the orientation information of the correspondence points. In comparing the two line segments, either one or both of the changes in the scales and the rotation may be used. Two values of changes in the scales and rotation, calculated from the correspondence point pairs based on the difference values of the orientation information and the relative scale size of the correspondence points, are found. These two values may be independently used or either one of the two values may be used for comparing the line segments. Or a mean value of the two values may be used. It is possible to perform the photographic subject identity decision using two optional correspondence points of a correspondence point pair belonging to the cluster of interest. It is also possible to check for a set of an N-number (N>1) of correspondence point pairs in the cluster of interest and, in case there is a plurality of correspondence point pairs, decided to be the same as the second image, in excess of a certain (predetermined) proportion, decide that the cluster of interest is the same as the second image. Incidentally, N may be the total or a portion of the correspondence point pairs belonging to the cluster of interest.

The decision unit 206 may also estimate changes in scales or rotation from coordinate values of two or more correspondence point pairs, in which the correspondence point pairs belong to a cluster of interest. The decision unit 206 may then estimate changes in scales or rotation based on the relative scale size or the difference in the orientation information of the correspondence points. The decision unit 206 may then compare the changes in the scales or rotation, calculated by the respective methods, to each other. If there is sufficient similarity between the so compared changes in scales or rotation, the cluster of interest may be decided to be the same as a second image. Specifically, an N-number of correspondence point pairs are taken in a cluster of interest, and an N-number of line segments, each having the two feature points, forming the correspondence point pair, belonging to a first image 1, as terminal points, are respectively compared with an N-number of line segments, each having two feature points, belonging to the second image, and matched to the above mentioned two feature points, as terminal points. The decision unit 206 calculates changes in scales or rotation of the two line segments in the two images. The decision unit 206 compares the so calculated changes in the scales or rotation with changes in the scales or rotation calculated on the basis of the relative scale size or the difference between the orientation information of the correspondence points. In comparing the two line segments, either one or both of the changes in the scales and the rotation may be used. In calculating the changes in the scales or rotation from the N correspondence point pairs, it is possible to use a mean or median value of N relative scale sizes of the correspondence points or the N difference values of the orientation information, or a value calculated from an arbitrary correspondence point pair. In estimating the changes in the scales or rotation based on the relative scale size or the difference in the orientation information of the correspondence points, it is possible to use a mean or median value of the N relative scale sizes of the correspondence points or the N difference values of the orientation information of the correspondence points. Or the mean or median value calculated from arbitrary correspondence point pairs may be used. Incidentally, N may be a total or a portion of the number of the correspondence point pairs belonging to the cluster of interest.

It is also possible for the decision unit 206 to compare a geometrical transform model of coordinate values of the correspondence points, estimated by e.g., a robust estimation technique, with a geometrical transform model of the correspondence points, estimated on the basis of the relative scale size or the difference in the orientation information of the correspondence points. In case similarity between the two geometrical models is sufficiently high, the decision unit 206 may decide that the cluster of interest is the same as the second image. A similarity transform model, an affine transform model or a homography model, for example, may be used as the geometrical transform model of the coordinate values of the correspondence points.

To estimate the geometrical transform model of the correspondence points, based on relative scale size of the correspondence points or difference in the orientation information, the following equation:

$$A' = \sigma_{ij} \times \begin{pmatrix} \cos\rho_{ij} & -\sin\rho_{ij} \\ \sin\rho_{ij} & \cos\rho_{ij} \end{pmatrix} \quad \text{[Equation 3]}$$

may be used as an example. In the above equation, $\sigma_{ij}$ denotes the value of a relative scale size of the correspondence points, including a scale size of an i'th feature point of the first image and a scale size of a j'th feature point of the second image, and $\rho_{ij}$ a difference value between the orientation information of the feature points i and j.

In deciding the similarity between two geometric transform models, these may be decided to be similar to each other when a sum of distance values between scale parameters and rotation parameters of the estimated transform models is less than a threshold or if all of the distance values between the parameters are less than thresholds.

By comparing the two geometric transform models, calculated on the basis of the different indices, to each other to check for possible identity between a cluster of interest and the second image, a decision may be more robust than if either one of the two geometric transform models is used for making a decision.

(Operation of Exemplary Embodiment 1)

The operation of the exemplary embodiment 1 will now be described in more detail.

Figure 3:
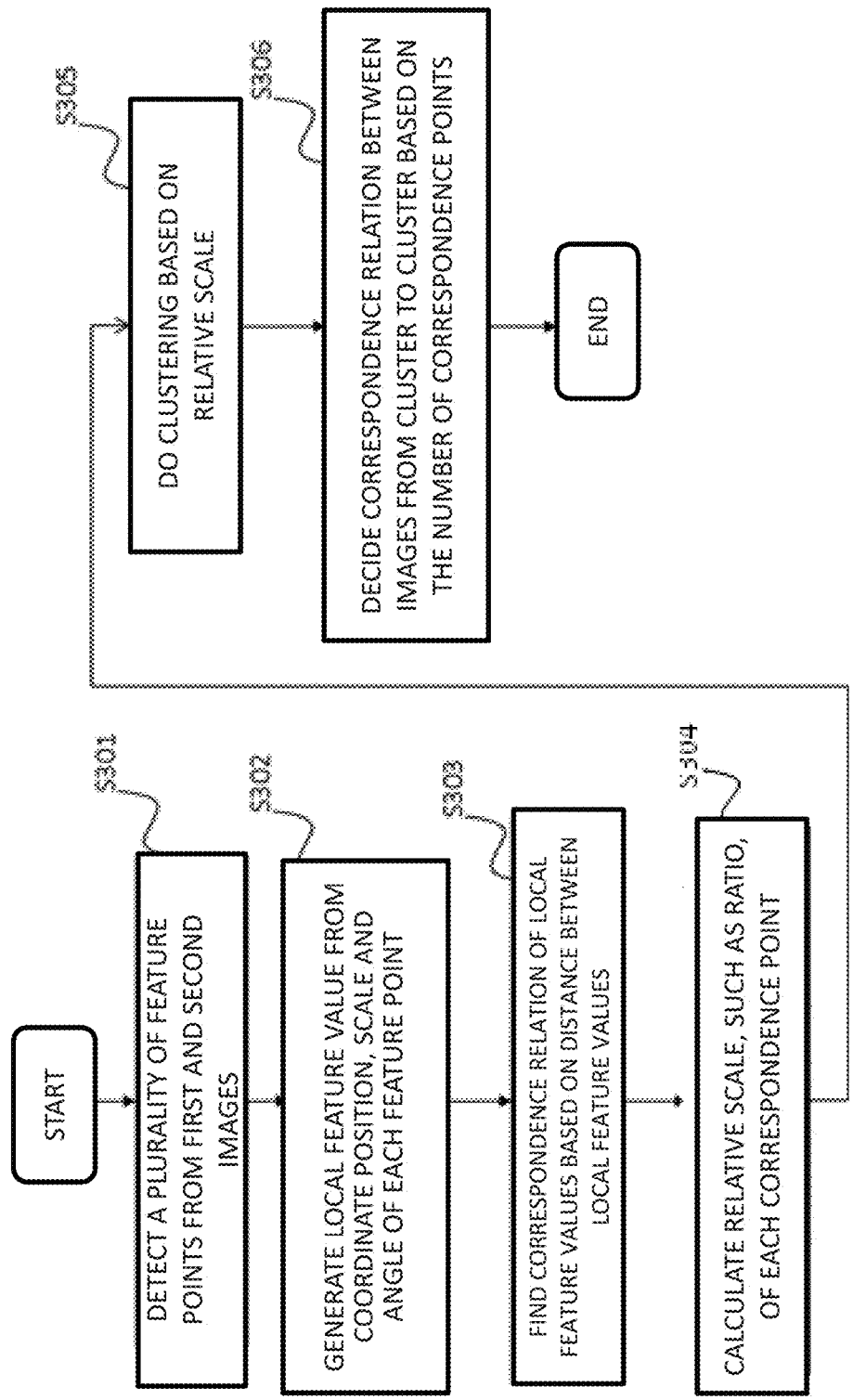
FIG. 3 is a flowchart showing the operation of the exemplary embodiment

FIG. 3 depicts a flowchart showing the operation of the present exemplary embodiment.

The first local feature value generation unit 201 detects feature points, wherein the number of the feature points satisfies a preset condition, from the first image, while the second local feature value generation unit 202 detects feature points, wherein the number of the feature points satisfies a preset condition, from the second image (step S301). The first and second local feature value generation units 201, 202 then generate local feature values and the scale information from the coordinate values of the feature points (step S302). The correspondence point calculation unit 203 finds a correspondence relationship of feature points between the images based on the distance between an optional local feature value of the set of the first local feature value information and an optional local feature value of the set of the second local feature value information (step S303). The relative correspondence point scale size calculation unit 204 calculates scale relationships, using the set of the first scale information, set of the second scale information and the set of the information about correspondence points (S304). The correspondence point selecting unit 205 performs clustering on the feature points, based on the relative scale size of correspondence points, and selects the feature points based on an outcome of the clustering (step S305). The decision unit 206 checks for similarity or identity between the images, from cluster to cluster, based e.g., on the number of the feature points selected (step S306).

(Advantageous Effects of Exemplary Embodiment 1)

In the exemplary embodiment 1, described above, the image processing apparatus 10 performs clustering on the feature points, based on information about the relative scale size of the correspondence points, while deciding photographic subject identity or similarity between the images from one cluster to another. Incidentally, the relative scale size between the feature points, correctly matched between the images, become constant from one photographic subject to another, so that, by performing clustering on the feature points using the information about the relative scale size of the correspondence points, it is possible to eliminate mistaken or erroneous matching events between the feature points of the first and second images, and hence accurately identify photographic subjects that are the same or similar between different images.

Exemplary Embodiment 2

An exemplary embodiment 2 will now be described in detail. In the present exemplary embodiment, the feature points are selected by clustering as limitations are imposed on a range of the relative scale sizes at the time of clustering on the feature points. In the following description, the configurations that are the same as or similar to the exemplary embodiment 1 are indicated by the same symbols as in the exemplary embodiment 1 and the corresponding description is occasionally dispensed with. The same applies for the exemplary embodiment 3 and so on.

Figure 4:
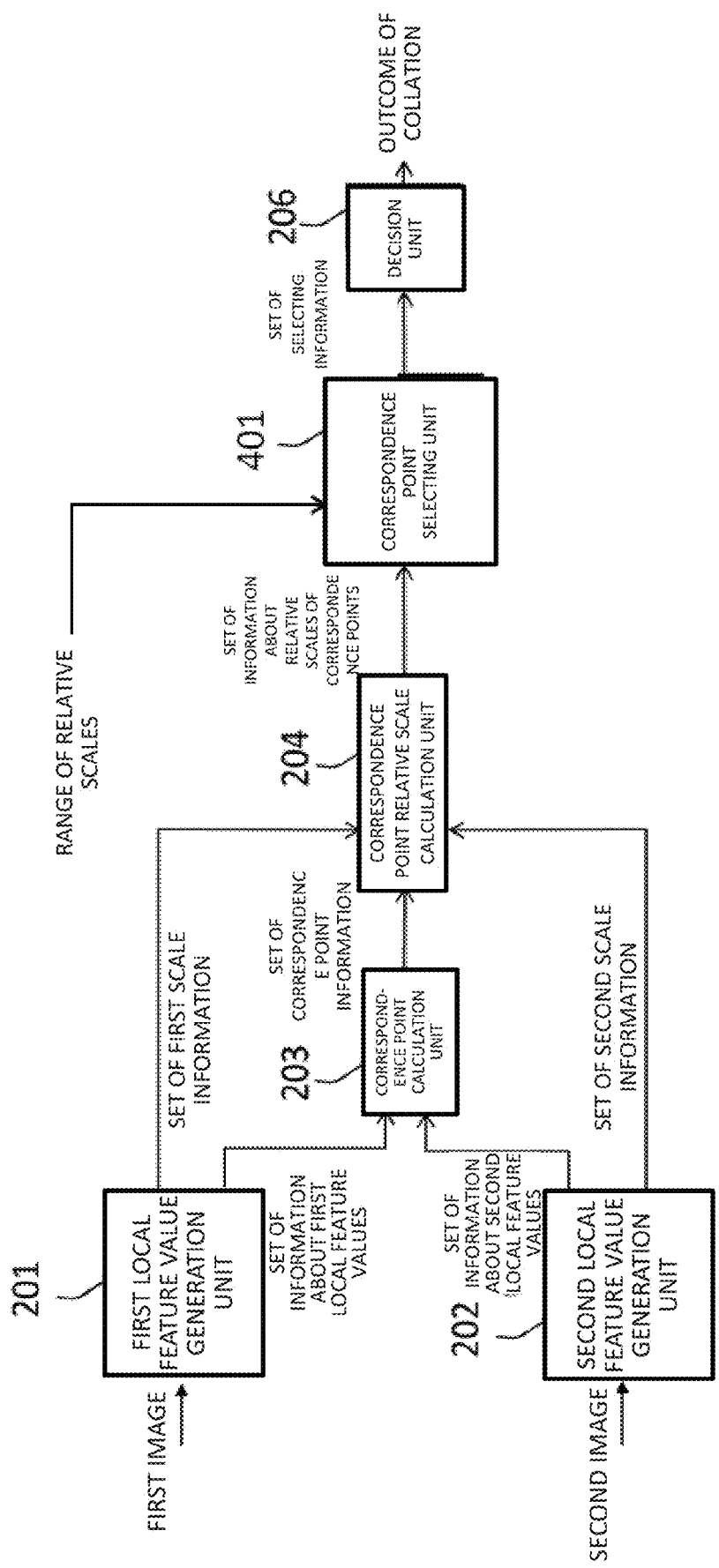
FIG. 4 is a block diagram showing a configuration of an exemplary embodiment 2.

FIG. 4 depicts a block diagram showing a functional configuration of an image processing apparatus 40 according to the exemplary embodiment 2. Referring to FIG. 4, the image processing apparatus 40 is similar in configuration to the image processing apparatus 20, shown in FIG. 2, with the difference residing in the configuration as well as the operation of a correspondence point selecting unit 401.

The correspondence point selecting unit 401 performs clustering on the feature points contained in the first image, using a set of information about the relative scale size of the correspondence points that the relative correspondence point scale size calculation unit 204 has output, and a range of the relative scale sizes. The clustering on the feature points and selecting of the correspondence points may be carried out using the method of the exemplary embodiment 1 and hence a detailed explanation is dispensed with.

The values of the range of the relative scale size may be those obtained through experience or observation, those obtained by mechanical learning with the aid of learning data, or those calculated from a set of information about the relative scale size of the correspondence points by teacherless clustering.

Only one relative scale size range suffices, however, two or more of the relative scale size ranges may be used. If the matching between the feature points of two images is correct, the relative scale sizes of the correspondence points are constant from one photographic subject to another. It is thus sufficient for the correspondence point selecting unit 401 to classify the feature points, whose relative scale size values are distributed in e.g., a range of the relative scale size values, in the same cluster. For performing clustering on the feature points as well as selecting correspondence points, the same method as that used in the exemplary embodiment 1 may be used, and hence a detailed explanation is dispensed with.

(Operation of Exemplary Embodiment 2)

Figure 5:
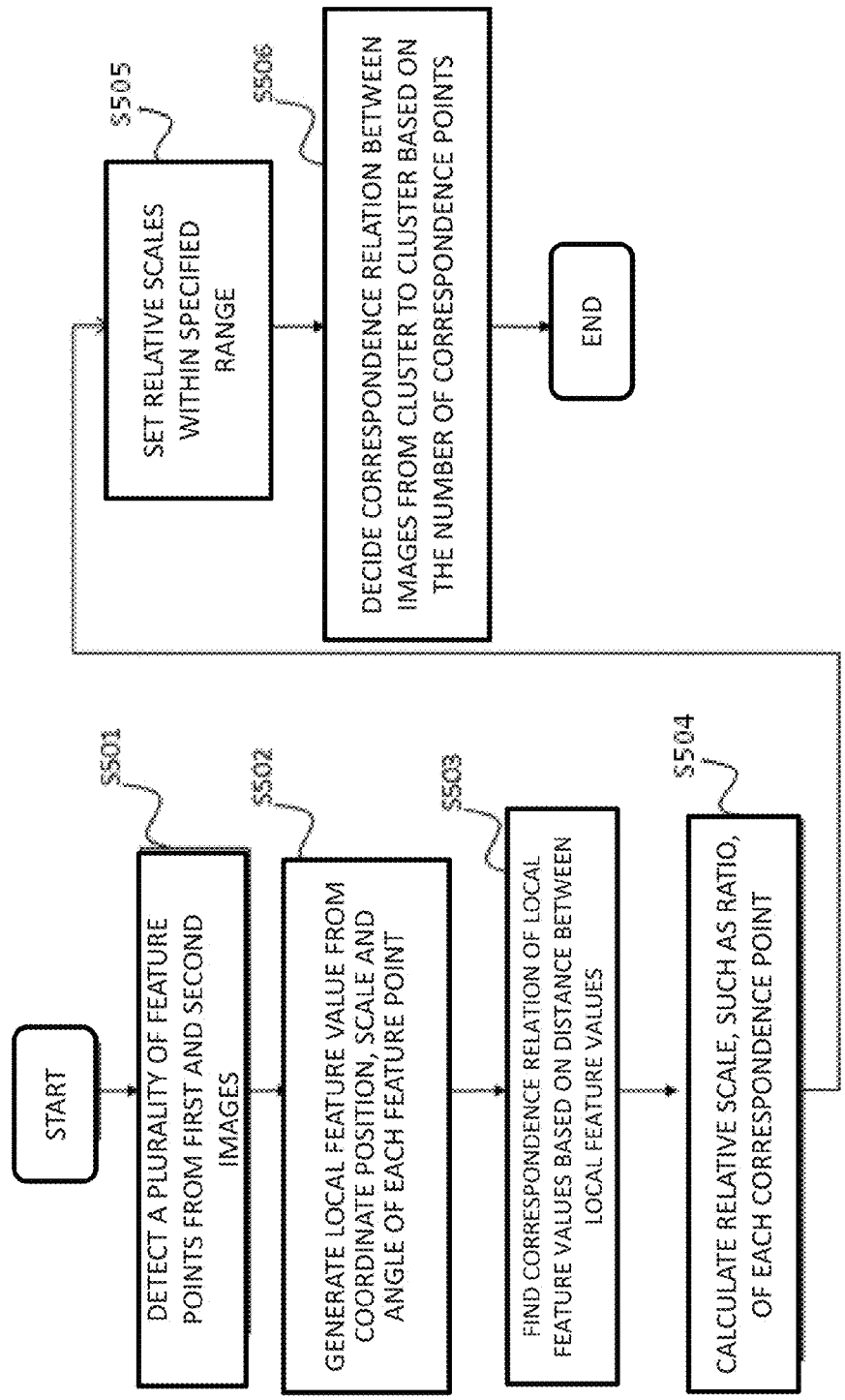
FIG. 5 is a flowchart showing the operation of the exemplary embodiment 2.

FIG. 5 depicts a flowchart showing the operation of the present exemplary embodiment. The operation of the present exemplary embodiment will be elucidated in reference to FIG. 6. Since steps S501 through S503 and S506 of FIG. 5 are the same as the steps S301 through S303 and S306, shown in FIG. 3, a detailed explanation is dispensed with.

After carrying out the processing of the steps S501 through S503, shown in FIG. 5, the relative correspondence point scale size calculation unit 204 calculates scale relationships, using a set of the first scale information, a set of the second scale information and a set of the information about correspondence points (step S504). The correspondence point selecting unit 401 performs clustering on feature points based on the relative scale size of the correspondence points and a range of relative scale size to select the feature points based on an outcome of the clustering (step S505). Processing then transfers to the step S506 shown in FIG. 5.

(Advantageous Effects of Exemplary Embodiment 2)

With the exemplary embodiment 2, the advantageous effects similar to those of the exemplary embodiment 1 may be obtained. In addition, the volume of computations may be decreased since clustering is performed only on feature points having the relative scale size information within the relative scale size value range.

Exemplary Embodiment 3

An exemplary embodiment 3 will now be described in detail. In the present exemplary embodiment, the relative scale sizes of the correspondence points are normalized.

Figure 6:
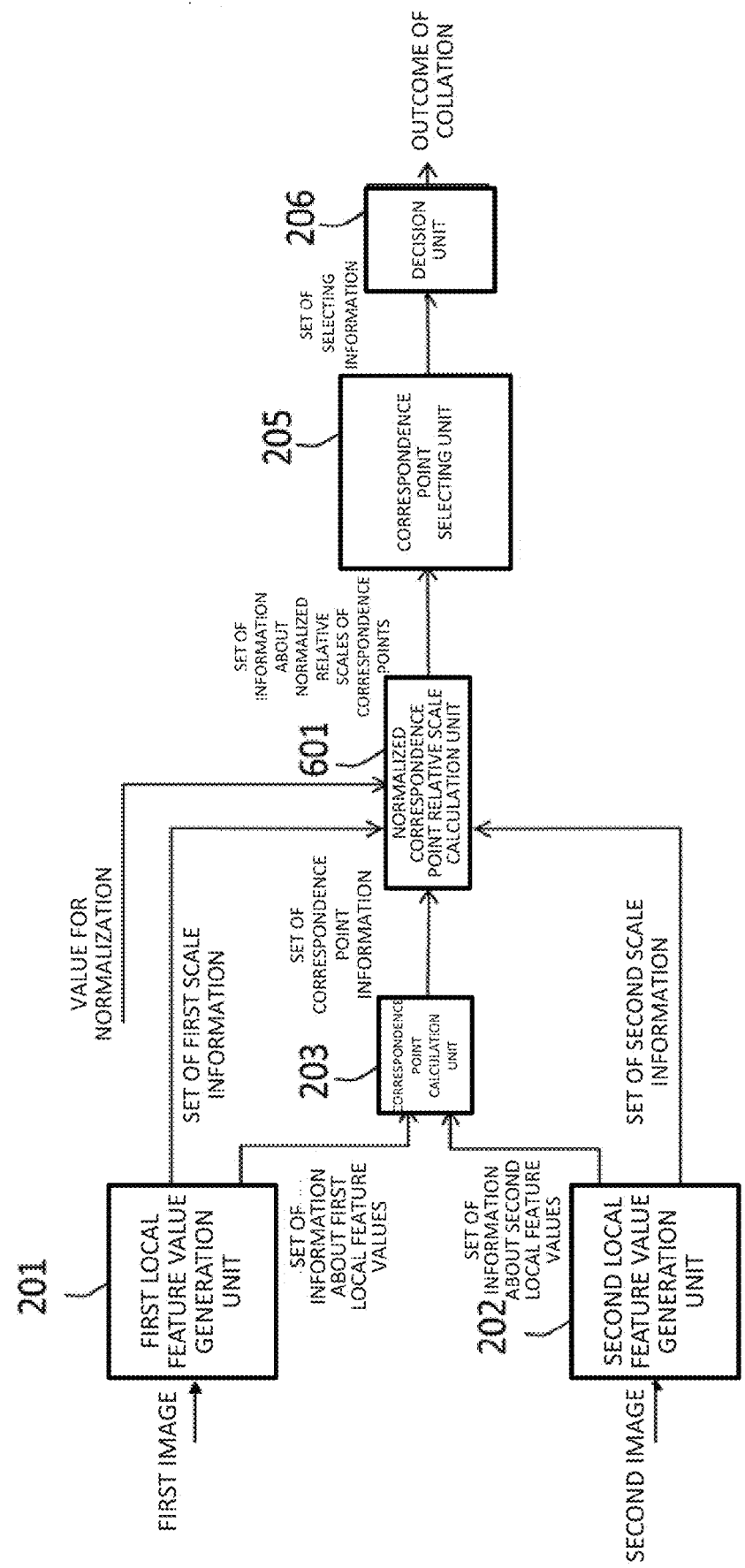
FIG. 6 is a block diagram showing a configuration of an exemplary embodiment 3.

FIG. 6 depicts a block diagram showing a functional configuration of an image processing apparatus 60 according to the exemplary embodiment 3. Referring to FIG. 6, the image processing apparatus 60 is similar in configuration to the image processing apparatus 20, shown in FIG. 2, however, the image processing apparatus 60 differs as to the configuration as well as the operation of a normalized relative correspondence point scale size calculation unit 601

The normalized relative correspondence point scale size calculation unit 601 calculates a number satisfying a preset condition of relative scale size of the correspondence points, which represent a relationship of the scale sizes of the correspondence points, using a set of the information about correspondence points that a correspondence point calculation unit 203 has output, a set of the first scale information that a first local feature value generation unit 201 has output, and a set of the second scale information that a second local feature value generation unit 202 has output.

The normalized relative correspondence point scale size calculation unit 601 then normalizes the so calculated relative scale size values of the correspondence points, using a multiplier for normalization, so as to generate a set of the information about the normalized relative scale size of the correspondence points comprised of normalized relative scale size values of the correspondence points.

The set of the information about the normalized relative scale size of the correspondence points, thus generated, is output to a correspondence point selecting unit 205. In calculating the relative scale size of the correspondence points, a method by the relative correspondence point scale size calculation unit 204, as described above in connection with the exemplary embodiment 1, may be used.

The following details how to normalize the relative scale size of the correspondence points.

In normalizing the relative scale size of the correspondence point, an equation 4

$$\sigma_{normalized}(n)=\sigma(n)/z(n) \quad \text{[Equation 4]}$$

may be used, in which $\sigma_{normalized}$ denotes a normalized relative scale size value of correspondence points, $\sigma(n)$ a relative scale size value of n'th correspondence points, such as a q'th feature point of the first image and a p'th feature point of the second image, and z a multiplier used for normalization.

The multiplier for normalization may, for example, be a size of the second image, an actual size of a photographic subject in the second image or an image size of the photographic subject in the second image. The image size may, for example, be the width, height, the number of pixels or the aspect ratio of an image. The actual size of the photographic subject may be its width or height. The image size of the photographic subject may, for example, be the width, height, the number of pixels or the aspect ratio of the photographic subject in the image.

Figure 63:
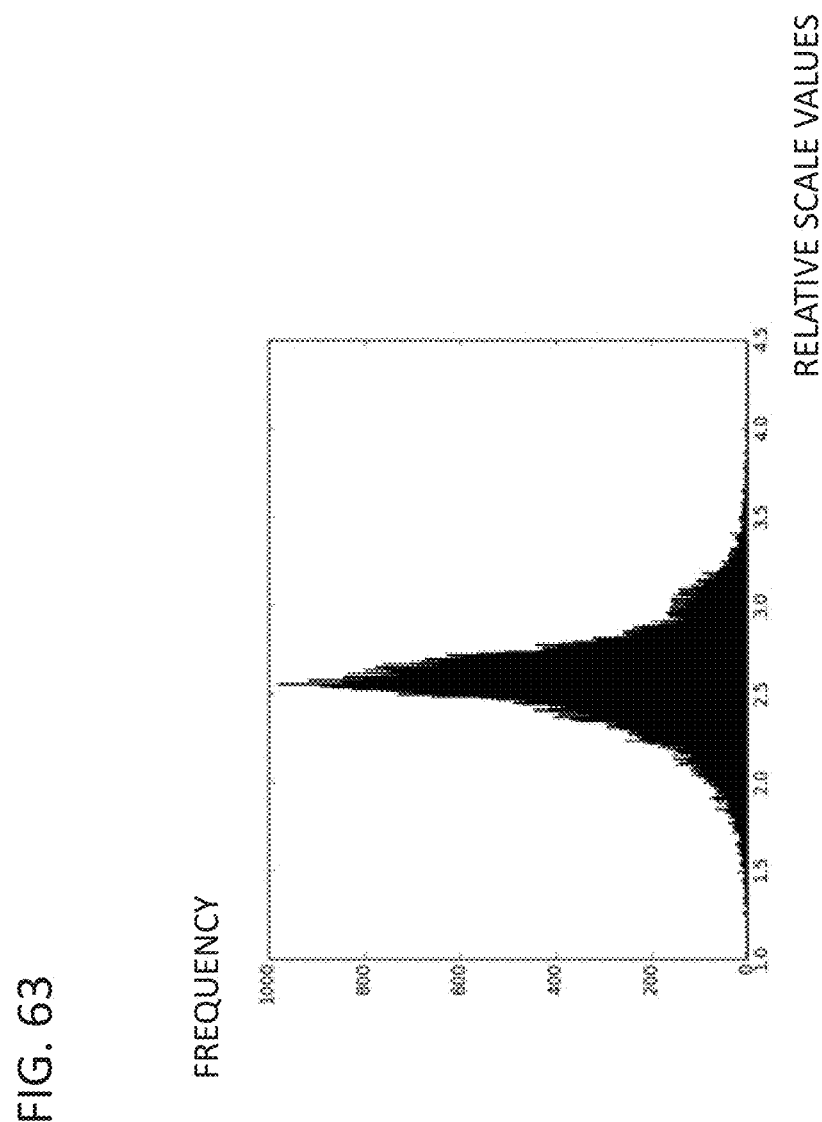
FIG. 63 is a chart showing example distribution of normalized scale sizes of feature points in an image.

FIG. 63 shows an example of the normalized relative scale size value of the correspondence points. In FIG. 63, the abscissa stands for a logarithm of the normalized relative scale size value and the ordinate the frequency. As shown in FIG. 63, the normalized relative scale size value has such characteristic that it becomes constant from one photographic subject in the image to another if matching between feature points of different images is correct. It is therefore sufficient that the correspondence point selecting unit 205 performs clustering on the feature points so that the feature points exhibiting the relative scale size value not less than a preset frequency will be grouped in the same cluster. For clustering, a method similar to that shown in the exemplary embodiment 1 may be used.

(Operation of Exemplary Embodiment 3)

Figure 7:
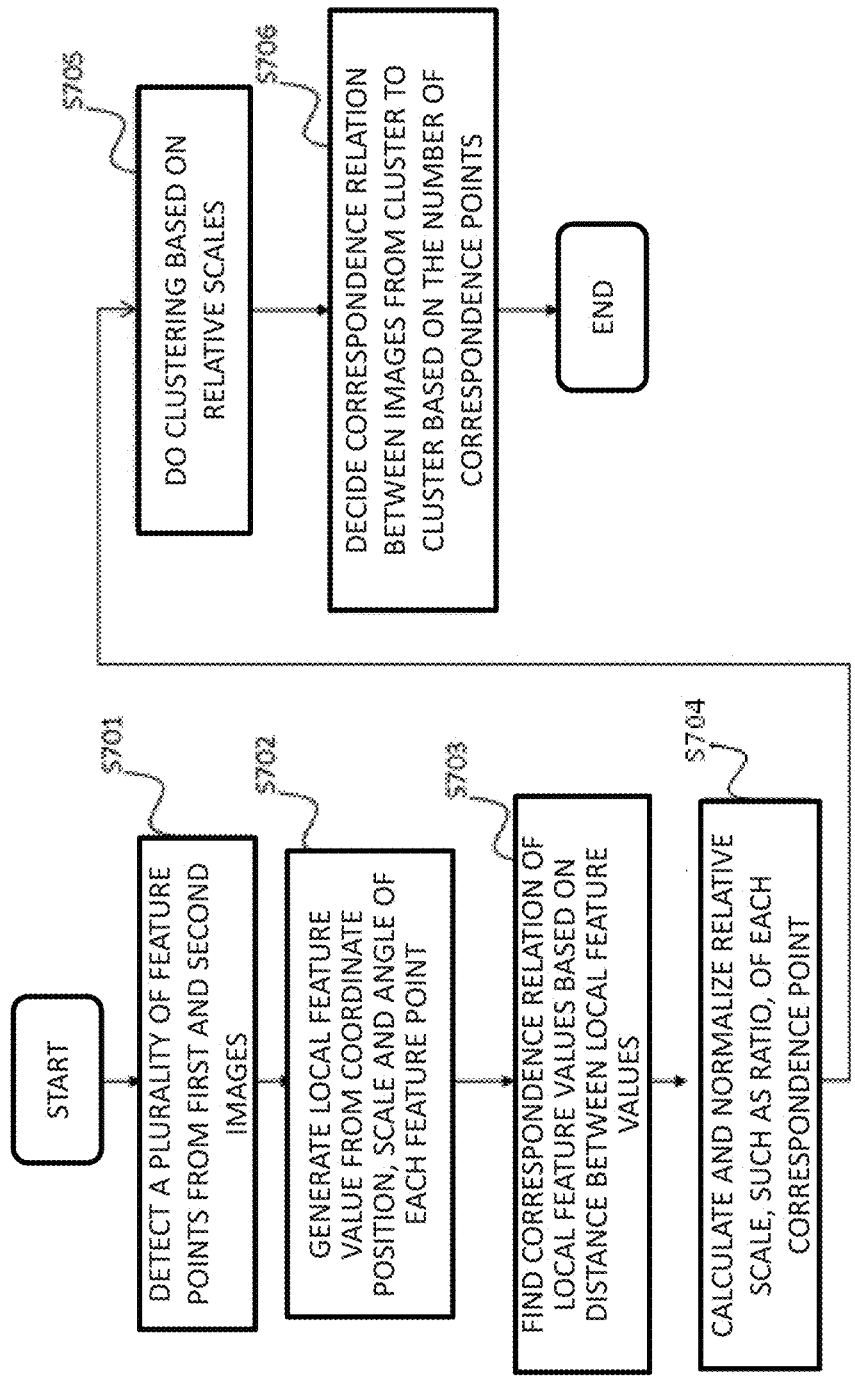
FIG. 7 is a flowchart showing the operation of the exemplary embodiment 3.

Referring to FIG. 7, depicting a flowchart showing the operation of the present exemplary embodiment, the operation of the present exemplary embodiment will be clarified in detail. Incidentally, the steps S701 through S703 and the step S706, shown in FIG. 7, are the same as the steps S301 through S303 and the step S306 shown in FIG. 3, and hence are not here recited.

After executing the processing of the steps S701 through S703, shown in FIG. 7, the normalized relative correspondence point scale size calculation unit 601 calculates scale relationships, based on a set of the first scale information, a set of the second scale information and a set of the information about correspondence points, and then normalizes the so calculated scale relationships using e.g., an image size or an actual size of the photographic subject (step S704). The correspondence point selecting unit 205 performs clustering on the feature points, based on a set of the information about the normalized relative scale size of the correspondence points, and selects the feature points based on an outcome of the clustering (step S705). Processing then transfers to the step S706 shown in FIG. 7.

(Advantageous Effects of Exemplary Embodiment 3)

With the exemplary embodiment 3, the advantageous effects similar to those of the exemplary embodiment 1 may be obtained. In addition, if the relative scale size between feature points, correctly related between different images, are normalized, the normalized relative scale size of the correspondence point become constant from one photographic subject contained in the first image to another. Thus, by performing clustering on the feature points, based on the normalized relative scale sizes of the correspondence points, it is possible to exclude mistaken matching between the feature points of the first image and the feature points of the second image. Such mistaken matching my occur when it is tried to correlate feature points of photographic subjects having the same pattern portions, such as logos, but differing in size. Thus, even if a photographic subject(s) differing in size between the images is involved, such photographic subject(s) can be identified more accurately than with the exemplary embodiment 1.

Exemplary Embodiment 4

An exemplary embodiment 4 will now be described in detail. The present exemplary embodiment performs clustering based on the states of relative orientations of feature points.

Figure 10:
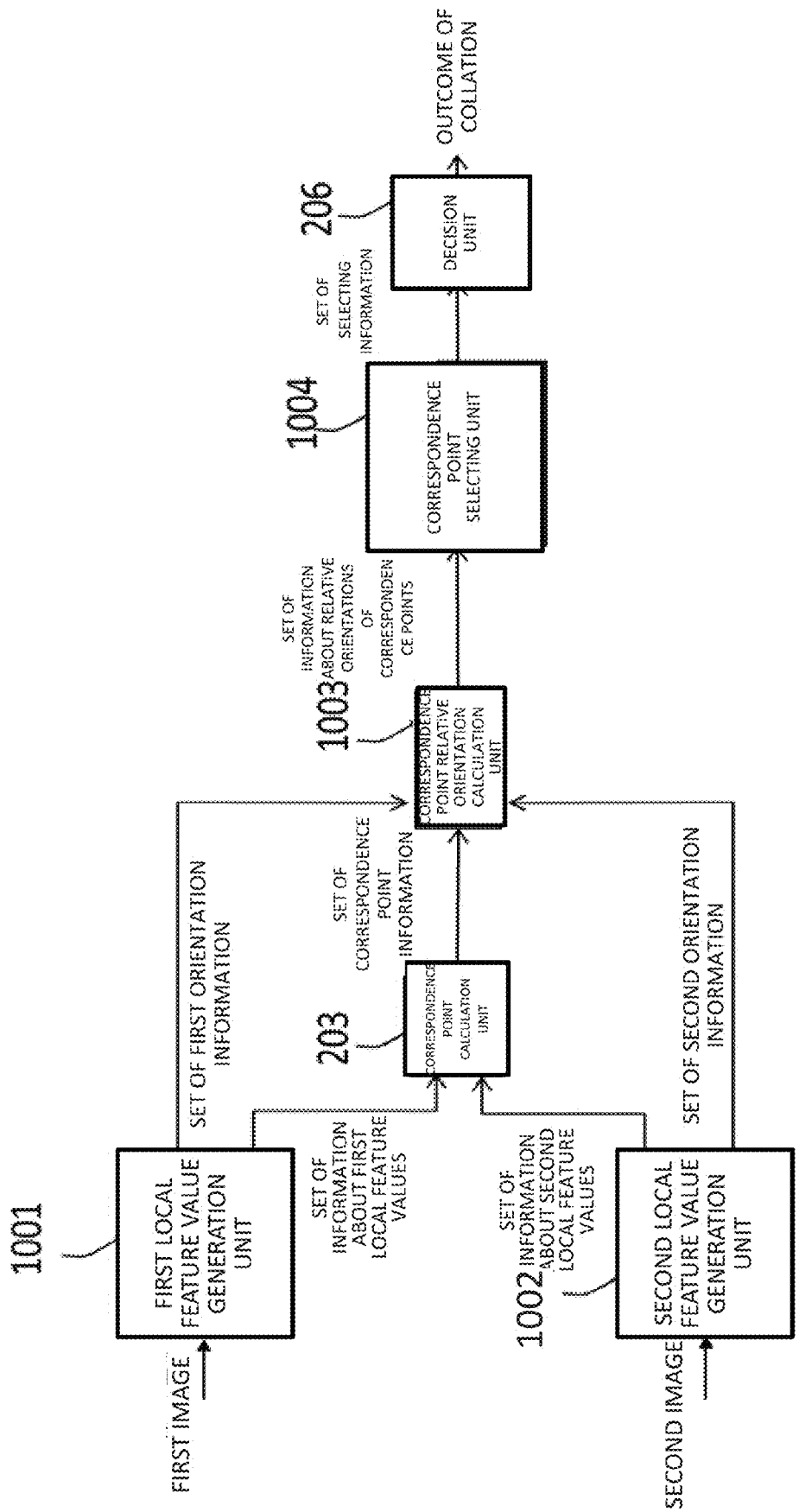
FIG. 10 is a block diagram showing a configuration of an exemplary embodiment 4.

FIG. 10 depicts a block diagram showing a functional configuration of an image processing apparatus 100 according to the exemplary embodiment 4. Referring to FIG. 10, the image processing apparatus 100 includes a first local feature value generation unit 1001, a second local feature value generation unit 1002, a correspondence point calculation unit 203, a relative correspondence point orientation calculation unit 1003, a correspondence point selecting unit 1004 and a decision unit 206. Since the operation of the correspondence point calculation unit 203 and the decision unit 206 is the same as in the exemplary embodiment 1, the corresponding explanation is dispensed with.

(Generation of Feature Values)

The first local feature value generation unit 1001 detects feature points, wherein the number of the feature points satisfies a preset condition, from the first image, while generating, from coordinate values of respective feature points detected, a plurality of local feature values in an ambient region (neighbored region) including each feature point. The first local feature value generation unit 1001 outputs a set of the first local feature values, made up of the local feature values produced, to the correspondence point calculation unit 203.

The first local feature value generation unit 1001 also calculates the orientation information of the feature points, as detected from the first image, and outputs a set of the first orientation information, made up of the orientation information of the feature points calculated, to the relative correspondence point orientation calculation unit 1003.

The orientation information of the feature point is the information about the orientation (angle) ancillary to each feature point, and has its value calculated from the image of a region encompassing the feature point (neighbored region). It is preferred that, in case the image of the region encompassing the feature point is rotated, an angle ancillary to the feature point is also rotated. The first local feature value generation unit 1001 may, as an example, calculate the orientation of the luminance gradient of an image region encompassing the feature point of interest as being the orientation information of the feature point.

Or the first local feature value generation unit 1001 may split an ambient region encompassing an optional feature point into a 4-by-4 patch region to calculate luminance variations in the so formed patch regions as the orientation information of the feature point. The orientation having maximum luminance variations calculated may be used as the orientation information of the feature point.

Or the first local feature value generation unit 1001 may use a wavelet filter to calculate an orientation of a higher intensity of the wavelet coefficient as being the orientation information of the feature point.

The second local feature value generation unit 1002 may, by an operation similar to that of the first local feature value generation unit 1001, produce a set of the second local feature values, made up of local feature values of respective feature points of the second image, and a set of the second orientation information, made up of the orientation information of respective feature points of the second image. The second local feature value generation unit 1002 outputs the set of the second local feature values to the correspondence point calculation unit 203. The second local feature value generation unit 1002 also outputs the set of the second orientation information to the relative correspondence point orientation calculation unit 1003.

The relative correspondence point orientation calculation unit 1003 calculates a number exceeding a preset condition of relationships of the orientation information of the correspondence points, referred to below as information about the relative orientations of the correspondence points, using a set of the information about correspondence points that the correspondence point calculation unit 203 has output, a set of the first orientation information that the first local feature value generation unit 1001 has output, and a set of the second orientation information that the second local feature value generation unit 1002 has output. The relative correspondence point orientation calculation unit 1003 outputs a set of the information about the relative orientations of the correspondence points, made up of information about the relative orientations of the correspondence points calculated, to the correspondence point selecting unit 1004.

The following details how to calculate the information about the relative orientations of the correspondence points.

It is possible for the relative correspondence point orientation calculation unit 1003 to calculate a difference value of the orientation information of the correspondence points as being the information about the relative orientation of the correspondence points. In calculating the difference value of the orientation information of the correspondence points, an Equation 5:

$$\rho = \theta(q) - \theta(p) \quad \text{[Equation 5]}$$

may be used, in which ρ denotes a difference value of the orientation information of the correspondence points, θ (q) the orientation information of a q'th feature point, as detected from the first image, and θ(p) the orientation information of a p'th feature point, as detected from the second image.

If the orientation information having a property of an exponential function is extracted from a feature point, the relative orientation of the correspondence point may e.g., be a ratio of the orientation information of the correspondence points. In calculating the ratio of the orientation information, an equation 6:

$$\rho' = \theta'(q)/\theta'(p) \quad \text{[Equation 6]}$$

may e.g., be used, in which p' denotes a ratio of the orientation information of the correspondence points.

Referring now to FIG. 64, a property of the orientation information of the feature point will be explained. FIG. 64 shows an example in which a photographic subject of an image 10012 has been rotated 45° relative to a photographic subject of an image 10011. The orientation of an arrow of FIG. 64 represents the orientation information of the feature point. As shown in FIG. 64, the orientation information of the feature point has a property that it is relatively changed in response to rotation of the photographic subject in an image. That is, if the photographic subject in the image is rotated 45°, the orientation information of the total of the feature points in the image is rotated 45°. Consequently, the relative orientation of the correspondence points, calculated by the equations 5 and 6, has a property that it is constant from one photographic subject to another in case the feature point of the first image is correctly matched to the feature point of the second image.

The correspondence point selecting unit 1004 performs clustering on the feature points, contained in the first image, using the set of the information about the relative orientation of the correspondence points that the relative correspondence point orientation calculation unit 1003 has output. Based on an outcome of the clustering, the correspondence point selecting unit 1004 selects the feature points to output a set of the information selected. The selecting of the feature points and the outputting of the set of the information selected are the same as in the previous exemplary embodiments and hence are not here stated in detail.

It is possible for the correspondence point selecting unit 1004 to perform clustering so that feature points having a high degree of similarity of the relative orientations of the correspondence points (a small distance value) will be grouped in the same cluster. In performing clustering on the feature points, the same method as that used by the correspondence point selecting unit 205 of the exemplary embodiment 1 to select the feature points by clustering based on the relative scale size of the correspondence points may be used. The feature points contained in a given cluster may be selected if the number of the feature points contained in the cluster is not less than a preset threshold.

(Operation of Exemplary Embodiment 4)

Figure 11:
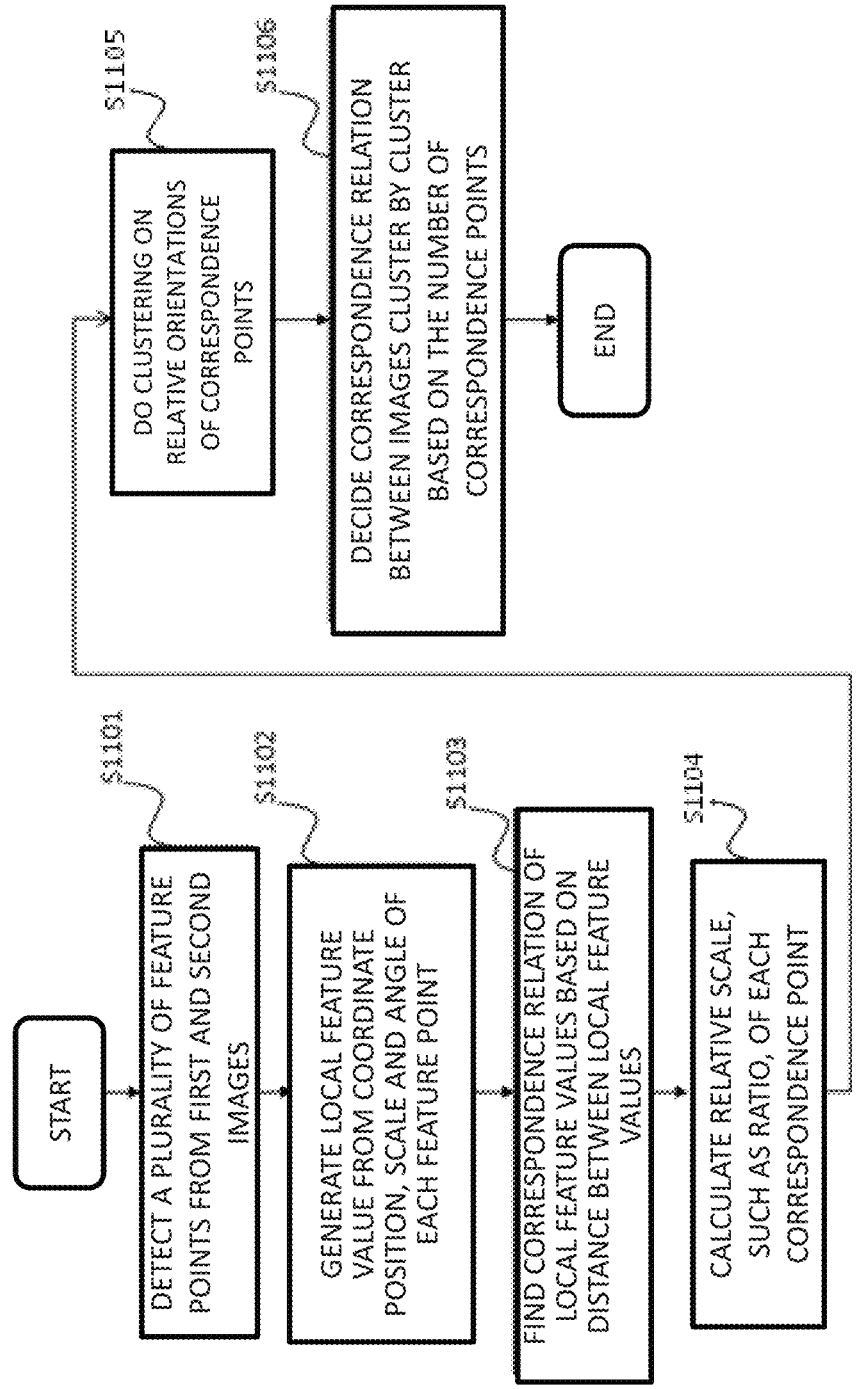
FIG. 11 is a flowchart showing the operation of the exemplary embodiment 4.

FIG. 11 depicts a flowchart showing the operation of the present exemplary embodiment. Since the steps S1101 through S1103 and S1106 shown in FIG. 11 are the same as the steps S301 through S303 and S306, shown in FIG. 3, a detailed explanation is dispensed with.

After carrying out the processing of the steps S1101 through S1103, shown in FIG. 11, the relative correspondence point orientation calculation unit 1003 calculates the information about the relative orientations of the correspondence points, using the set of the first orientation information, the set of the second orientation information and the set of the information about correspondence points (step S1104). The correspondence point selecting unit 1004 performs clustering on the feature points, based on the set of the information about the relative orientation of the correspondence points, and selects the feature points based on an outcome of the clustering (step S1005). Processing then transfers to the step S1106 shown in FIG. 5.

(Advantageous Effects of Exemplary Embodiment 4)

With the exemplary embodiment 4, the feature points are selected by clustering, based on the information about the relative orientations of the correspondence points, and a decision on the photographic subjects, which are the same or similar between the images, is made from one cluster to another. Since the relative orientations between the feature points, correctly matched between the images, are constant from one photographic subject to another, it is possible to remove the mistaken correspondence relation between the feature point of the first image and that of the second image by selecting the feature points by clustering using the information about the relative orientations of the correspondence points. By so doing, it is possible to identify the same or similar photographic subjects between the images to high precision.

Exemplary Embodiment 5

An exemplary embodiment 5 will now be described in detail. The present exemplary embodiment uses the information about the relative scale size of the correspondence points and the information about the relative orientations of the correspondence points for clustering.

Figure 14:
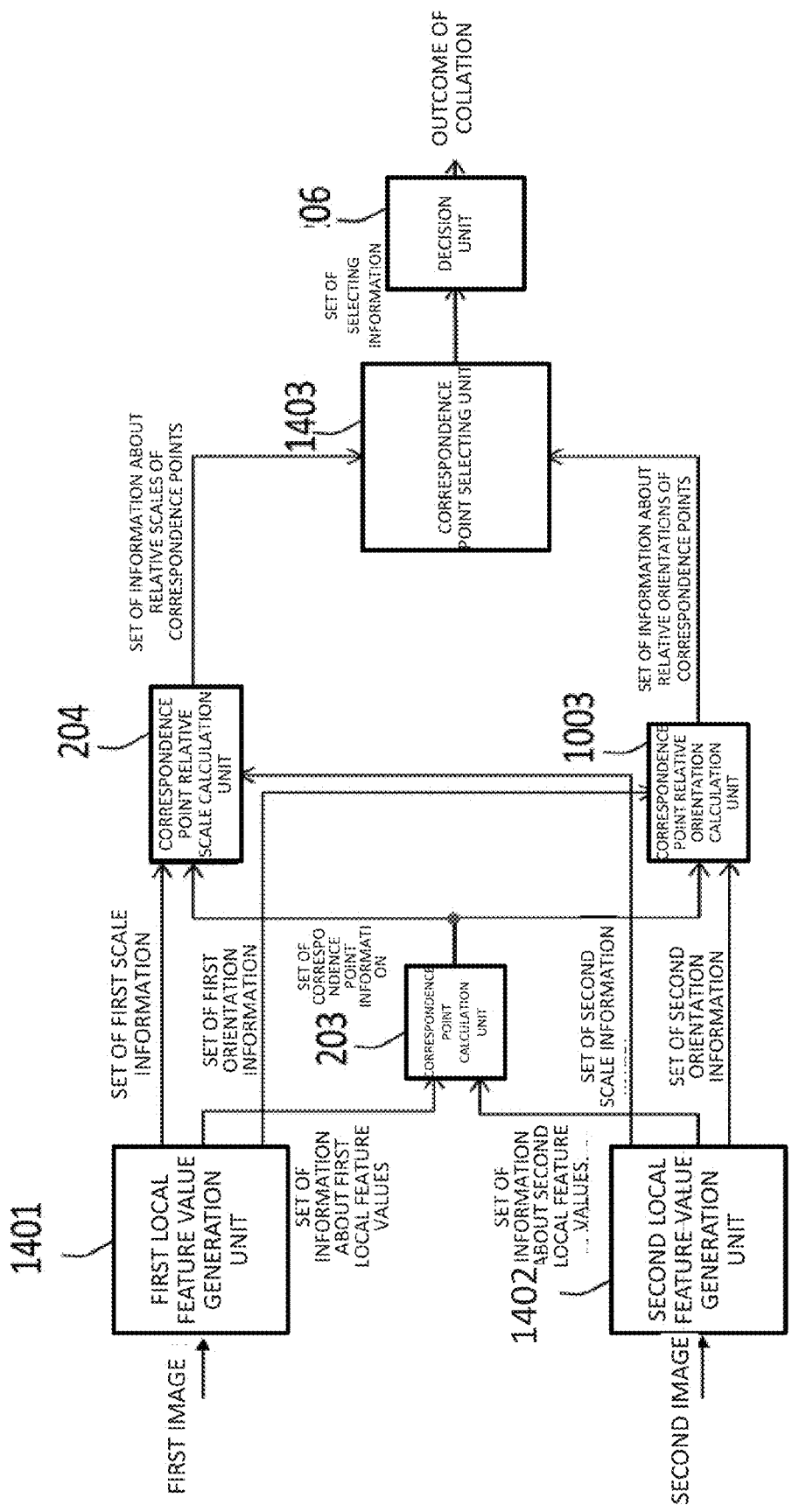
FIG. 14 is a block diagram showing a configuration of an exemplary embodiment 5.

FIG. 14 depicts a block diagram showing a functional configuration of an image processing apparatus 140 according to the exemplary embodiment 5. Referring to FIG. 14, the image processing apparatus 140 includes a first local feature value generation unit 1401, a second local feature value generation unit 1402, a correspondence point calculation unit 203, a relative correspondence point scale size calculation unit 204, a relative correspondence point orientation calculation unit 1003, a correspondence point selecting unit 1403 and a decision unit 206. The correspondence point calculation unit 203, relative correspondence point orientation calculation unit 1003 and the decision unit 206 are the same in configuration and operation as the corresponding components of the above described exemplary embodiments, and hence are not here recited for simplicity.

(Generation of Feature Values)
The first local feature value generation unit 1401 generates a set of information about first local feature values and a set of the first scale information. The first local feature value generation unit 1401 outputs the set of the information about the first local feature values generated to the correspondence point calculation unit 203, while outputting the set of the first scale information generated to the relative correspondence point scale size calculation unit 204. The first local feature value generation unit 1401 outputs a set of the first orientation information to the relative correspondence point orientation calculation unit 1003.

The second local feature value generation unit 1402 generates a set of the second local feature values, a set of the second scale information and a set of the second orientation information, and outputs the set of the second local feature values to the correspondence point calculation unit 203. The second local feature value generation unit 1402 also outputs the set of the second scale information to the relative correspondence point scale size calculation unit 204, while outputting the set of the second orientation information to the relative correspondence point orientation calculation unit 1003.

(Selecting of Correspondence Points)
The correspondence point selecting unit 1403 performs clustering on the feature points, contained in the first image, using a set of information about the relative scale size of the correspondence points that the relative correspondence point scale size calculation unit 204 has output, and a set of the relative correspondence point orientation information that the relative correspondence point orientation calculation unit 1003 has output.

Preferably, the correspondence point selecting unit 1403 performs clustering so that the feature points, in which the degree of similarity of the information about the scales of the correspondence points and the degree of similarity of the relative orientations of the correspondence points exceed respective preset thresholds, will be grouped in the same cluster. For performing clustering on the feature points and selecting the correspondence points based on the relative scale size and relative orientations of the correspondence points, a method similar to that used in the exemplary embodiment 1 may be used.

Figure 15:
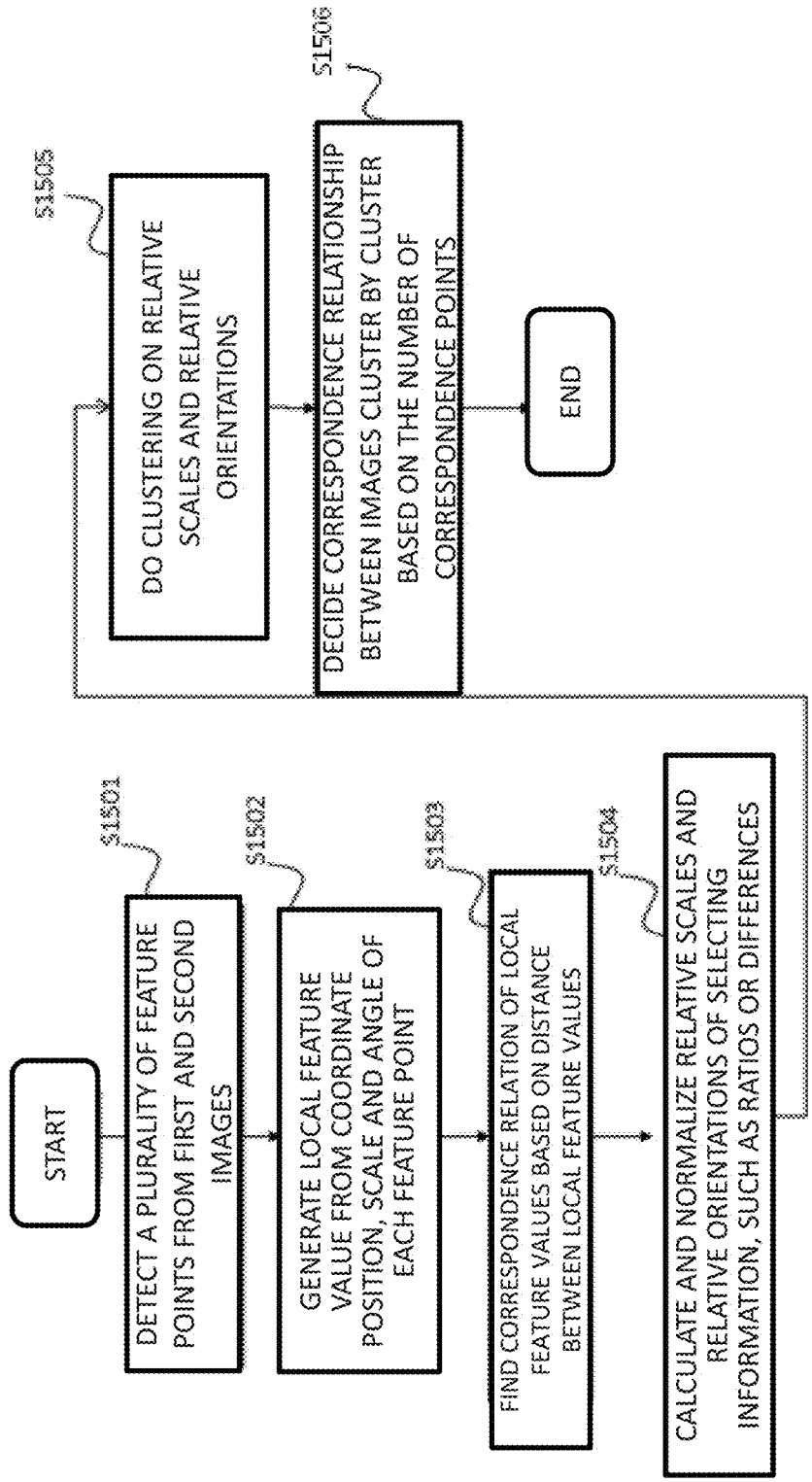
FIG. 15 is a flowchart showing the operation of the exemplary embodiment 5.

(Operation of Exemplary Embodiment 5)
FIG. 15 depicts a flowchart showing the operation of the present exemplary embodiment, which will now be described in detail by referring to FIG. 15. Since the steps S1501 through S1503 and S1506, shown in FIG. 15, are the same as the steps S301 through S303 and S306, shown in FIG. 3, a detailed explanation here is dispensed with.

After carrying out the processing of the steps S1501 through S1503, shown in FIG. 5, the relative correspondence point scale size calculation unit 204 calculates scale relationships, based on a set of the information about correspondence points, the set of the first scale information and the set of the second scale information. The relative correspondence point orientation calculation unit 1003 calculates the information about relative orientations of the correspondence points, based on the set of the information about correspondence points, set of the first orientation information and the set of the second orientation information (step S1504). The correspondence point selecting unit 1403 performs clustering on the feature points, based on the set of information about the relative scale size of the correspondence points and the set of information about the relative orientations of the correspondence points, and selects the feature points based on an outcome of the clustering (step S1505). Then, processing transfers to a step S1506 shown in FIG. 15.

(Advantageous Effects of Exemplary Embodiment 5)
With the exemplary embodiment 5, the advantageous effects similar to those of the exemplary embodiment 1 may be obtained. In addition, the relative orientations of the feature points, correctly matched between the images, may become constant from one photographic subject to another. Also, with the exemplary embodiment 5, in which the feature points are selected by clustering, using the information about the relative orientations, it is possible to eliminate mistaken matching between the feature point of the first image and that of the second image. Thus, with the exemplary embodiment 5, precision in identification may be higher than with the exemplary embodiment 1, Exemplary Embodiment 6

An exemplary embodiment 6 will now be clarified in detail. The present exemplary embodiment uses coordinate values of the feature points for clustering.

Figure 22:
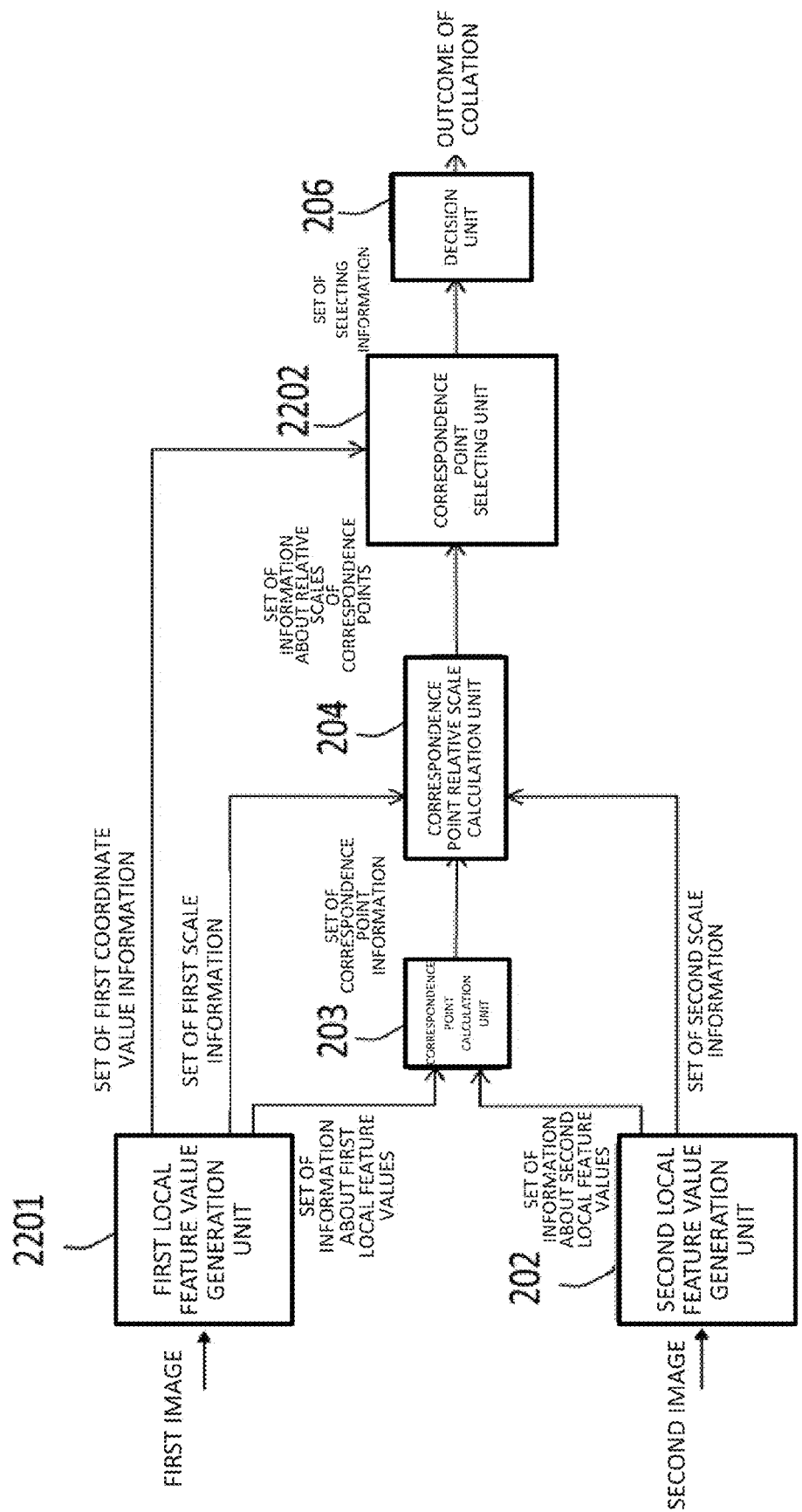
FIG. 22 is a block diagram showing a configuration of an exemplary embodiment 6.

FIG. 22 depicts a block diagram showing a configuration of an image processing apparatus 220 according to the exemplary embodiment 6. Referring to FIG. 22, the image processing apparatus 220 is similar in configuration to the image processing apparatus 20, shown in FIG. 2, except for the configuration as well as the operation of a first local feature value generation unit 2201 and a correspondence point selecting unit 2202.

(Generation of Feature Values)
By the operation similar to that by the first local feature value generation unit 201 of the exemplary embodiment 1, the first local feature value generation unit 2201 generates a set of the first local feature values, which are then output to a correspondence point calculation unit 203. The first local feature value generation unit 2201 also outputs a set of the first scale information, generated from the feature points, to a relative correspondence point scale size calculation unit 204, while outputting a set of the first coordinate value information, made up of coordinate values of feature points, detected from the first image, to the correspondence point selecting unit 2202.

(Selecting of Feature Points)

The correspondence point selecting unit 2202 performs clustering on the feature points, contained in the first image, using a set of information about the relative scale size of the correspondence points that the relative correspondence point scale size calculation unit 204 has output, and the set of the first coordinate value information that the first local feature value generation unit 2201 has output. The correspondence point selecting unit 2202 selects the feature points based on an outcome of the clustering to output the information selected. The selecting of the feature points as well as the outputting of the set of the information selected is the same as in the above described exemplary embodiments and hence is not recited for simplicity.

The selecting of the correspondence points will now be detailed.

The correspondence point selecting unit 2202 outputs a set of the selecting information, including and made up of a set of the information about correspondence points of the feature points selected, and a set of the cluster information, to a decision unit 206. The set of the cluster information is made up of information about a plurality of clusters each containing one or more feature points.

It is also possible for the correspondence point selecting unit 2202 to perform clustering on the feature points, based e.g., on the set of information about the relative scale size of the correspondence points, select the feature points based on an outcome of the clustering, and perform clustering on the so selected feature points based on the set of the first coordinate value information.

It is also possible for the correspondence point selecting unit 2202 to perform clustering on the feature points using both the information about the relative scale size of the correspondence points and the set of the information about the first coordinate values. For clustering on the feature points, the method used in the above described exemplary embodiments may be used and hence the corresponding explanation is not made for simplicity.

(Operation of Exemplary Embodiment 6)

Figure 23:
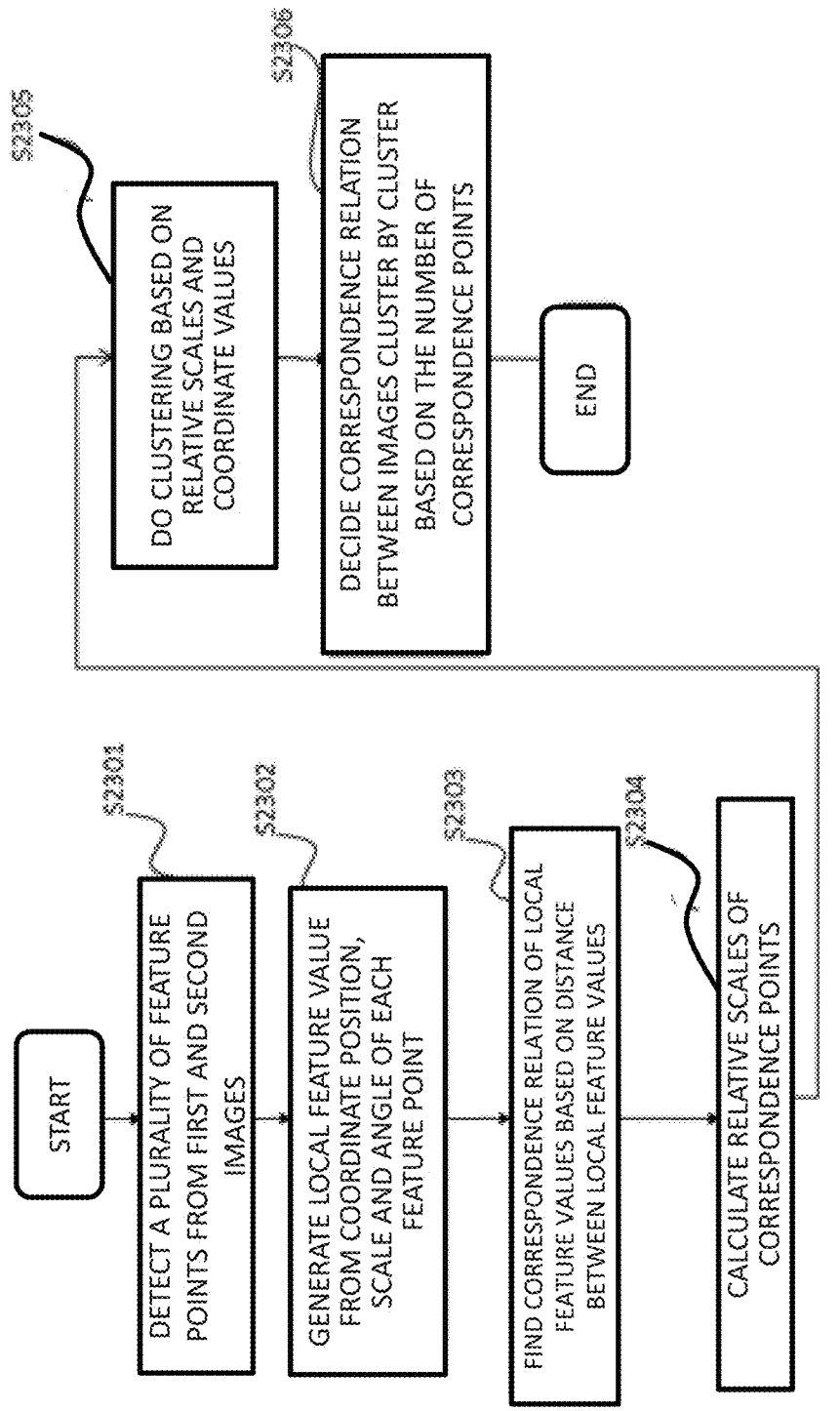
FIG. 23 is a flowchart showing the operation of the exemplary embodiment 6.

FIG. 23 depicts a flowchart showing the operation of the present exemplary embodiment, which will now be described in detail by referring to FIG. 23. Since the steps S2301 through S2303 and S2306 shown in FIG. 23 are the same as the steps S301 through S303 and S306, shown in FIG. 3, a detailed explanation here is dispensed with.

After carrying out the processing of the steps S2301 through S2303, shown in FIG. 23, the relative correspondence point scale size calculation unit 204 calculates scale relationships, using the set of the first scale information, a set of the second scale information and the set of the information about correspondence points (step S2304). The correspondence point selecting unit 2202 performs clustering on the feature points based on the set of information about the relative scale size of the correspondence points and the set of the first coordinate value information to select feature points based on an outcome of the clustering (step S2305). Processing then transfers to a step S2306 shown in FIG. 23.

(Advantageous Effects of Exemplary Embodiment 6)

With the exemplary embodiment 6, the advantageous results similar to those of the exemplary embodiment 1 may be obtained. In addition, the feature points are selected by clustering, using coordinate values thereof in an image, and photographic subjects that are the same or analogous between two images may be identified on the cluster basis.

Thus, in the exemplary embodiment 6, the feature points, correctly matched between the two images, are caused to gather together to high density from one photographic subject to another, so that, by performing clustering on the feature points based on the coordinate value information, it is possible to identify the photographic subjects more correctly individually than with the exemplary embodiment 1 even in case there exists a plurality of photographic subjects of the same scale.

Exemplary Embodiment 7

An exemplary embodiment 7 will now be explained in detail. The present exemplary embodiment calculates relative coordinate values of feature points and uses the so calculated relative coordinate values for clustering.

Exemplary Embodiment 7

Figure 42:
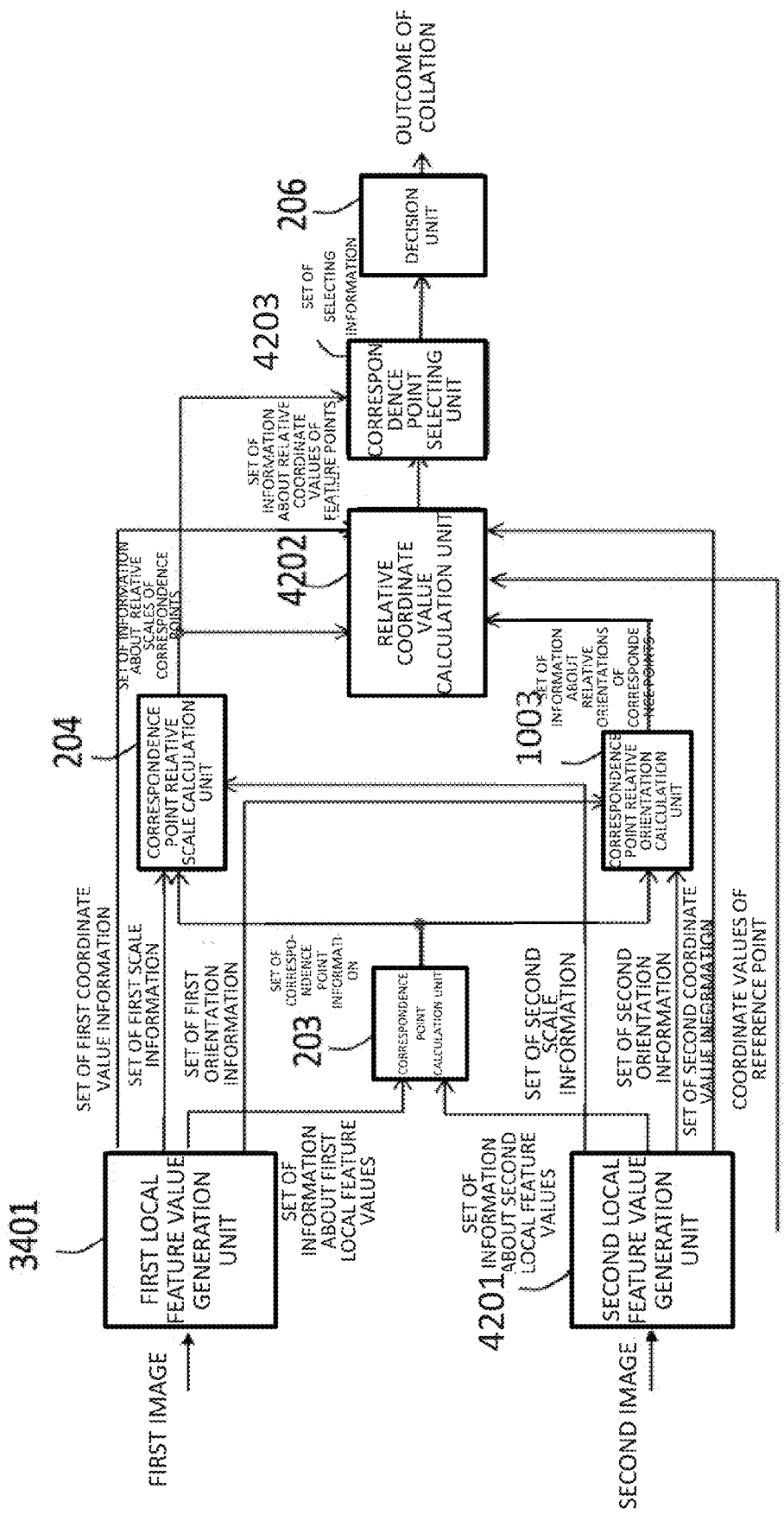
FIG. 42 is a block diagram showing of a configuration of an exemplary embodiment 7.

FIG. 42 depicts a block diagram showing a functional configuration of an image processing apparatus 420 according to an exemplary embodiment 7. Referring to FIG. 42, the image processing apparatus 420 is similar in configuration to the image processing apparatus 140 shown in FIG. 14, with the difference residing in the configuration as well as the operation of a second local feature value generation unit 4201, a relative coordinate value calculation unit 4202 and a correspondence point selecting unit 4203.

(Generation of Feature Values)

A first local feature value generation unit 3401 generates a set of first local feature values, a set of the first orientation information and a set of the first coordinate value information, which are respectively output to a correspondence point calculation unit 203, a relative correspondence point orientation calculation unit 1003 and the correspondence point selecting unit 4203. The first local feature value generation unit 3401 also outputs a set of the first scale information, generated by an operation similar to that by the first local feature value generation unit 201, shown in FIG. 2, to a relative correspondence point scale size calculation unit 204.

The second local feature point generation unit 4201 outputs a set of the second local feature values, a set of the second scale information, a set of the second orientation information and a set of the second coordinate value information to the correspondence point calculation unit 203, relative correspondence point scale size calculation unit 204, relative correspondence point orientation calculation unit 1003 and the relative coordinate value calculation unit 4202, respectively.

(Generation of Relative Coordinate Values)

The relative coordinate value calculation unit 4202 transforms coordinate values of a feature point of the first image into a point on an optional coordinate system, using a set of information about the relative scale size of the correspondence points that the relative correspondence point scale size calculation unit 204 has output, a set of the relative correspondence point orientation information that the relative correspondence point orientation calculation unit 1003 has output, the set of the first coordinate value information that the first local feature value generation unit 3401 has output, the set of the second coordinate value information that the second local feature point generation unit 4201 has output, and coordinate values of a reference point. The relative coordinate value calculation unit 4202 outputs the so transformed coordinate values, referred to below as relative coordinate values of the correspondence points, to the correspondence point selecting unit 4203. By the reference point is meant a preset coordinate value which may e.g., be an optional point in a coordinate system which is the same Cartesian coordinate system as that used for the second image. In the following explanation, a center point of a photographic subject is assumed to be the reference point.

The following details how to calculate the relative coordinate values of the correspondence points.

The relative coordinate value calculation unit 4202 calculates a center point of each photographic subject in the first image, based on the coordinate values of a reference point, as an optional reference point in the second image, such as a center point of the photographic subject, the set of the second coordinate value information, the set of information about the relative scale size of the correspondence points, the set of the information about the relative orientation of the correspondence points and the set of the first coordinate value information. The relative coordinate value calculation unit 4202 outputs a set of the information about the relative coordinate values, formed by the center point of the photographic subject calculated, to the correspondence point selecting unit 4203.

To calculate the relative coordinate values of the correspondence points, an equation shown by the following equation 7:

$$c_{ij} = v_i + \left( \sigma_{ij} \times \begin{pmatrix} \cos\rho_{ij} & -\sin\rho_{ij} \\ \sin\rho_{ij} & \cos\rho_{ij} \end{pmatrix} \times u'_j \right) \quad \text{[Equation 7]}$$

may be used, in which i and j denote feature point numbers of the first and second images, respectively, $v_i$ denotes a coordinate value of an i'th feature point of the first image, $\sigma_{ij}$ a relative scale size of a correspondence point, $\rho_{ij}$ a relative orientation of the correspondence point, $c_{ij}$ a coordinate value of the center of a photographic subject in the first image, and $u'_j$ a vector from a j'th feature point of the second image to the center of the photographic subject in the second image. The vector may be calculated e.g., in accordance with the following equation 8:

$$u'_j = [x_c - x_j, y_c - y_j]^T \quad \text{[Equation 8]}$$

where $x_j$ denotes an x coordinate value of the j'th feature point, $y_j$ a y coordinate value of the j'th feature point, $x_c$ an x coordinate value of a reference point of the second image selected and $y_c$ a y coordinate value of the reference point of the second image.

(Selecting of Correspondence Points)

The correspondence point selecting unit 4203 performs clustering on the feature points, contained in the first image, using a set of the relative coordinate value information that the relative coordinate value calculation unit 4202 has output, and a set of information about the relative scale size of the correspondence points that the relative correspondence point scale size calculation unit 204 has output. The correspondence point selecting unit 4203 selects feature points, based on an outcome of the clustering, so as to output a set of the information selected. The selecting of the feature points as well as the outputting of the set of the information selected is the same as in the above described exemplary embodiments and hence is not clarified in detail.

For clustering on the feature points based on the set of relative scale size of the correspondence points and for selecting the correspondence points, the correspondence point selecting unit 4203 may use e.g., a method similar to that used in the exemplary embodiment 6. For clustering on the feature points based on the set of the relative coordinate value information and for selecting the correspondence points, the correspondence point selecting unit may use a method similar to that used in the exemplary embodiment 6 to perform clustering on the correspondence points based on the set of the first coordinate value information.

The relative coordinate value calculation unit 4202 may not use e.g., the coordinate values of the reference point. In such case, the relative coordinate value calculation unit 4202 and the correspondence point selecting unit 4203 may operate in the following manner.

The relative coordinate value calculation unit 4202 calculates relative displacement of each feature point in the first image and each feature point in the second image, based on the set of the second coordinate value information, set of information about the relative scale size of the correspondence points, set of the information about the relative orientations of the correspondence points and the set of the first coordinate value information. The relative coordinate value calculation unit 4202 outputs the set of the relative coordinate value information, made up of the relative displacements calculated, to the correspondence point selecting unit 4203.

In such case, an equation indicated by the following equation 9:

$$v_{ij} = \sigma_{ij} \times \begin{pmatrix} \cos\rho_{ij} & -\sin\rho_{ij} \\ \sin\rho_{ij} & \cos\rho_{ij} \end{pmatrix} \times v_i - v_j \quad \text{[Equation 9]}$$

may be used to calculate the relative coordinate values of the correspondence points. In the above equation, $v_{ij}$ denotes the relative displacement and $v_j$ the coordinate value of the j'th feature point in the second image.

The relative displacements of the correspondence points of the photographic subjects, which are the same between images, are constant, so that, in performing clustering on feature points or selecting correspondence points based on the set of the relative coordinate value information, for example, the correspondence point selecting unit 4203 may use a method similar to that used in the exemplary embodiment 6 to perform clustering on the feature points based on the set of the first coordinate value information.

If the coordinate values of the reference point are not entered, the relative coordinate value calculation unit 4202 may calculate the set of the relative coordinate value information in the same manner as described above. Though not indicated explicitly, the same also applies for the exemplary embodiments to follow.

(Operation of Exemplary Embodiment 7)

Figure 43:
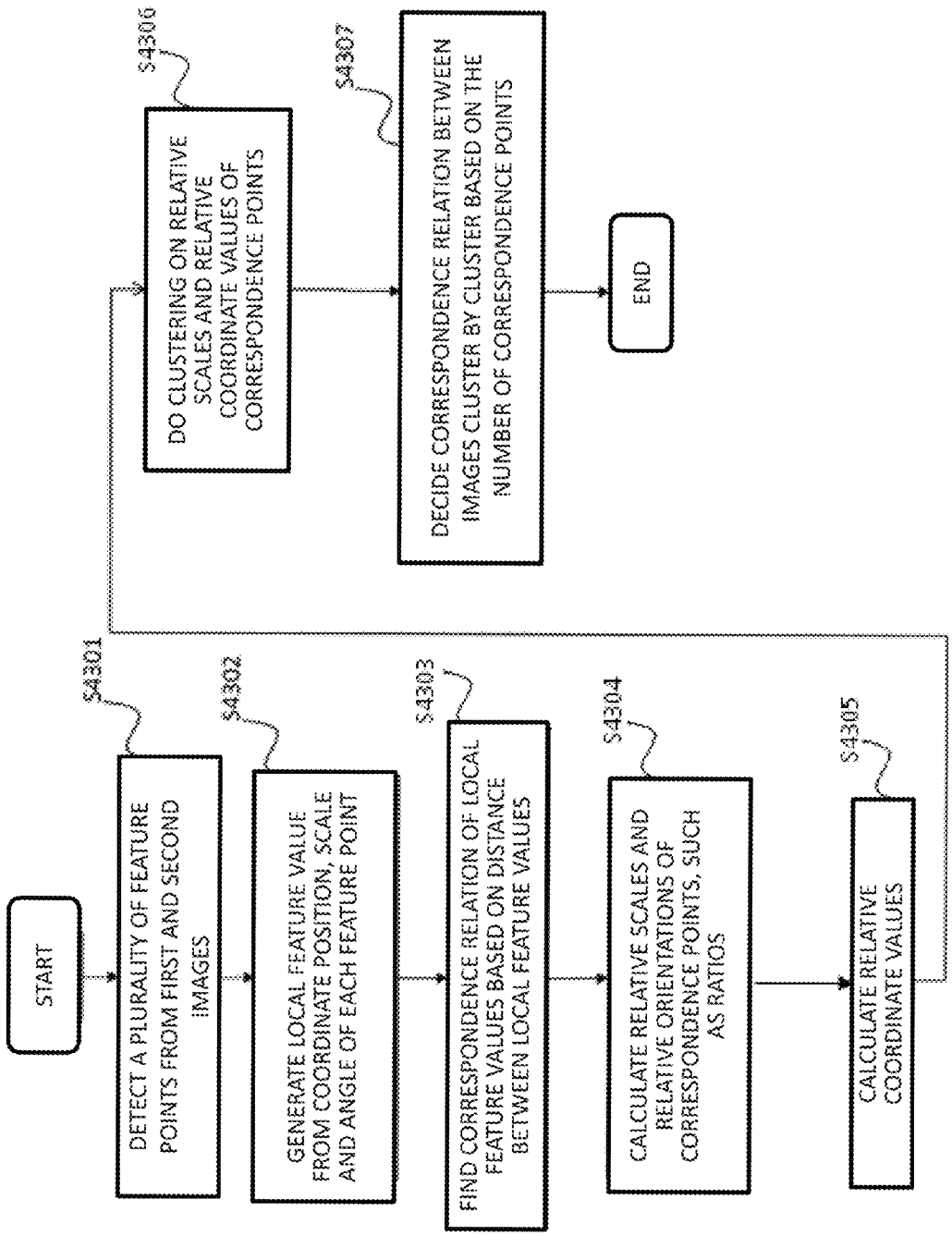
FIG. 43 is a flowchart showing the operation of the exemplary embodiment 7.

Referring to FIG. 43, depicting a flowchart showing the operation of the present exemplary embodiment, the operation thereof will be explained in detail. The steps S4301 through S4303 and S4306 shown in FIG. 43 are the same as the steps S301 through S303 and S306, described above, and hence are not here stated in detail.

After carrying out the processing of the steps S4301 through S4303, shown in FIG. 43, the relative correspondence point scale size calculation unit 204 calculates scale relationships, based on the set of the first scale information, set of the second scale information and the set of the information about the correspondence points, while the relative correspondence point orientation calculation unit 1003 calculates the information about the relative orientations of the correspondence points, based on the set of the first orientation information, the set of the second orientation information and the set of the information about correspondence points (step S4304). The relative coordinate value calculation unit 4202 calculates the relative coordinate values, using the set of information about the relative scale size of the correspondence points, the set of the information about the relative orientations of the correspondence points, the coordinate values of the reference point, the set of the first coordinate value information and the set of the second coordinate value information (step S4305). The correspondence point selecting unit 4203 performs clustering on the feature points, based on the set of the relative coordinate value information and the set of information about the relative scale size of the correspondence points, and selects the feature points based on an outcome of the clustering (step S4306). Processing then transfers to a step S4307 shown in FIG. 43.

(Advantageous Effects of Exemplary Embodiment 7)

With the exemplary embodiment 7, not only may the advantageous effects similar to those of the exemplary embodiment 1 be obtained, but also may the feature points be grouped more accurately than with the exemplary embodiment 1, for the feature points of the first image are collected about the center of the photographic subject before proceeding to clustering. Thus, in the exemplary embodiment 7, the same or analogous photographic subjects in the image can be identified more accurately than with the exemplary embodiment 1.

Certain modifications of the above described exemplary embodiments will now be illustrated.

[Modification 1]

Figure 8:
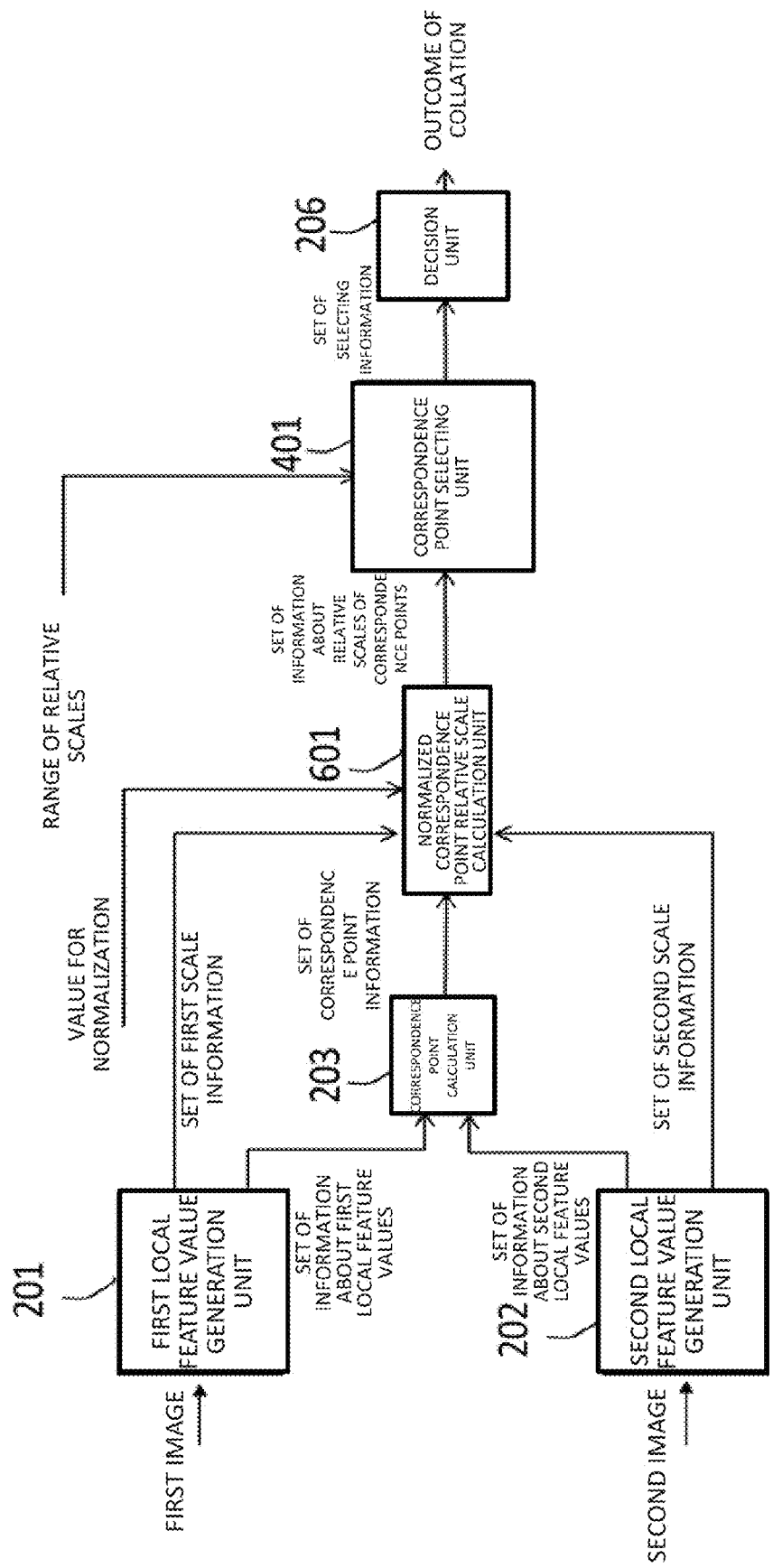
FIG. 8 is a block diagram showing a configuration of a modification 1.

A modification 1 will now be illustrated with reference to FIG. 8, which is a block diagram showing a functional configuration of an image processing apparatus 80 according to the modification 1. Referring to FIG. 8, the image processing apparatus 80 is similar in configuration to the image processing apparatus 60, shown in FIG. 6, with the difference being the configuration as well as the operation of a correspondence point selecting unit 401. Incidentally, the correspondence point selecting unit 401 is similar in configuration as well as operation to the exemplary embodiment 2 and hence is not here illustrated in detail (Operation of Modification 1)

Figure 9:
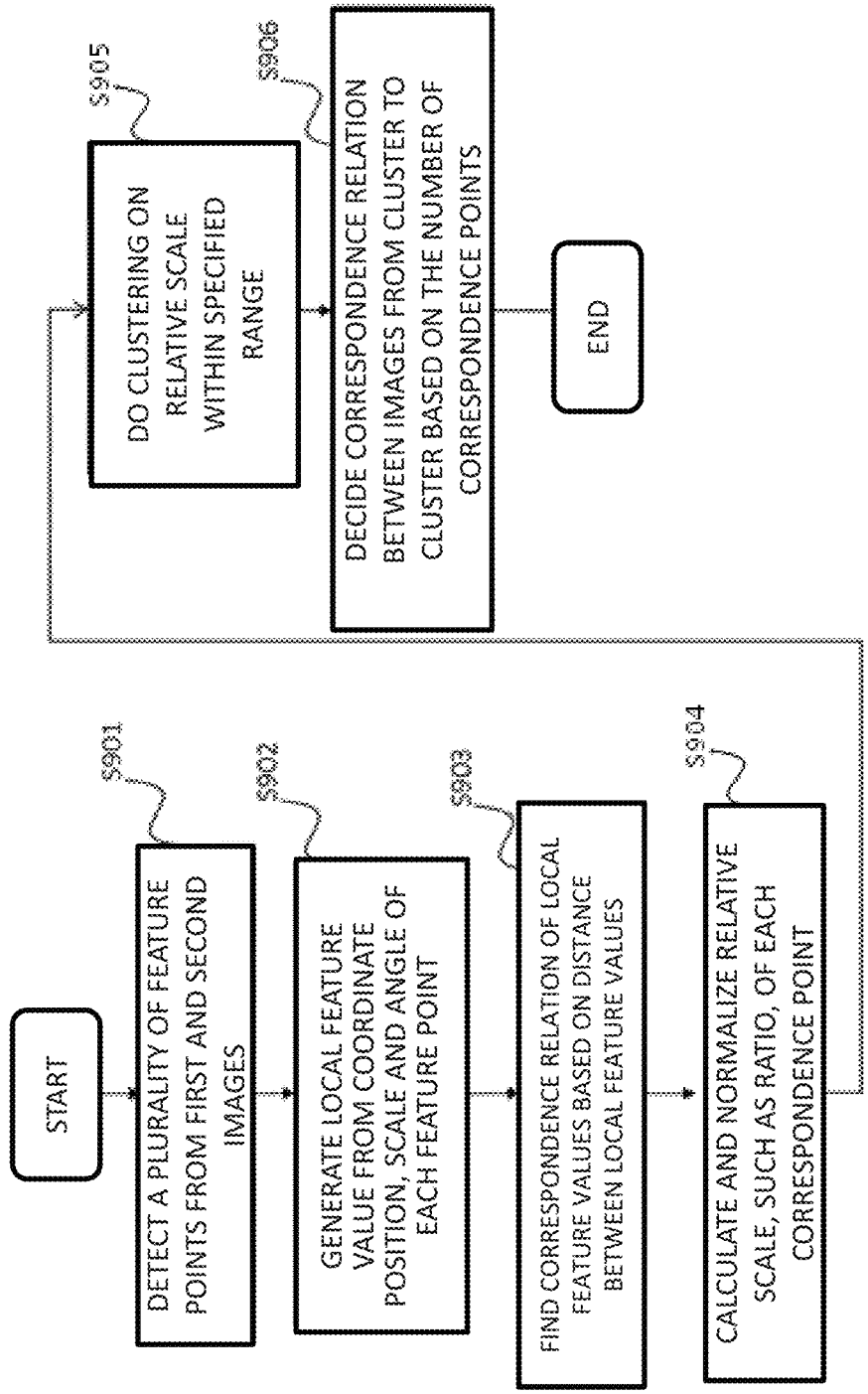
FIG. 9 is a flowchart showing the operation of the modification 1.

The modification 1 will now be illustrated with reference to FIG. 9, which FIG. 9 depicts a flowchart showing the operation of the modification 1. Since the steps S901 through S903 and S906 shown in FIG. 9 are the same as the steps S301 through S303 and S306, shown in FIG. 3, a detailed explanation is dispensed with.

After carrying out the processing of the steps S901 through S903, shown in FIG. 9, a normalized relative correspondence point scale size calculation unit 601 calculates scale relationships, using a set of the first scale information, a set of the second scale information and a set of the information about correspondence points, and normalizes the scale relationships based on an image size of the photographic subject or its real size or entity size (step S904). The correspondence point selecting unit 401 performs clustering on the feature points, based on a set of the information about the normalized relative scale size of the correspondence points and a range of the relative scale size to select the feature points based on an outcome of the clustering (step S905). Processing then transfers to a step S906 shown in FIG. 9.

(Advantageous Effects of Modification 1)

With the modification 1, not only may the advantageous results similar to those of the exemplary embodiment 3 be obtained, but also the volume of computations may be reduced as compared with the exemplary embodiment 3, for only the feature points having the normalized relative scale size information within the range of the relative scale size are selected by clustering.

[Modification 2]

Figure 12:
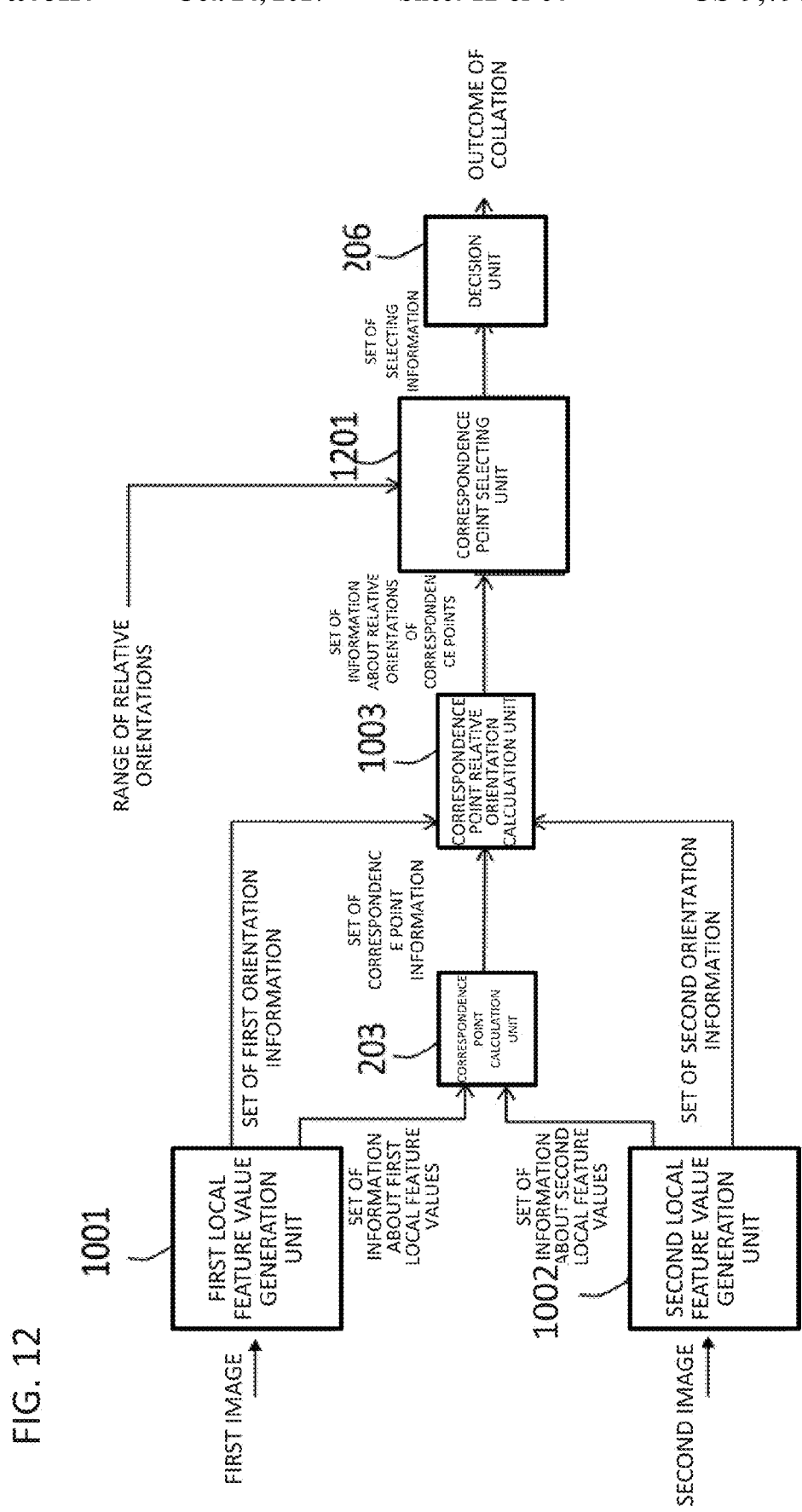
FIG. 12 is a block diagram showing a configuration of a modification 2.

Referring to FIG. 12, the modification 2 will be illustrated. FIG. 12 depicts a block diagram showing a functional configuration of an image processing apparatus 120 according to the modification 2. Referring to FIG. 12, the image processing apparatus 120 is similar in configuration to the image processing apparatus 100, shown in FIG. 10, with the difference residing in the configuration as well as the operation of a correspondence point selecting unit 1201.

The correspondence point selecting unit 1201 performs clustering on the feature points, contained in the first image, using a set of the information about the relative orientations of the correspondence points that the relative correspondence point orientation calculation unit 1003 has output, and the range(s) of the relative scale size The range(s) of the relative orientation may be of values obtained by experience or observation, values obtained by machine leaning using learning data or values calculated from a set of the information about the relative orientations of the correspondence points by teacherless clustering. The number of the ranges of the relative orientations may be one or any suitable plural number.

If the matching of the feature points between different images is correct, the information about the relative orientations of the correspondence points is constant from one photographic subject to another. It is thus sufficient for the correspondence point selecting unit 1201 to group the feature points having the relative orientation information distributed within the range of the relative orientations in the same cluster. For doing clustering on the feature points and selecting the correspondence points, e.g., a method similar to that used in the modification 1 may be used.

(Operation of Modification 2)

Figure 13:
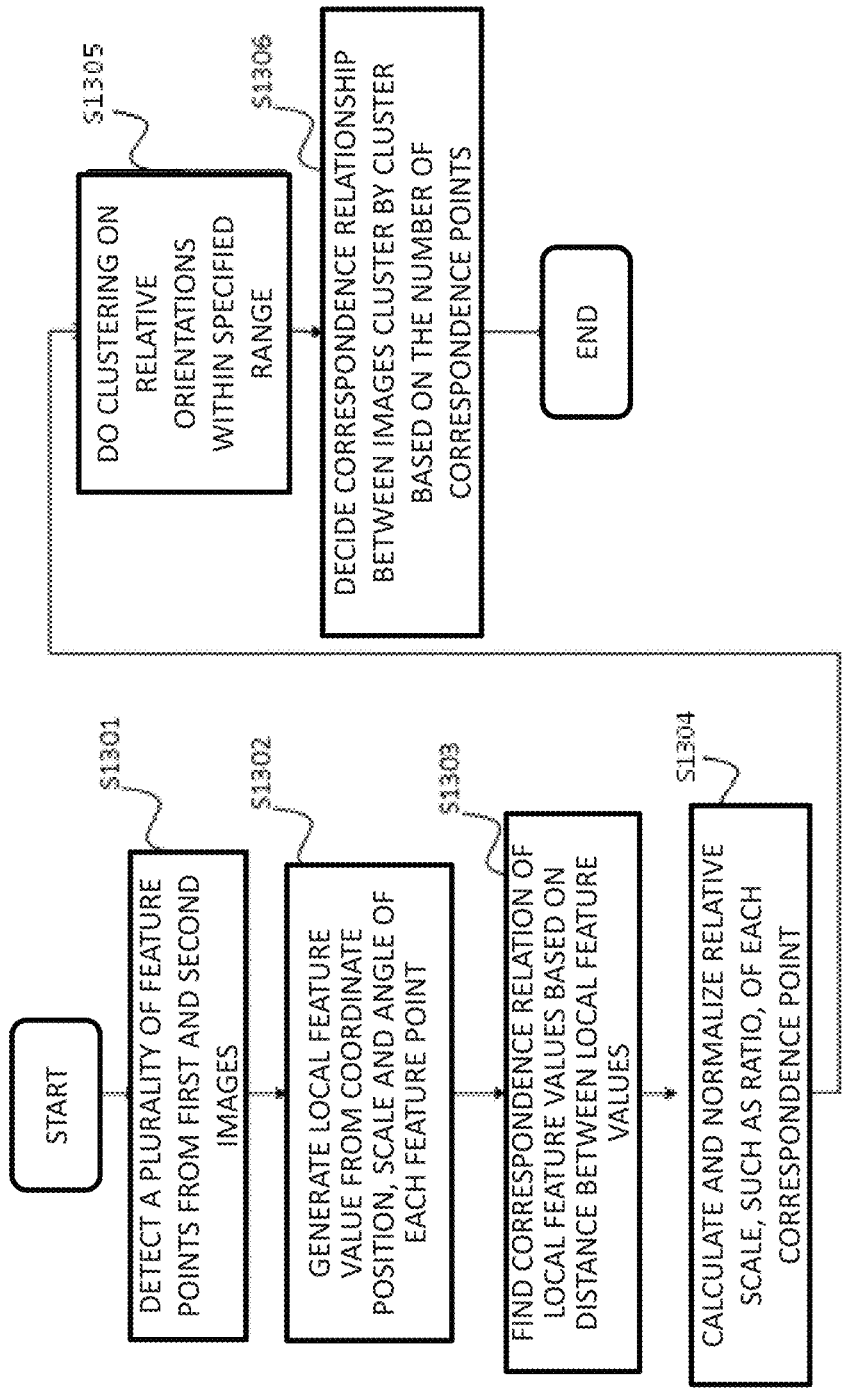
FIG. 13 is a flowchart showing the operation of the modification 2.

FIG. 13 depicts a flowchart showing the operation of the modification 2. Referring to FIG. 13, the operation of the modification 2 will be stated in detail. The steps S1301 through S1303 and S1306 shown in FIG. 13 are the same as the steps S301 through S303 and S306, shown in FIG. 3, and hence are not illustrated here in detail.

After carrying out the processing of the steps S1301 through S1303, shown in FIG. 13, the relative correspondence point orientation calculation unit 1003 calculates the information about the relative orientations of the correspondence points, based on a set of the first orientation information, a set of the second orientation information and a set of the information about correspondence points (step S1304). The correspondence point selecting unit 1201 performs clustering on the feature points, based on a set of the information about the relative orientations of the correspondence points and a range of the relative orientations, and selects the feature points based on an outcome of the clustering (step S1305). Processing then transfers to the step S1306 shown in FIG. 13.

(Advantageous Effects of Modification 2)

With the modification 2, the advantageous effects similar to those of the exemplary embodiment 4 may be obtained. In addition, the volume of computations may be smaller than in the exemplary embodiment 4, since clustering is performed only on feature points having the orientation information within the range of the relative orientations.

[Modification 3]

Figure 16:
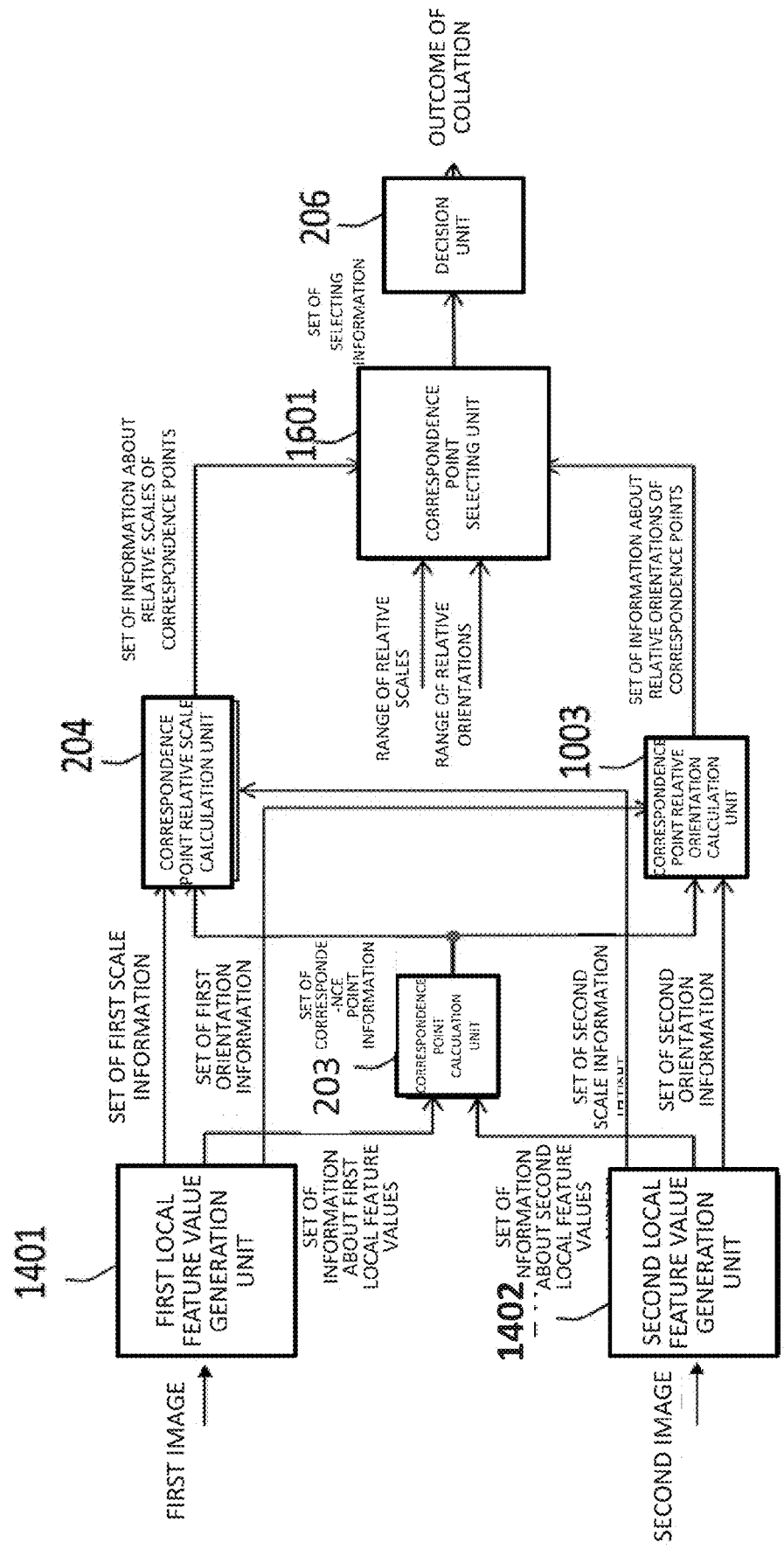
FIG. 16 is a block diagram showing a configuration of a modification 3.

A modification 3 will now be illustrated with reference to FIG. 16, which is a block diagram showing a functional configuration of an image processing apparatus 160 according to the modification 3. Referring to FIG. 16, the image processing apparatus 160 is similar in configuration to the image processing apparatus 140 shown in FIG. 14, with the difference residing in the configuration as well as the operation of a correspondence point selecting unit 1601.

The correspondence point selecting unit 1601 performs clustering on the feature points, contained in the first image, using a set of information about the relative scale size of the correspondence points, a set of the information about the relative orientations of the correspondence points, a range of the relative scale size of the correspondence points, and a range of the relative orientations of the correspondence points, wherein a relative correspondence point scale size calculation unit 204 has output the set of the information about the relative orientations of the correspondence points, and a relative correspondence point orientation calculation unit 1003 has output the set of the information about the relative orientations of the correspondence points If the correlation or matching of the feature points between the images is correct, the information about the relative scale size values and the relative orientations of the correspondence points become constant from one photographic subject to another. It is thus sufficient for the correspondence point selecting unit 1601 to group the feature points, having information about the relative scale size of the correspondence points, the information about the relative orientations of the correspondence points, distributed in the range of the relative orientations, and the information about the relative orientations of the correspondence points, to the same cluster. For clustering on the feature points and selecting the correspondence points, a method similar to one used in the exemplary embodiment 5 may be used.

(Operation of Modification 3)

The operation of the modification 3 will now be illustrated with reference to FIG. 17 that depicts a flowchart showing the operation of the modification 3. The steps S1701 through S1703 and S1706 shown in FIG. 17 are the same as the steps S301 through S303 and S306, shown in FIG. 3, and hence a detailed explanation here is dispensed with.

Figure 17:
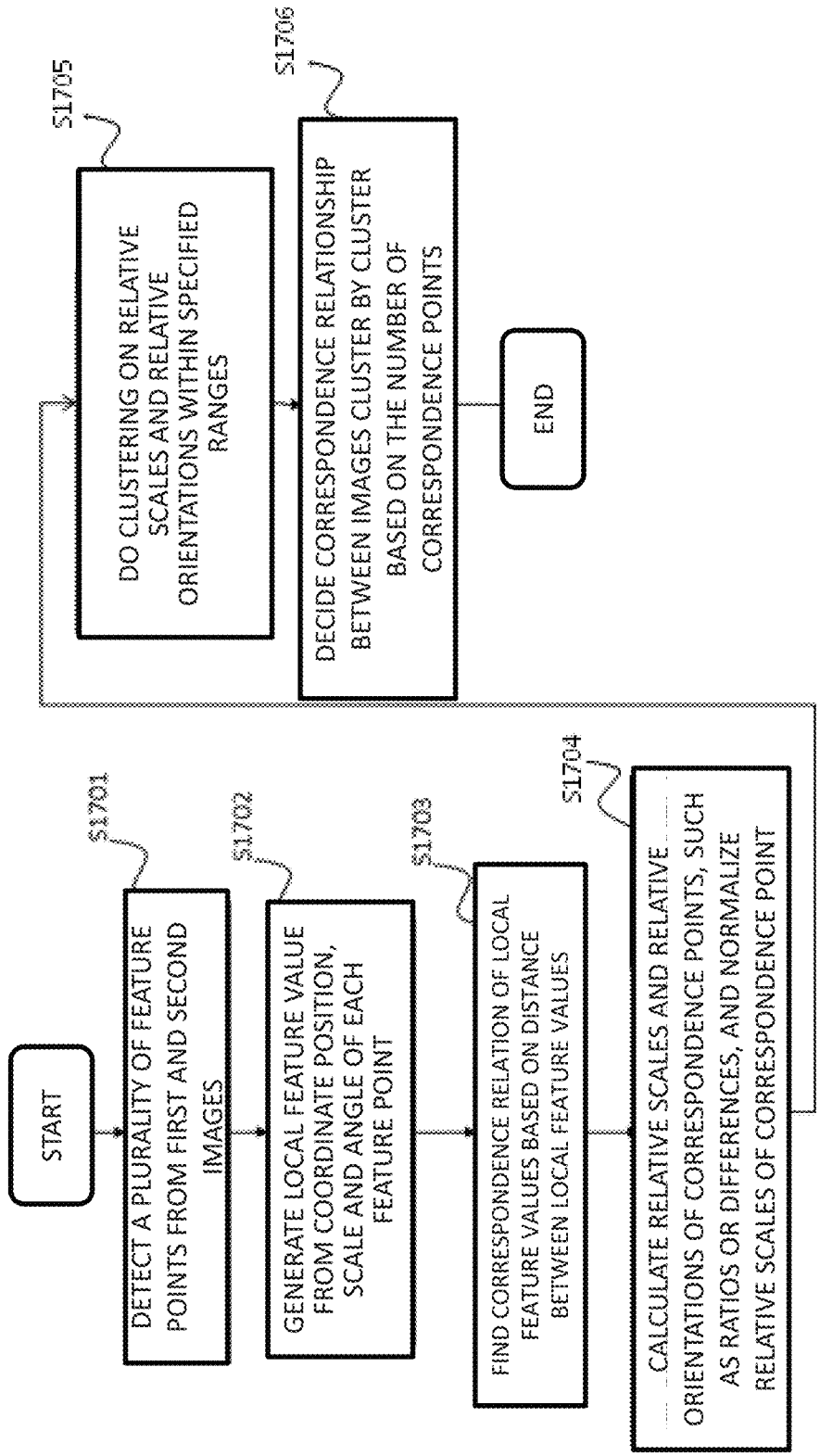
FIG. 17 is a flowchart showing the operation of the modification 3.

After executing the processing of the steps S1701 through S1703, shown in FIG. 17, the relative correspondence point scale size calculation unit 204 calculates scale relationships, based on a set of the first scale information, a set of the second scale information and a set of the information about correspondence points. The relative correspondence point orientation calculation unit 1003 calculates the information about the relative orientations of the correspondence points, based on a set of the first orientation information, a set of the second orientation information and the set of the information about correspondence points (step S1704). The correspondence point selecting unit 1601 performs clustering on the feature points, based on a set of information about the relative scale size of the correspondence points, a set of the information about the relative orientations of the correspondence points, a range of the relative scale size and a range of the relative orientations, and selects the feature points based on an outcome of the clustering (step S1705). Processing then transfers to the step S1706 shown in FIG. 17.

(Advantageous Effects of Modification 3)

With the modification 3, the advantageous effects similar to those of the exemplary embodiment 5 may be obtained. In addition, the volume of computations may be lesser than that with the exemplary embodiment 5, since clustering is performed just on the feature points having the information about the relative scale size of the correspondence points within the range of the relative scale size and the information about the relative orientations of the correspondence points within the range of the relative orientations.

[Modification 4]

Figure 18:
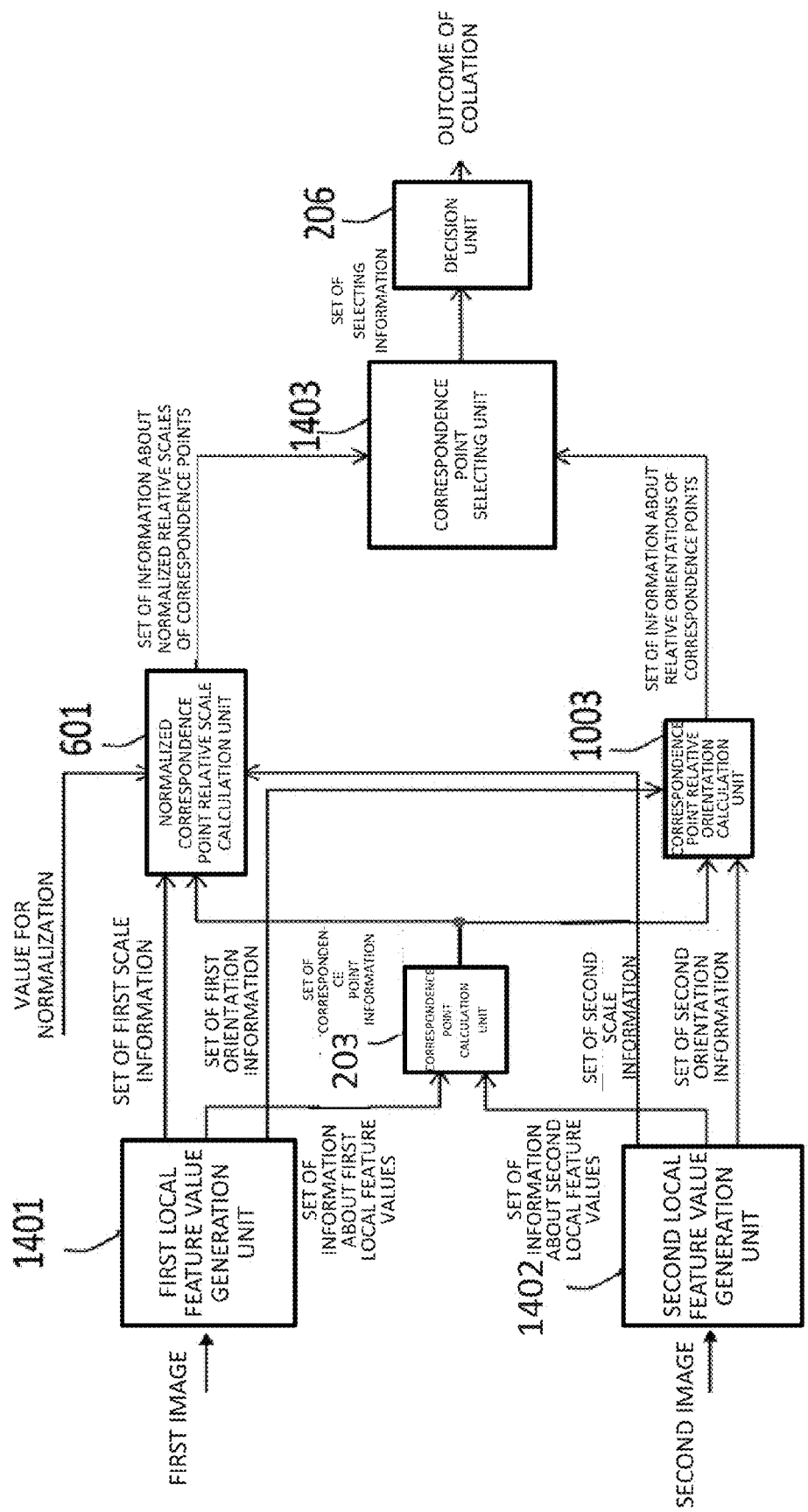
FIG. 18 is a block diagram showing a configuration of a modification 4.

A modification 4 will now be illustrated with reference to FIG. 18, which is a block diagram showing a functional configuration of an image processing apparatus 180 according to the modification 4. Referring to FIG. 18, the image processing apparatus 180 is similar in configuration to the image processing apparatus 140 shown in FIG. 14, with the difference residing in the configuration as well as the operation of a normalized relative correspondence point scale size calculation unit 601. The operation of the normalized relative correspondence point scale size calculation unit 601 is similar to that of the modification 1 and hence is not clarified here in detail.

(Operation of Modification 4)

The operation of the modification 4 will be illustrated in detail with reference to FIG. 19 which shows a flowchart illustrating the operation. The steps S1901 through S1903 and S1906 shown in FIG. 19 are the same as the steps S301 through S303 and S306, shown in FIG. 3, and hence are not here detailed.

Figure 19:
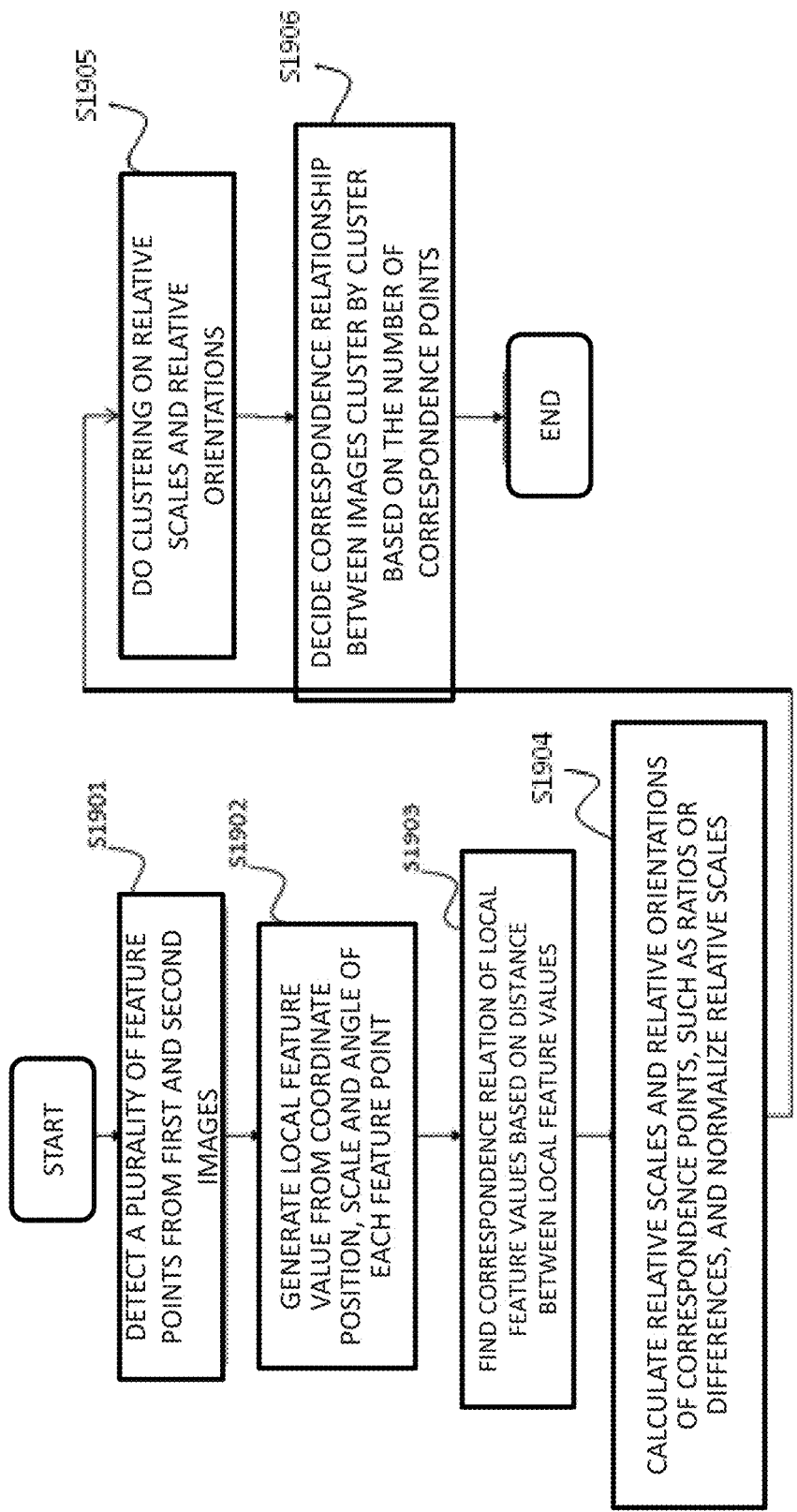
FIG. 19 is a flowchart showing the operation of the modification 4.

After executing the processing of the steps S1901 through S1903, shown in FIG. 19, the normalized relative correspondence point scale size calculation unit 601 calculates scale relationships, based on a set of the first scale information, a set of the second scale information and a set of the information about correspondence points, and normalizes the so calculated scale relationships based on an image size of the photographic subject or its real size. A relative correspondence point orientation calculation unit 1003 calculates the information about the relative orientations of the correspondence points based on a set of the first orientation information, a set of the second orientation information and the set of the information about correspondence points (step S1904). A correspondence point selecting unit 1403 performs clustering on the feature points, based on the information about the normalized relative scale size of the correspondence points and the information about the relative orientations of the correspondence points, and selects the feature points based on an outcome of the clustering (step S1905). Processing then transfers to the step S1906 shown in FIG. 19.

(Advantageous Effects of Modification 4)

With the modification 4, the same advantageous effects as those of the exemplary embodiment 5 may be obtained. In addition, in case the relative scale sizes between the feature points, correctly matched between the images, are normalized, the normalized relative scale sizes of the correspondence points become constant from one photographic subject in the first image to another. Hence, the photographic subjects can be identified more correctly than in the exemplary embodiment 5.

[Modification 5]

Figure 20:
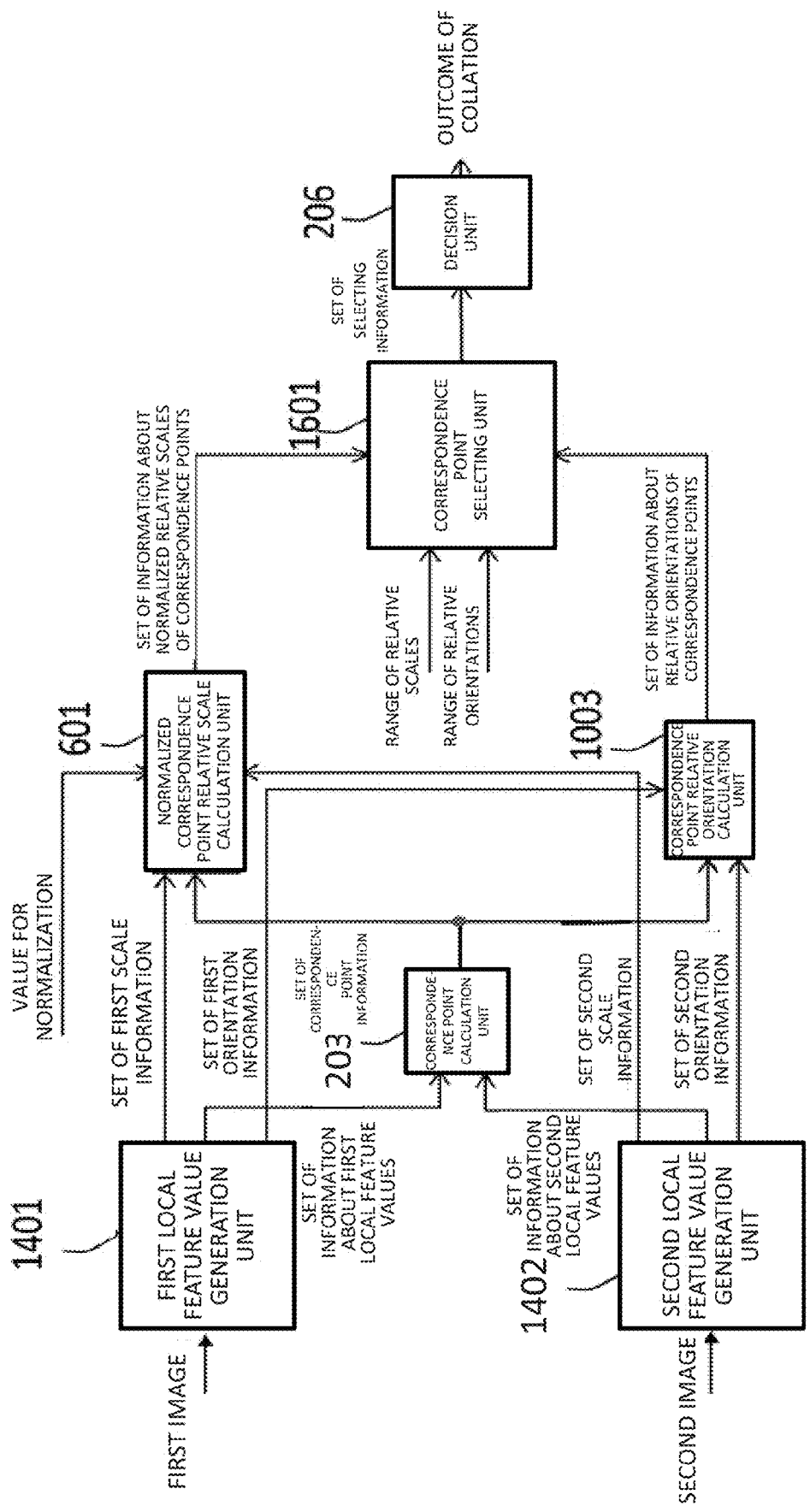
FIG. 20 is a block diagram showing a configuration of a modification 5.

A modification 5 will now be illustrated with reference to FIG. 20, which is a block diagram showing a functional configuration of an image processing apparatus 200 according to the modification 5. Referring to FIG. 20, the image processing apparatus 200 is similar in configuration to the image processing apparatus 180 shown in FIG. 18, with the difference residing in the configuration as well as the operation of a correspondence point selecting unit 1601. The operation of the correspondence point selecting unit 1601 is similar to that of the modification 3 and hence the corresponding description is dispensed with.

The operation of the modification 5 will be described in detail with reference to FIG. 21 which shows a flowchart illustrating the operation. Since the steps S2101 through S2103 and S2106 shown in FIG. 21 are the same as the steps S301 through S303 and S306, shown in FIG. 3, a detailed explanation here is dispensed with.

Figure 21:
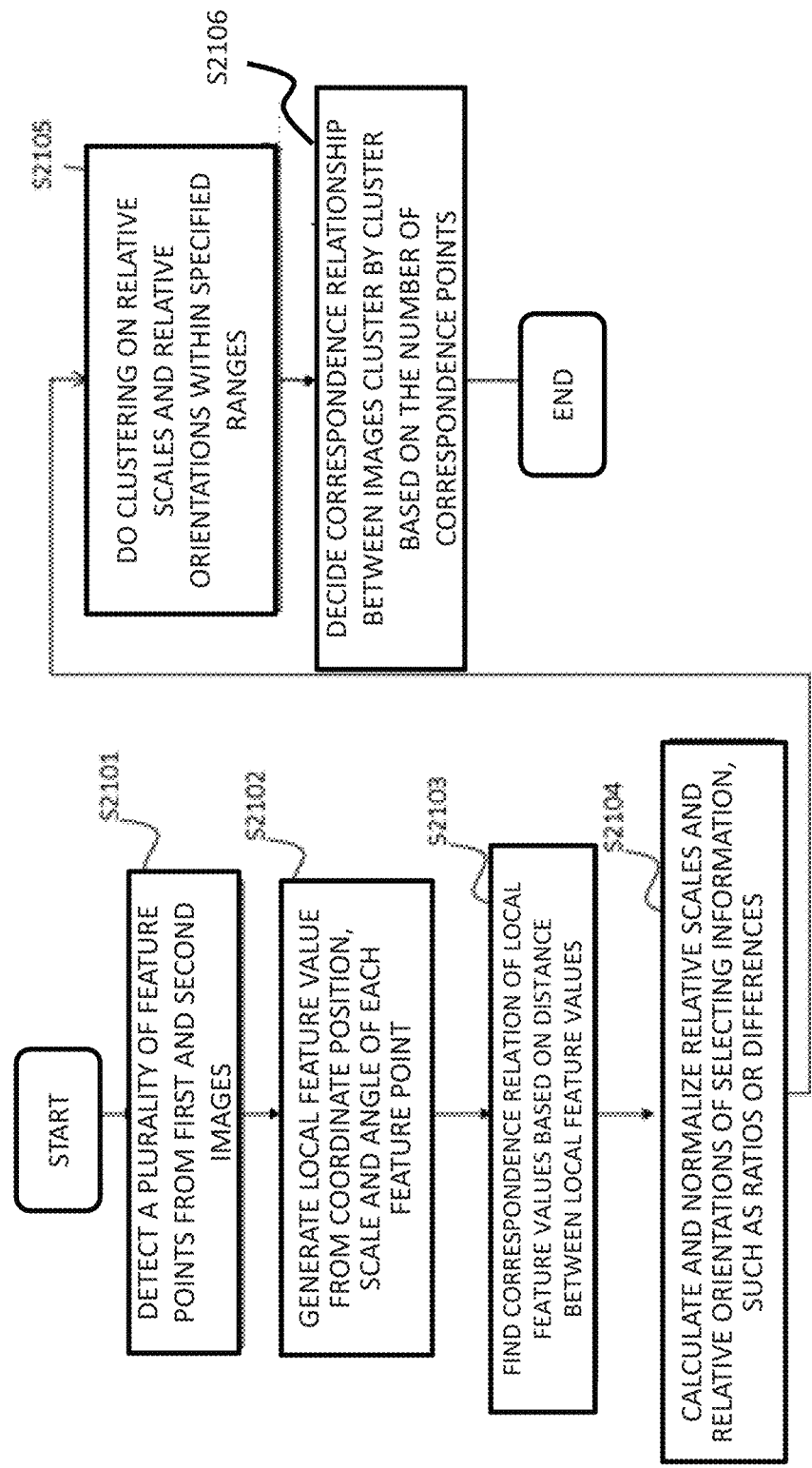
FIG. 21 is a flowchart showing the operation of the modification 5.

After executing the processing of the steps S2101 through S2103, shown in FIG. 21, the normalized relative correspondence point scale size calculation unit 601 calculates scale relationships, based on a set of the first scale information, a set of the second scale information and a set of the information about correspondence points, and normalizes the so calculated scale relationships based on an image size of the photographic subject or its real size. A relative correspondence point orientation calculation unit 1003 calculates the information about the relative orientations of the correspondence points, using a set of the first orientation information, a set of the second orientation information and the set of the information about correspondence points (step S2104). The correspondence point selecting unit 1601 performs clustering on the feature points, based on a set of the information about the normalized relative scale size of the correspondence points, a set of the information about the relative orientations of the correspondence points, a range of the relative scale size and a range of the relative orientations, and selects the feature points based on an outcome of the clustering (step S2105). Processing then transfers to the step S2106 shown in FIG. 21.

(Advantageous Effects of the Modification 5)

With the modification 5, the advantageous effects similar to those of the modification 4 may be obtained. In addition, clustering is performed only on the feature points having the normalized relative scale sizes within the range of the relative scale sizes and the feature points having the orientation information within the range of the relative orientations, and hence the computational volume may be lesser than with the modification 4.

[Modification 6]

Figure 24:
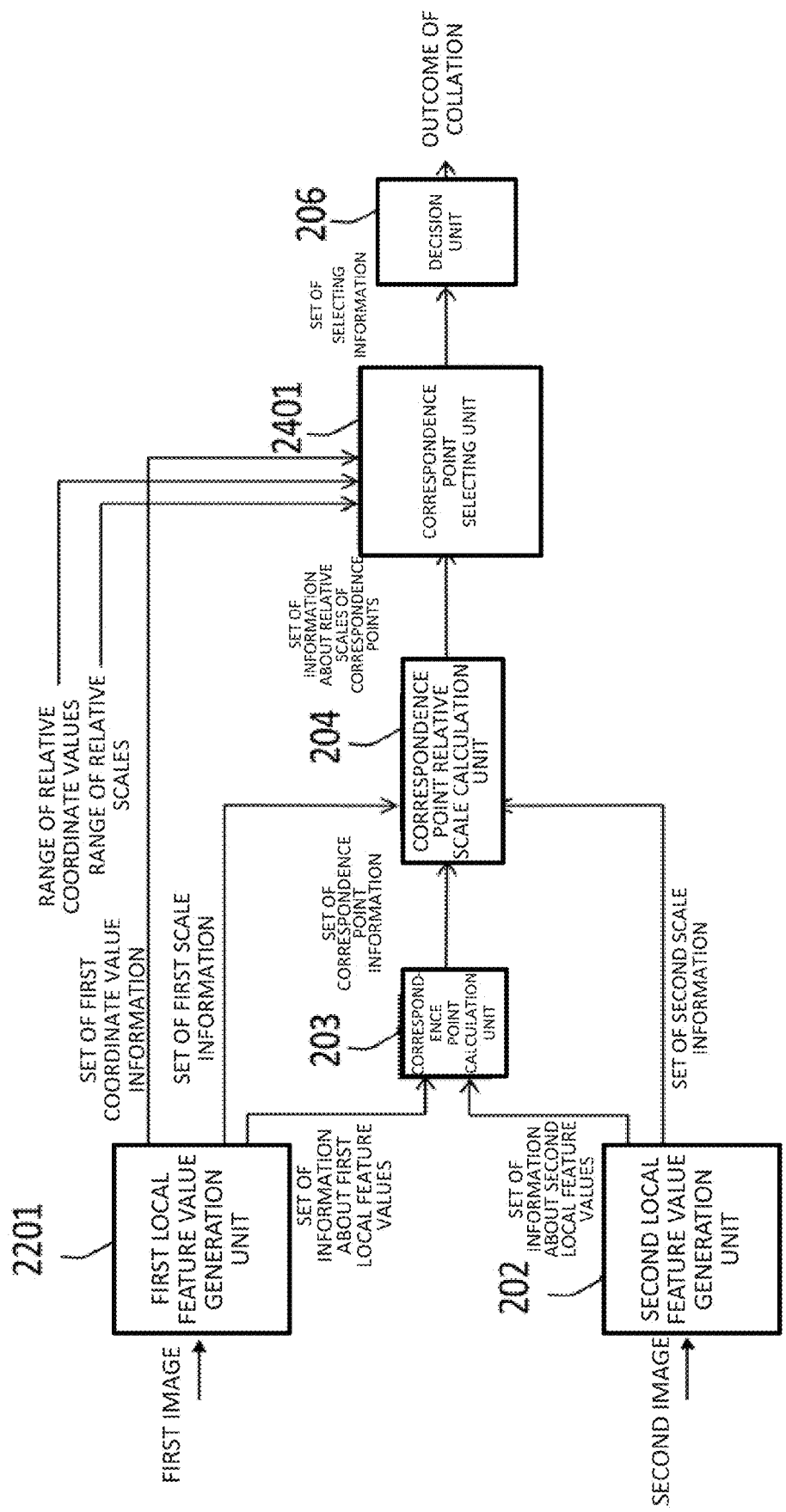
FIG. 24 is a block diagram showing a configuration of a modification 6.

A modification 6 will be illustrated with reference to FIG. 24 showing a block diagram illustrating a functional configuration of an image processing apparatus 240 according to the modification 6. Referring to FIG. 24, the image processing apparatus 240 is similar in configuration to the image processing apparatus 220 shown in FIG. 22, with the difference being the configuration as well as the operation of a correspondence point selecting unit 2401.

The correspondence point selecting unit 2401 performs clustering on the feature points, contained in the first image, based on a set of the information about the relative scale sizes of the correspondence points, a range of the relative scale sizes, coordinate values of the feature points, and a range of the coordinate values, wherein a relative correspondence point scale size calculation unit 204 has output the set of the information about the relative scale sizes of the correspondence points, and wherein a first local feature value generation unit 2201 has output the coordinate values of the feature points A range of the relative coordinate values may, for example, be coordinate values representing a range in an image where there exists a range of the photographic subject. To calculate a range in an image where there exists the range of the photographic subject, a rectangle circumscribing the points p and q may be found through experiences or observations. Or the probability of the presence of the photographic subject, indicating in which region in the image the photographic subject is most likely to exist, may be mechanically calculated, using learning data, and such a region having a probability density higher than a preset value may be used as the range where there exists the photographic subject range. One or a plurality of the ranges of the relative coordinate values may be used.

If the correlation or matching of the feature points between different images is correct, the relative scale size values of the correspondence points become constant from one photographic subject to another. It is thus sufficient for the correspondence point selecting unit 2401 to group the feature points having the relative scale sizes distributed within the range of the relative scale sizes in the same cluster. It is also sufficient for the correspondence point selecting unit 2401 to group the feature points situated within the range of the relative coordinate values in the same cluster. For clustering based on the relative scale sizes and for clustering based on the coordinate values, a method similar to one used in the exemplary embodiment 1 or 6 may be used. To select the correspondence points, a method similar to one used in the modification 5 may be used.

It is also possible for the correspondence point selecting unit 2401 to perform clustering on the feature points based on a set of the information about the relative orientations of the correspondence points, select feature points based on the result of the clustering, and then perform clustering on the so selected feature points based on a set of first coordinate value information. It is also possible for the correspondence point selecting unit 2401 to perform clustering on the feature points based e.g., on the set of the first coordinate value information, select feature points based on the results of the clustering and perform clustering on the so selected feature points based on the set of the information about the relative orientations of the correspondence points. The correspondence point selecting unit 2401 may also perform clustering on feature points using both the set of the information about the relative orientations of the correspondence points and the set of the first coordinate value information.

(Operation of Modification 6)

The operation of the modification 6 will be described in detail with reference to FIG. 25 which shows a flowchart illustrating the operation. Since the steps S2501 through S2503 and S2506 shown in FIG. 25 are respectively the same as the steps S301 through S303 and S306, shown in FIG. 3, a detailed explanation is here is dispensed with.

Figure 25:
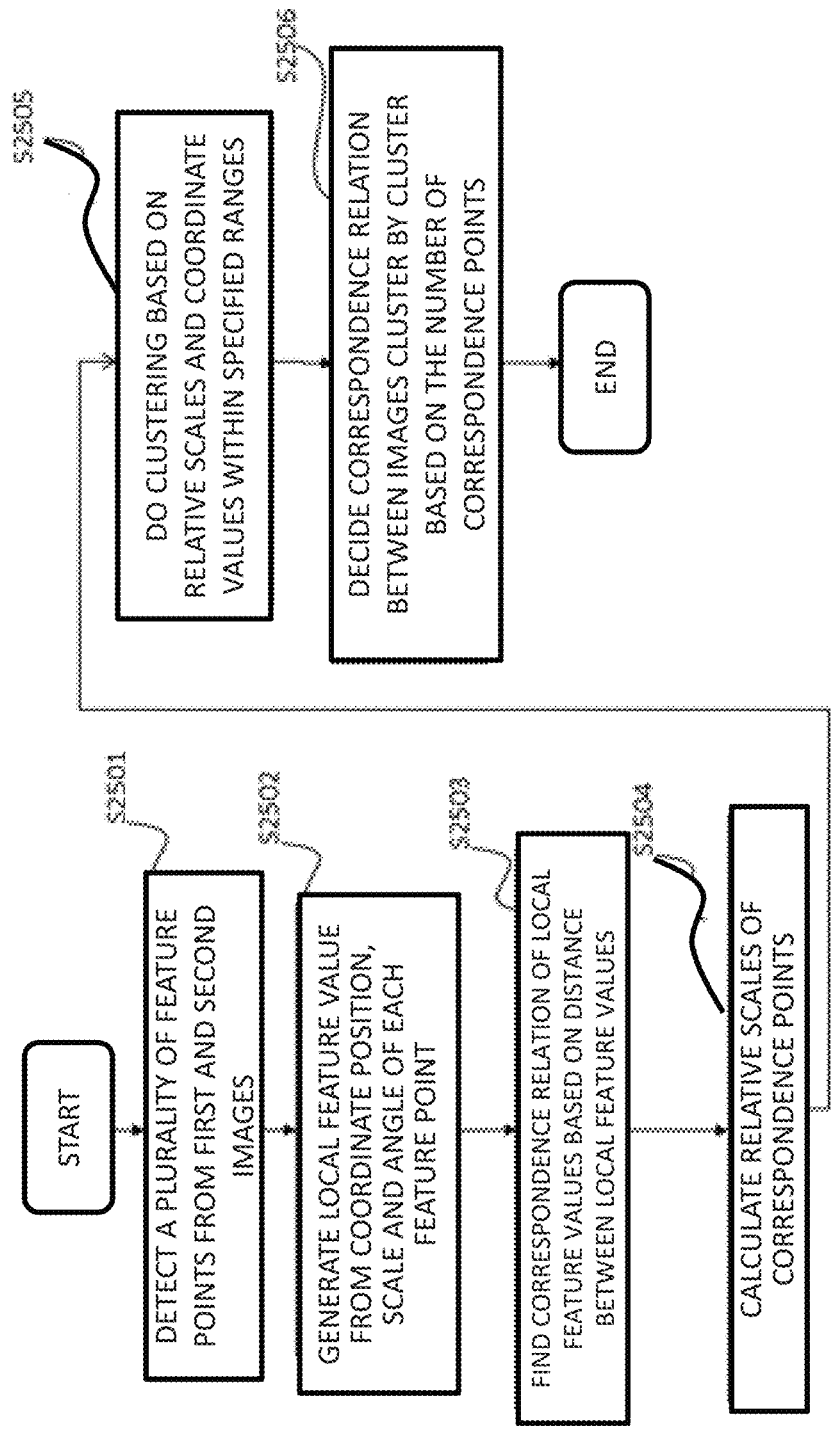
FIG. 25 is a flowchart showing the operation of the modification 6.

After executing the processing of the steps S2501 through S2503, shown in FIG. 25, a relative correspondence point scale size calculation unit 204 calculates scale relationships, using a set of the first scale information, a set of the second scale information and a set of the information about the correspondence points (step S2504). The correspondence point selecting unit 2401 performs clustering on feature points, based on a set of the information about the relative scale sizes of the correspondence points, a set of the first coordinate value information, a range of the relative scale sizes and a range of the relative coordinate values, and selects feature points based on the result of the clustering (S2505). Processing then transfers to the step S2506 shown in FIG. 25.

(Advantageous Effects of Modification 6)

With the modification 6, the advantageous effects similar to those of the exemplary embodiment 6 may be obtained. In addition, the computational volume may be lesser than that in the exemplary embodiment 6, since clustering is performed just on the feature points having relative scale size values within the range of the relative scale sizes and the feature points having coordinate values within the range of the relative coordinate values.

Figure 26:
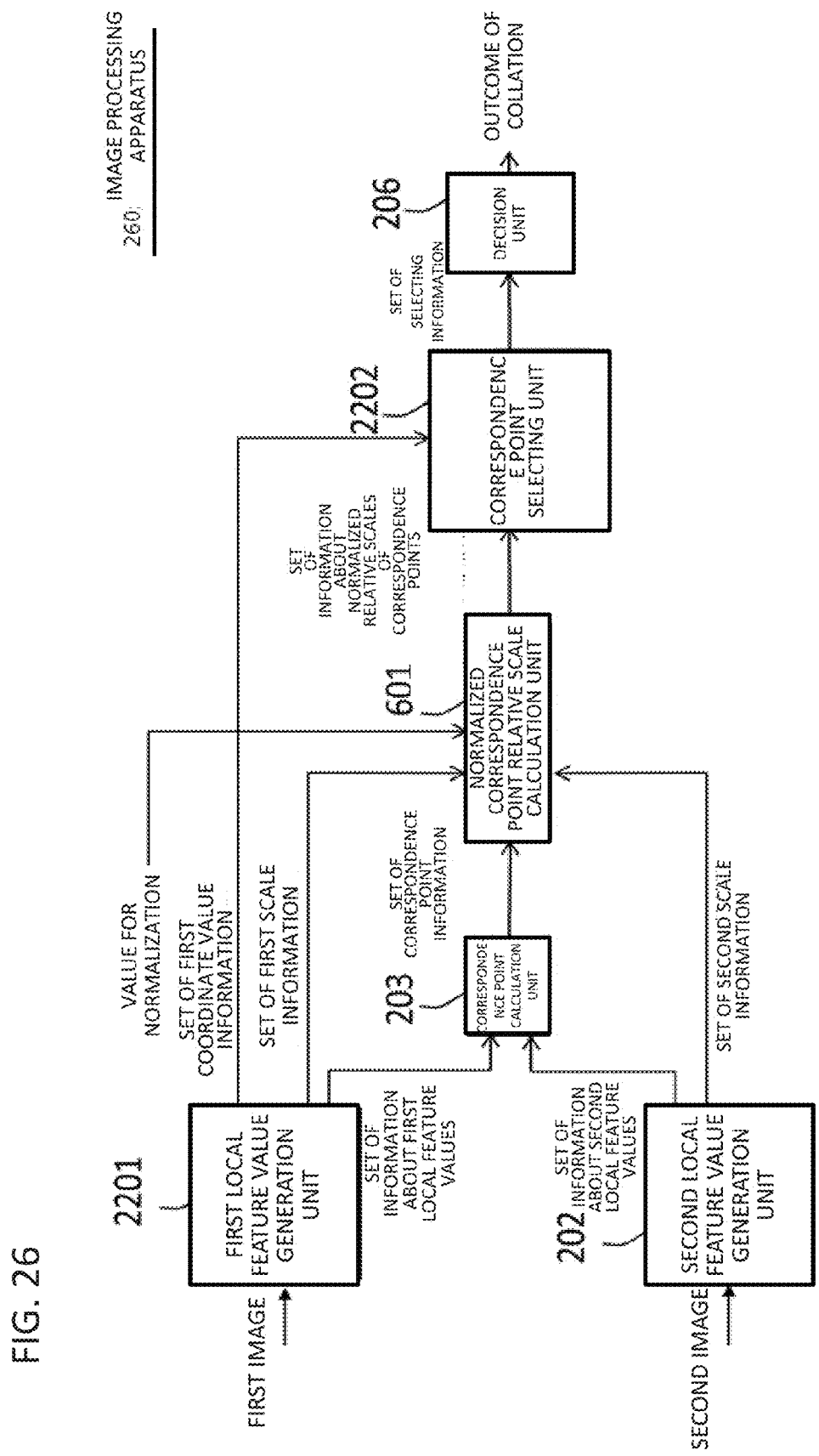
FIG. 26 is a block diagram showing a configuration of a modification 7.

[Modification 7]
Referring now to FIG. 26, a modification 7 will be illustrated. FIG. 26 depicts a block diagram showing a functional configuration of an image processing apparatus 260 according to the modification 7. Referring to FIG. 26, the image processing apparatus 260 is similar in configuration to the image processing apparatus 220 shown in FIG. 22, with the difference being the configuration as well as the operation of a normalized relative correspondence point scale size calculation unit 601. Since the operation of the normalized relative correspondence point scale size calculation unit 601 is the same as in the exemplary embodiment 1, the corresponding explanation here is dispensed with.

(Operation of Modification 7)
The operation of the modification 7 will be described in detail with reference to FIG. 27 which shows a flowchart illustrating the operation. It should be noted that, since the steps S201 through S2703 and S2706 shown in FIG. 27 are respectively the same as the steps S301 through S303 and S306, shown in FIG. 3, a detailed explanation here is not made for simplicity.

Figure 27:
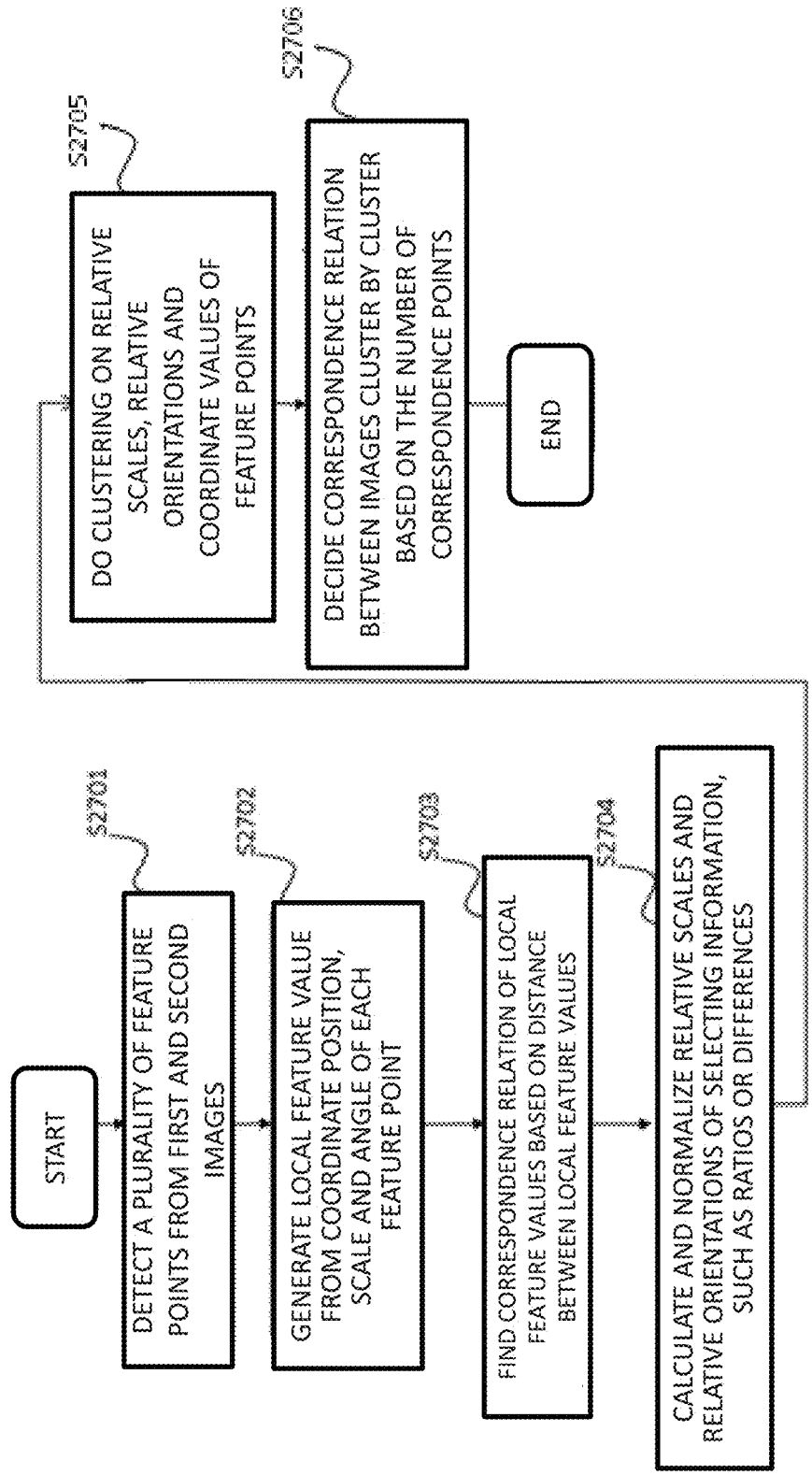
FIG. 27 is a flowchart showing the operation of the modification 7.

After executing the processing of the steps S2701 through S2703, shown in FIG. 27, the normalized relative correspondence point scale size calculation unit 601 calculates scale relationships, using a set of the first scale information, a set of the second scale information and a set of the information about the correspondence points. The normalized relative correspondence point scale size calculation unit 601 normalizes the so calculated scale relationships using an image size or a real size of the photographic subject (S2704). A correspondence point selecting unit 2202 performs clustering on feature points, based on the information about the normalized relative scale sizes of the correspondence points and a set of the first coordinate value information, and selects feature points based on the results of the clustering (step S2705). Processing then transfers to the step S2706 shown in FIG. 27.

(Advantageous Effects of Modification 7)
With the modification 7, the advantageous effects similar to those of the exemplary embodiment 6 may be obtained. In addition, since the relative scale sizes between feature points, correctly correlated between the images, are normalized, the normalized relative scale sizes of the correspondence points are constant from one photographic subject in the first image to another. It is thus possible to identify the photographic subjects more accurately than with the exemplary embodiment 6.

Figure 28:
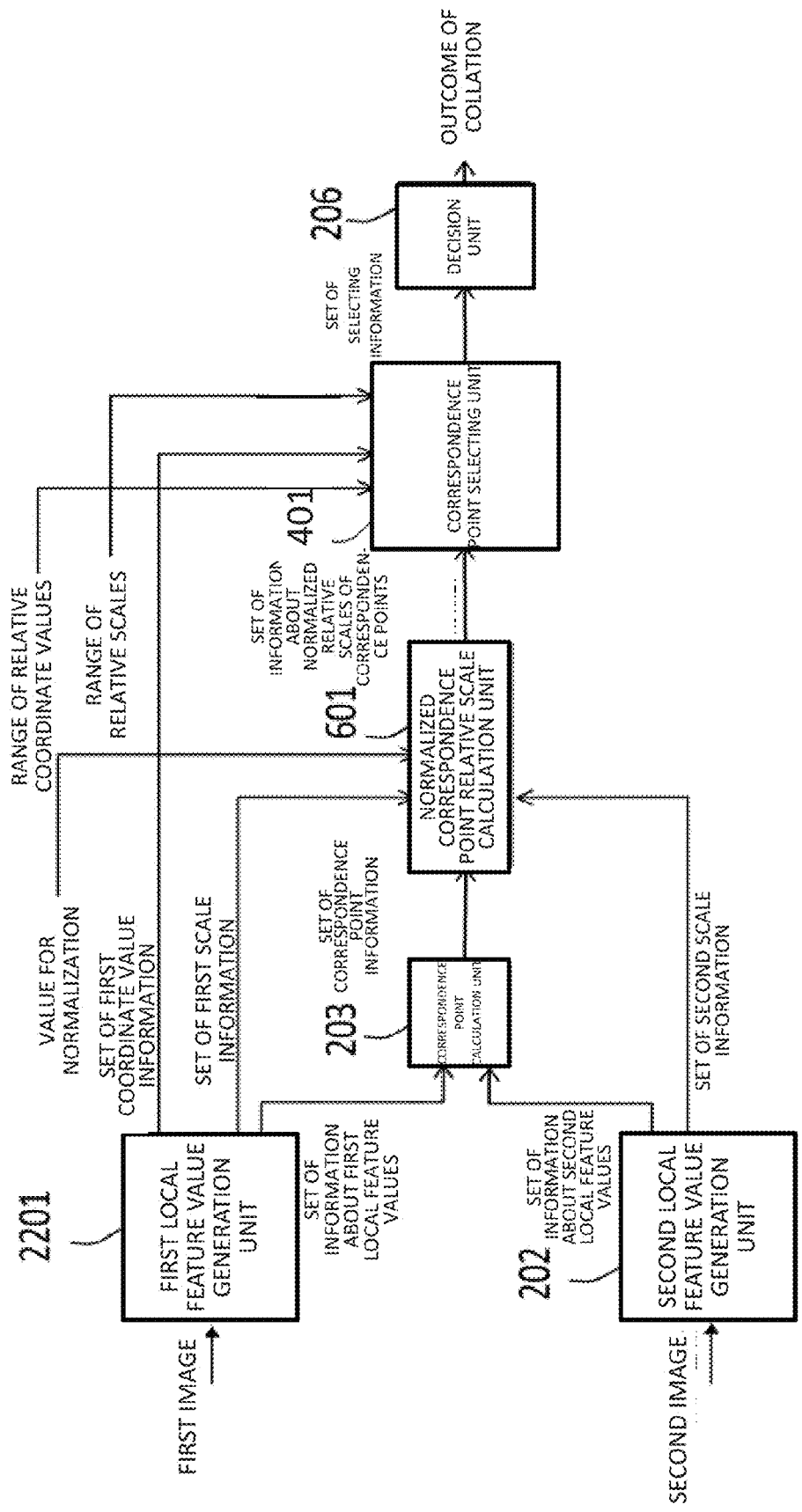
FIG. 28 is a block diagram showing a configuration of a modification 8.

[Modification 8]
Referring now to FIG. 28, a modification 8 will be illustrated. FIG. 28 depicts a block diagram showing a functional configuration of an image processing apparatus 280 according to the modification 8. Referring to FIG. 28, the image processing apparatus 280 is similar in configuration to the image processing apparatus 260 shown in FIG. 26, with the difference being the configuration as well as the operation of a correspondence point selecting unit 2401. The operation of the correspondence point selecting unit 2401 is similar to that of the modification 6 and hence the corresponding illustration here is dispensed with.

[Operation of Modification 8]
The operation of the modification 8 will be described in detail with reference to FIG. 29 which shows a flowchart illustrating the operation. It should be noted that the steps S2901 through S2903 and S2906 shown in FIG. 29 are respectively the same as the steps S301 through S303 and the step S306, shown in FIG. 3, and hence are not here detailed.

Figure 29:
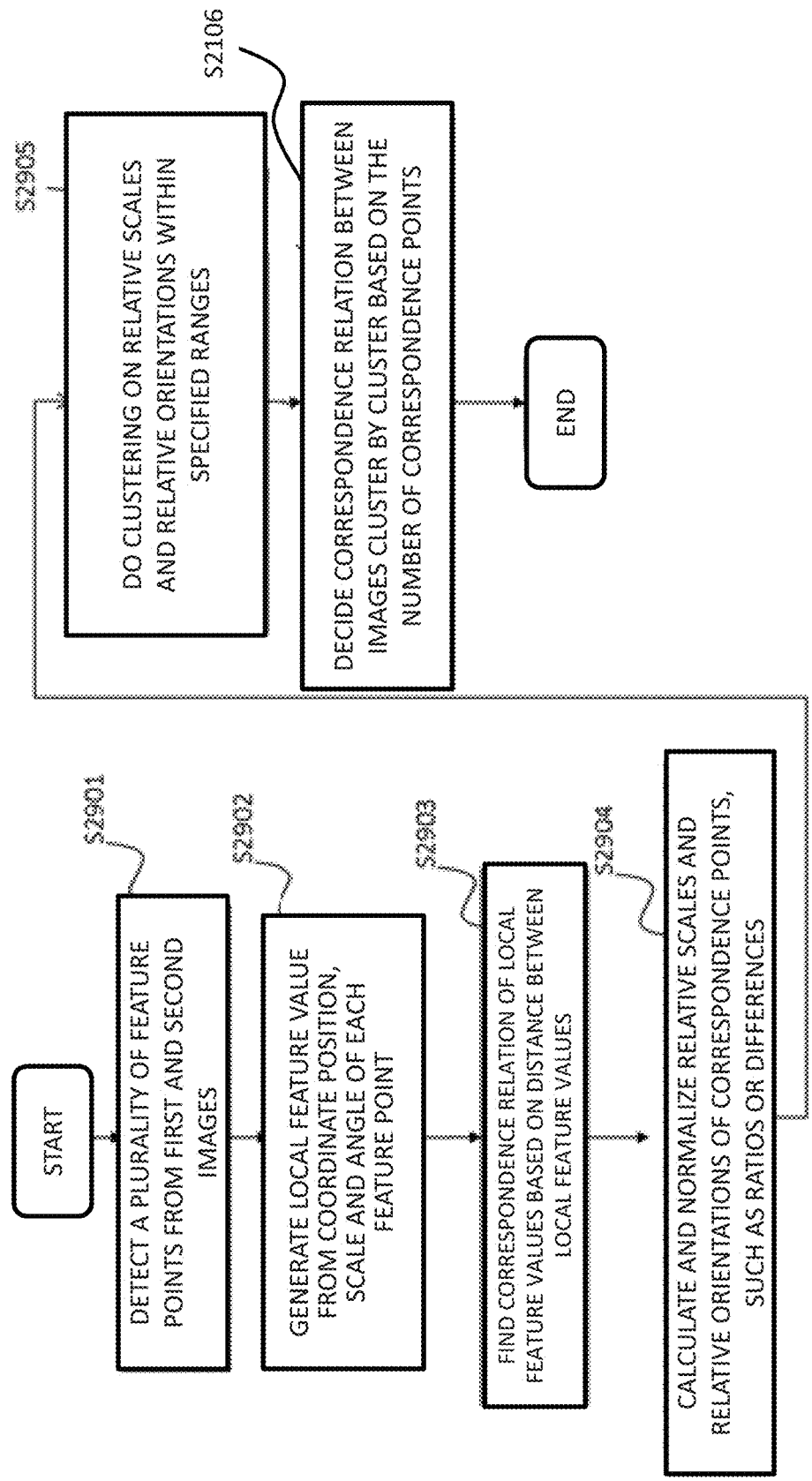
FIG. 29 is a flowchart showing the operation of the modification 8.

After executing the processing of the steps S2901 through S2903, shown in FIG. 29, the normalized relative correspondence point scale size calculation unit 601 calculates scale relationships, using a set of the first scale information, a set of the second scale information and a set of the information about the correspondence points, and normalizes the so calculated scale relationships based on an image size or a real size of the photographic subject (step S2904). The correspondence point selecting unit 2401 performs clustering on the feature points, based on relative scale sizes of the correspondence points, a set of the first coordinate value information, a range of relative scale sizes and a range of the relative coordinate values, and selects the feature points based on the result of the clustering (step S2905). Processing then transfers to the step A2906 shown in FIG. 29.

(Advantageous Effects of Modification 8)
With the modification 8, the advantageous effects similar to those of the exemplary embodiment 7 may be obtained. In addition, clustering is performed just on the feature points having relative scale size values within the range of the normalized relative scale sizes and the feature points having the coordinate information within the range of the coordinate values of the feature points, and hence the computational volume may be lesser than with the modification 7.

Figure 30:
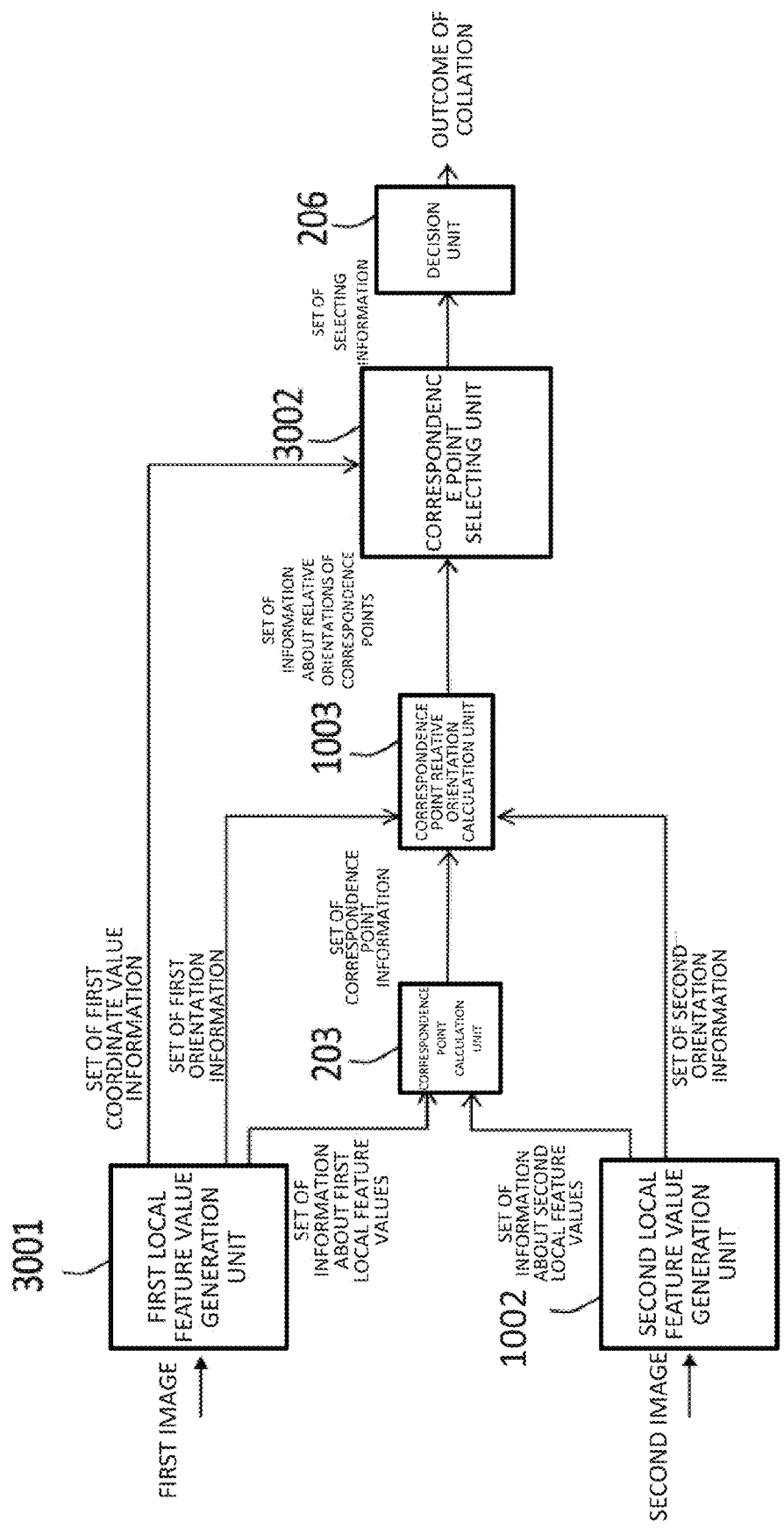
FIG. 30 is a block diagram showing a configuration of a modification 9.

[Modification 9]
A modification 9 will be illustrated with reference to FIG. 30 that depicts a block diagram showing a functional configuration of an image processing apparatus 300 according to a modification 9. Referring to FIG. 30, the image processing apparatus 300 is similar in configuration to the image processing apparatus 100 shown in FIG. 10, with the difference being the configuration as well as the operation of a first local feature value generation unit 3001 and a correspondence point selecting unit 3002.

The first local feature value generation unit 3001 outputs a set of the first orientation information, generated by an operation similar to that by the first local feature value generation unit 201 of the exemplary embodiment 1, to a relative correspondence point orientation calculation unit 1003. The first local feature value generation unit 3001 also outputs a set of the information about the first local feature values and a set of the information about the first coordinate values, generated by an operation similar to that by the first local feature value generation unit 2201 of the exemplary embodiment 6, to a correspondence point calculation unit 203 and the correspondence point selecting unit 3002, respectively.

The correspondence point selecting unit 3002 performs clustering on the feature points, contained in the first image, using a set of the information about the relative orientations of the correspondence points that the relative correspondence point orientation calculation unit 1003 has output, and a set of the first coordinate value information that the first local feature value generation unit 3001 has output.

(Operation of Modification 9)
The operation of the modification 9 will be described in detail with reference to FIG. 31 which shows a flowchart illustrating the operation. It should be noted that, since the steps S3101 through S3103 and S3106 shown in FIG. 31 are respectively the same as the steps S301 through S303 and S306, shown in FIG. 3, the corresponding detailed explanation here is dispensed with.

Figure 31:
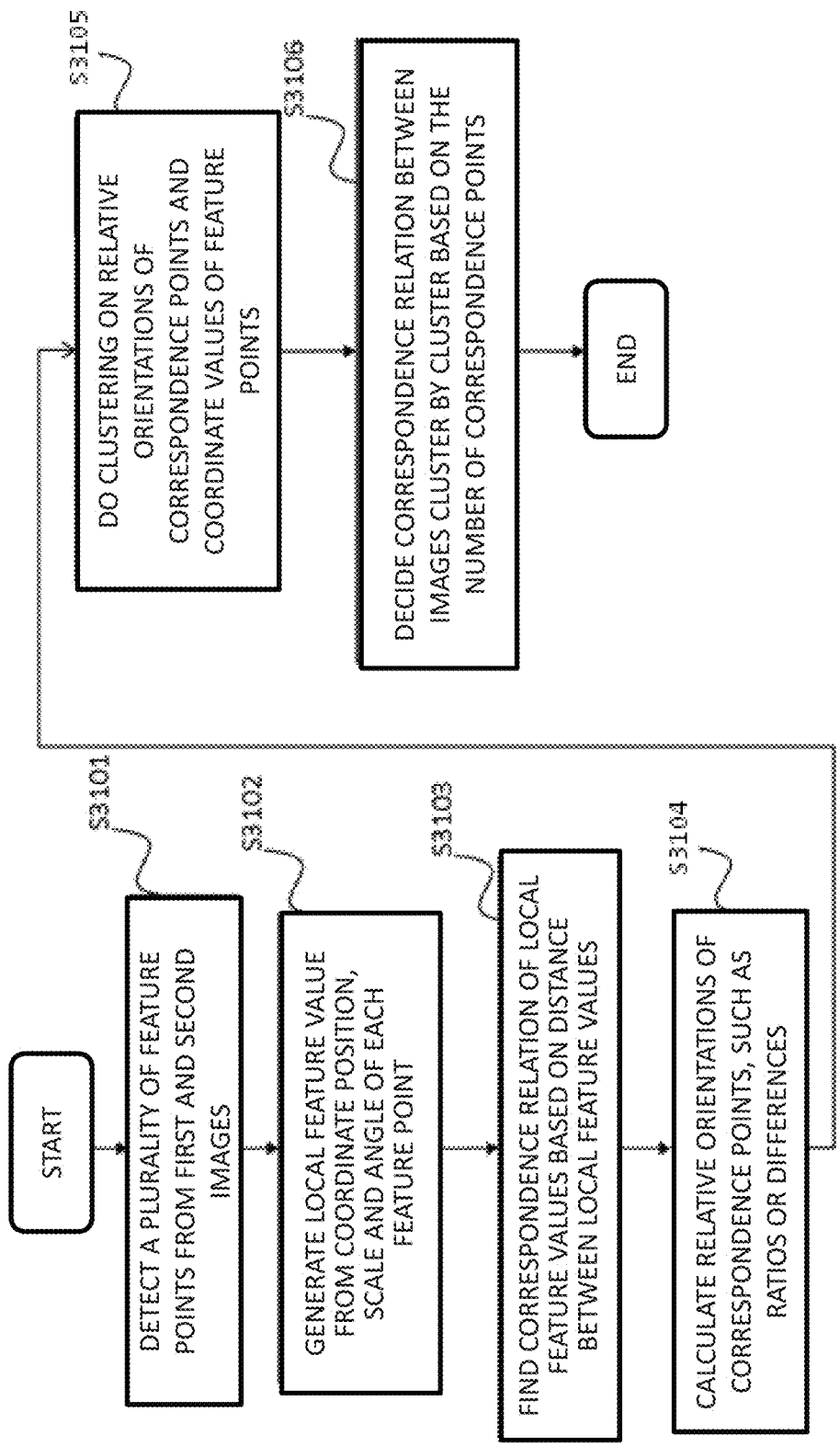
FIG. 31 is a flowchart showing the operation of the modification 9.

After executing the processing of the steps S3101 through S3103, shown in FIG. 31, the relative correspondence point orientation calculation unit 1003 calculates the information about the relative orientations of the correspondence points, based on a set of the first orientation information, a set of the second orientation information and a set of the information about the correspondence points (step S3104). The correspondence point selecting unit 3002 performs clustering on the feature points, based on a set of the information about the relative orientations of the correspondence points and a set of the first coordinate value information, and selects the feature points based on the results of the clustering (step S3105). Processing then transfers to the step S3106 shown in FIG. 31.

(Advantageous Effects of Modification 9)

With the modification 9, the advantageous effects similar to those of the exemplary embodiment 4 may be obtained. In addition, the feature points, correctly correlated between the images, are caused to gather densely from one photographic subject to another, so that, by performing clustering on the feature points based on the coordinate values, it is possible to identify the photographic subjects more precisely individually than with the exemplary embodiment 4, even in case there exist a plurality of photographic subjects having the same relative orientations.

[Modification 10]

Figure 32:
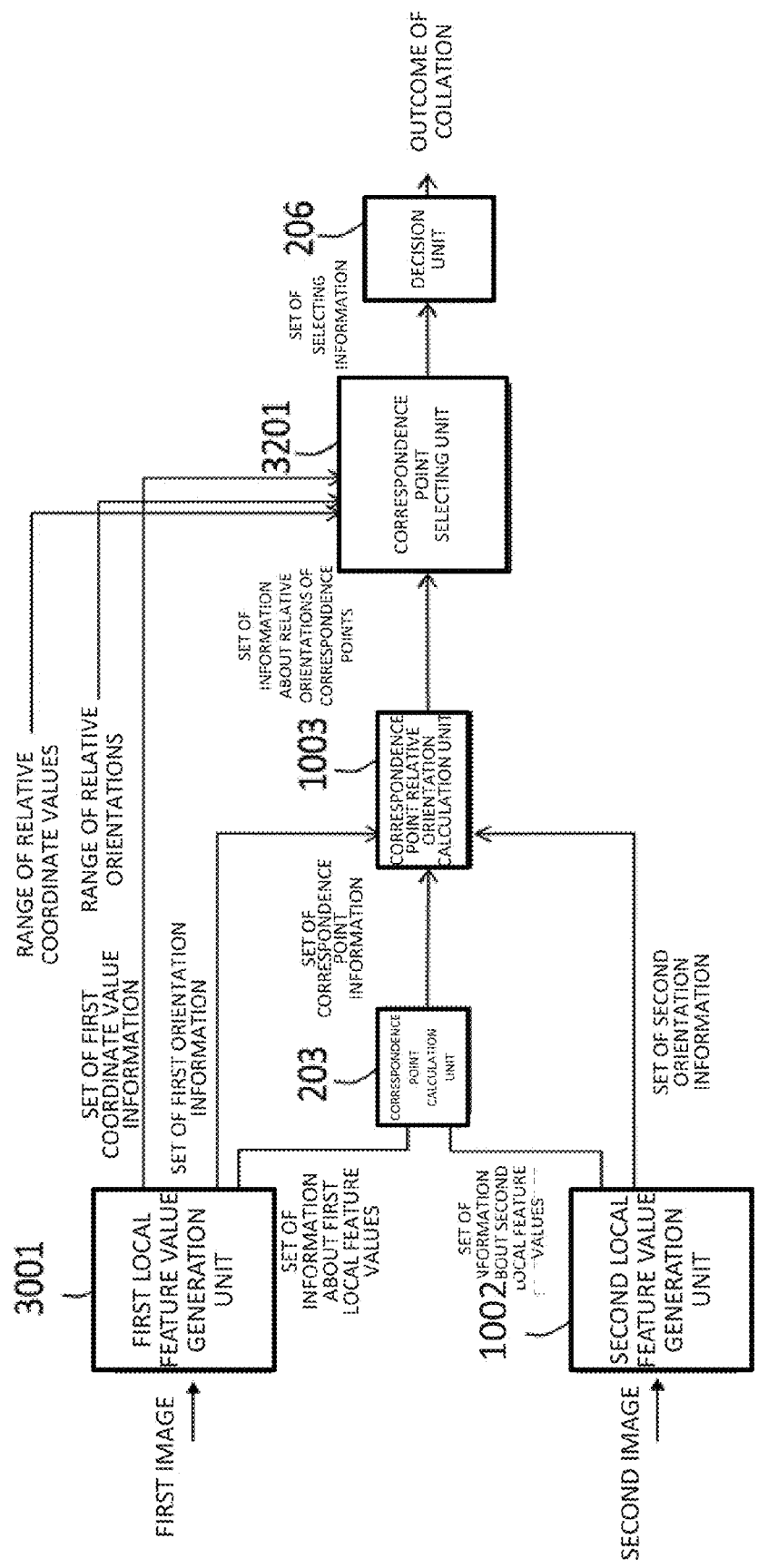
FIG. 32 is a block diagram showing a configuration of a modification 10.

Referring to FIG. 32, a modification 10 will be illustrated. FIG. 32 depicts a block diagram showing a functional configuration of an image processing apparatus 320 according to the modification 10. Referring to FIG. 32, the image processing apparatus 320 is similar in configuration to the image processing apparatus 300 shown in FIG. 30, with the difference being the configuration as well as the operation of a correspondence point selecting unit 3201. Hence, the following explanation is directed to the correspondence point selecting unit 3201.

The correspondence point selecting unit 3201 performs clustering on feature points, contained in the first image, using a set of the information about the relative orientations of the correspondence points, a range of the relative orientations, the coordinate values of the feature points, and a range of the coordinate values, wherein a relative correspondence point orientation calculation unit 1003 has output the set of the information about the relative orientations of the correspondence points, and wherein the first local feature value generation unit 3001 has output the coordinate values of the feature points.

The correspondence point selecting unit 3201 may also perform clustering on feature points, based on e.g., a set of the information about the relative orientations of the correspondence points, then select the feature points based on the result of the clustering, and subsequently perform clustering on the so selected feature points based on a set of first coordinate point information. The correspondence point selecting unit 3201 may also perform clustering based on e.g., the set of the first coordinate value information, then select feature points based on the results of the clustering and subsequently perform clustering on the so selected feature points based on the set of the information about the relative orientations of the correspondence points. The correspondence point selecting unit 3201 may also perform clustering on the feature points using e.g., both the set of the information about the relative orientations of the correspondence points and the set of the first coordinate value information.

(Operation of Modification 10)

The operation of the modification 10 will be described in detail with reference to FIG. 33 which shows a flowchart illustrating the operation. It should be noted that, since the steps S3301 through S3303 and S3306 shown in FIG. 33 are respectively the same as the steps S301 through S303 and S306 shown in FIG. 3, the corresponding illustration is dispensed with.

Figure 33:
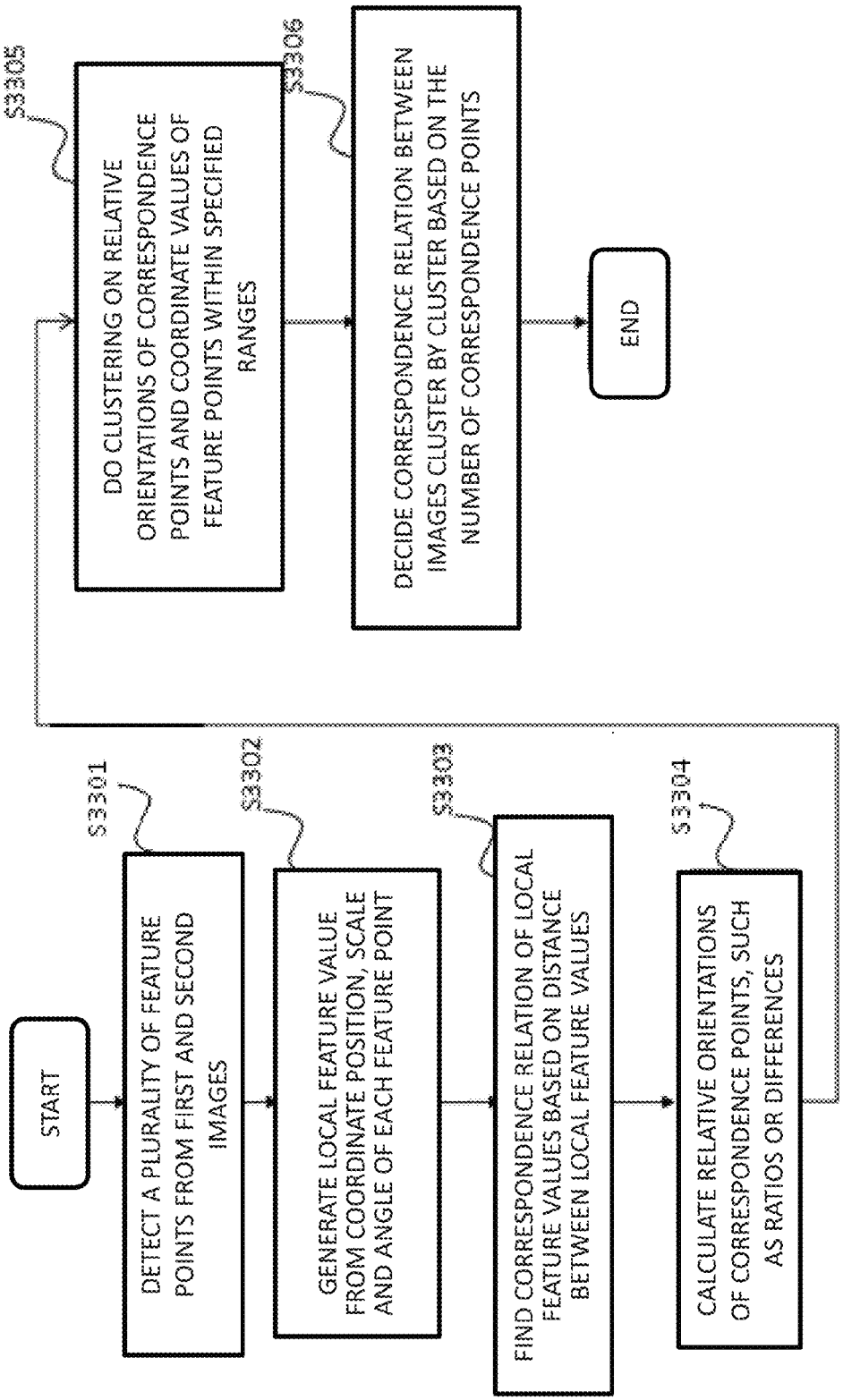
FIG. 33 is a flowchart showing the operation of the modification 10.

After executing the processing of the steps S3301 through S3303, shown in FIG. 33, the relative correspondence point orientation calculation unit 1003 calculates the information about the relative orientations of the correspondence points, based on a set of the first orientation information, a set of the second orientation information and a set of the matching value information (step S3304). The correspondence point selecting unit 3201 performs clustering on the feature points, based on the set of the information about the relative orientations of the correspondence points, the set of the first coordinate value information, a range of the relative orientations and a range of the relative coordinate values, and selects the feature points based on the result of the clustering (step S3305). Processing then transfers to the step S3306 shown in FIG. 33.

(Advantageous Effects of the Modification 10)

With the modification 10, the advantageous effects similar to those of the modification 9 may be obtained. In addition, since clustering is performed on only the feature points having the information about the relative orientations within the range of the relative orientations and the feature points having coordinate values within the range of the relative coordinate values, the computational volume may be lesser than with the modification 9.

[Modification 11]

Figure 34:
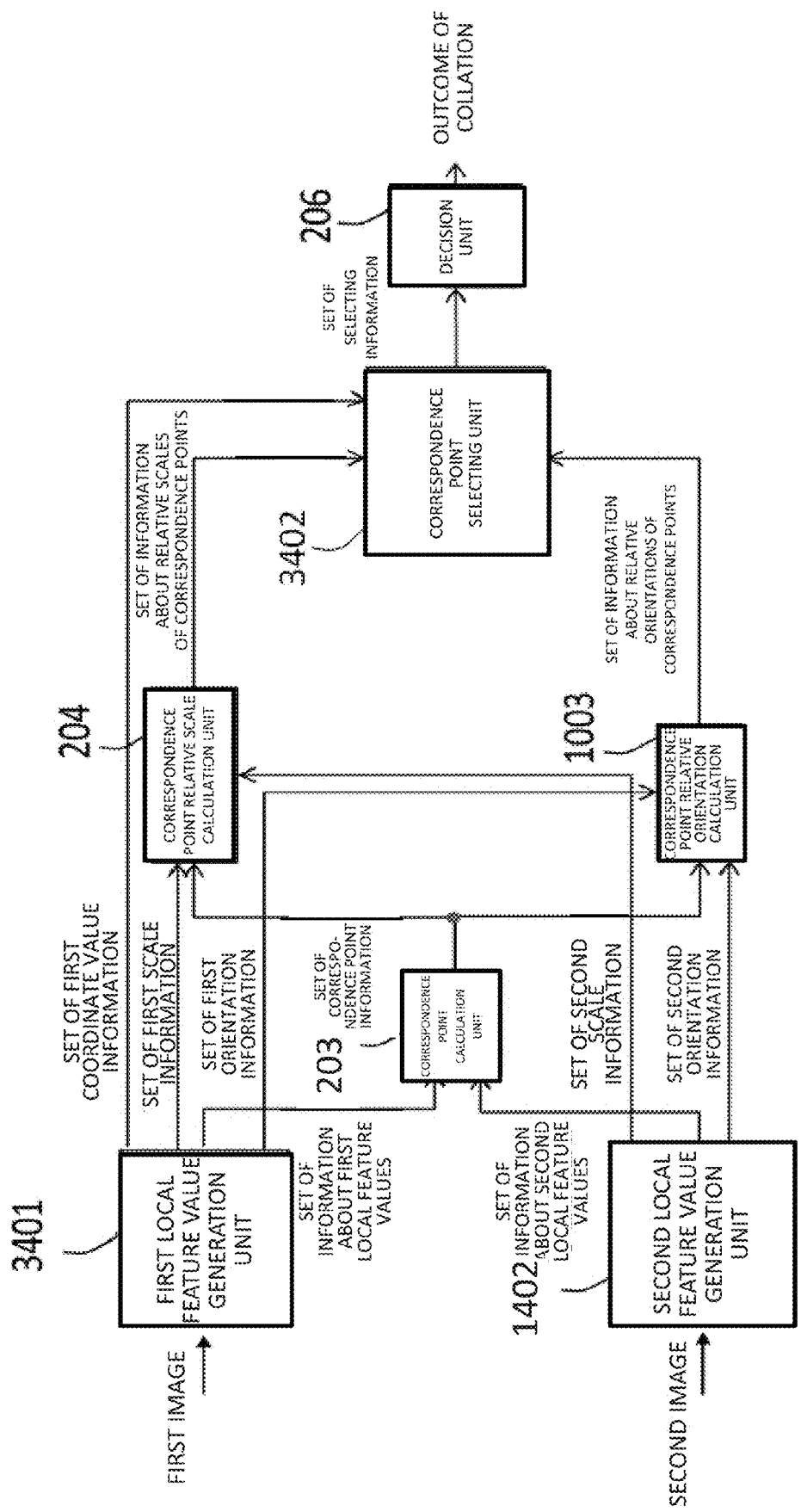
FIG. 34 is a block diagram showing a configuration of a modification 11.

Referring now to FIG. 34, a modification 11 will be illustrated. FIG. 34 depicts a block diagram showing a functional configuration of an image processing apparatus 340 according to the modification 11. Referring to FIG. 34, the image processing apparatus 340 is similar in configuration to the image processing apparatus 140 shown in FIG. 14, with the difference being the configuration as well as the operation of a first local feature value generation unit 3401 and a correspondence point selecting unit 3402.

By an operation similar to that performed by the first local feature value generation unit 3001 shown in FIG. 30, the first local feature value generation unit 3401 generates a set of first local feature values, a set of the first orientation information and a set of the first coordinate value information, which are respectively output to a correspondence point calculation unit 203, a relative correspondence point orientation calculation unit 1003 and the correspondence point selecting unit 3402. The first local feature value generation unit 3401 also outputs a set of the first scale information, generated by an operation similar to that performed by the first local feature value generation unit 201 of the exemplary embodiment 1, to a relative correspondence point scale size calculation unit 204.

The correspondence point selecting unit 3402 performs clustering on the feature points, contained in the first image, using a set of the information about the relative scale sizes of the correspondence points that the relative correspondence point scale size calculation unit 204 has output, a set of the information about the relative orientations of the correspondence points that the relative correspondence point orientation calculation unit 1003 has output, and the set of the first coordinate value information that the first local feature value generation unit 3401 has output.

(Operation of Modification 11)

The operation of a modification 11 will be described in detail with reference to FIG. 35 which shows a flowchart illustrating the operation. It should be noted that, since the steps S3501 through S3503 and S3506 shown in FIG. 35 are respectively the same as the steps S301 through S303 and the step S306, shown in FIG. 3, the corresponding illustration here is dispensed with.

Figure 35:
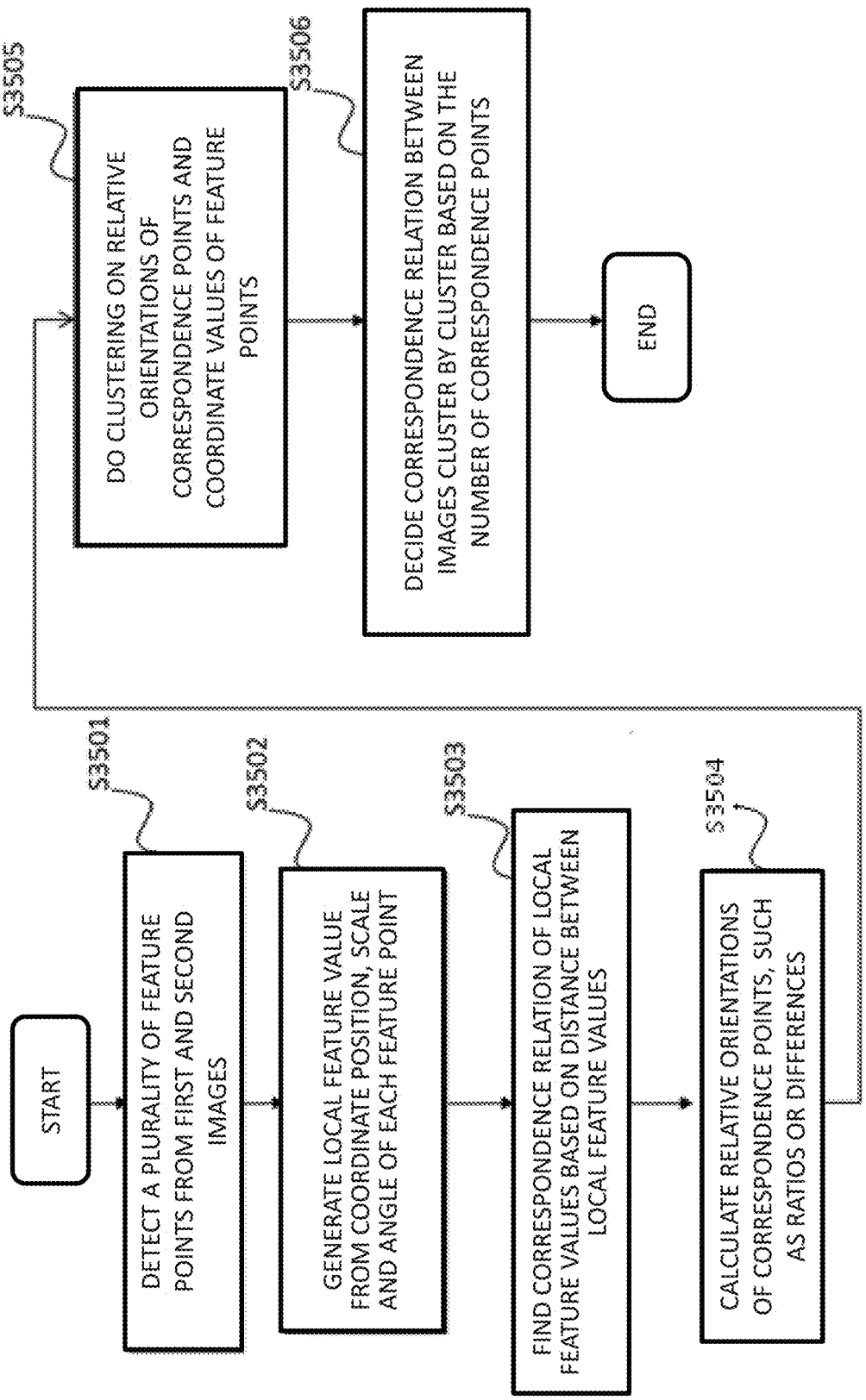
FIG. 35 is a flowchart showing the operation of the modification 11.

After executing the processing of the steps S3501 through S3503, shown in FIG. 35, the relative correspondence point scale size calculation unit 204 calculates scale relationships, based on a set of the first scale information, a set of the second scale information and a set of the information about the correspondence points. The relative correspondence point orientation calculation unit 1003 calculates the information about the relative orientations of the correspondence points, based on a set of the first orientation information, a set of the second orientation information and the set of the information about the correspondence points (step S3504). The correspondence point selecting unit 3402 performs clustering on the feature points, based on the set of the information about the relative scale sizes of the correspondence points, the set of the information about the relative orientations of the correspondence points and the set of the first coordinate value information, and selects the feature points based on the result of the clustering (step S3505). Processing then transfers to the step S3506 shown in FIG. 35.

(Advantageous Effects of Modification 11)

With the modification 11, the advantageous effects similar to those of the exemplary embodiment 5 may be obtained. In addition, the feature points in the image are selected by clustering, using the coordinate values thereof in the image, and the photographic subjects, which are the same or similar between different images, are decided from one cluster to another. The feature points, correctly matched between the images, are caused to gather together densely from one photographic subject to another, so that, by performing clustering on the feature points based on the coordinate value information, the photographic subjects may be identified more precisely individually with the present exemplary embodiment 11 than with the exemplary embodiment 5, even in case there exist a plurality of photographic subjects having the same scales or the same relative orientations.

(Modification 12)

Figure 36:
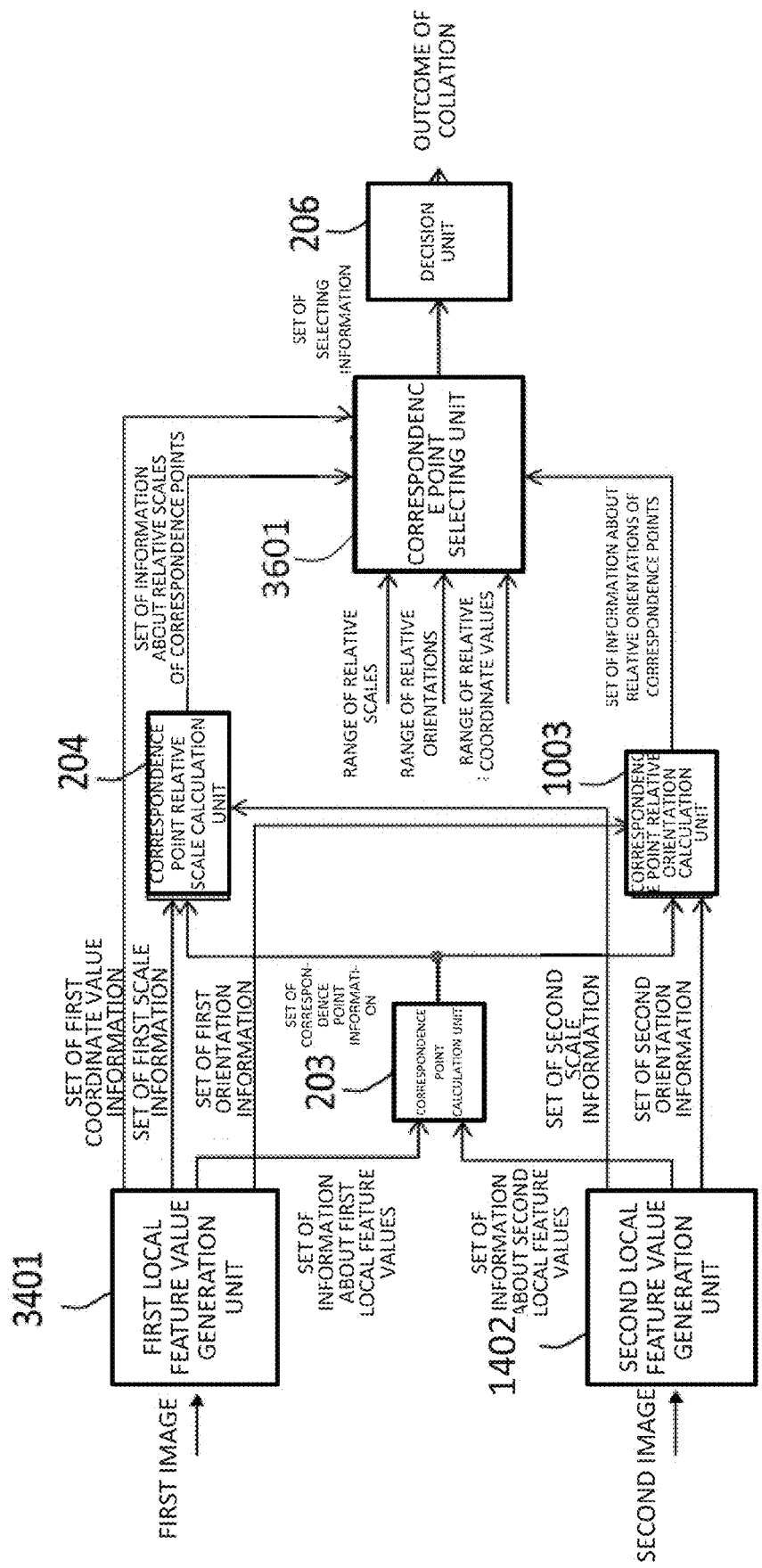
FIG. 36 is a block diagram showing a configuration of a modification 12.

A modification 12 will now be illustrated with reference to FIG. 36, which shows a functional configuration of an image processing apparatus 360 according to the modification 12. Referring to FIG. 36, the image processing apparatus 360 is similar in configuration to the image processing apparatus 340 shown in FIG. 34, with the difference being the configuration as well as the operation of a correspondence point selecting unit 3601.

The correspondence point selecting unit 3601 performs clustering on feature points, contained in the first image, using a set of the information about the relative scale sizes of the correspondence points that a relative correspondence point scale size calculation unit 204 has output, a set of the information about the relative orientations of the correspondence points that a relative correspondence point orientation calculation unit 1003 has output, a set of the first coordinate value information that a first local feature value generation unit 3401 has output, a range of relative scale sizes, a range of the relative orientations and a range of the relative coordinate values.

(Operation of Modification 12)

The operation of the modification 12 will be described in detail with reference to FIG. 37 which shows a flowchart illustrating the operation. It should be noted that, since the steps S3701 through S3703 and S3706 shown in FIG. 37 are respectively the same as the steps S301 through S303 and S306, shown in FIG. 3, the corresponding explanation is dispensed with.

Figure 37:
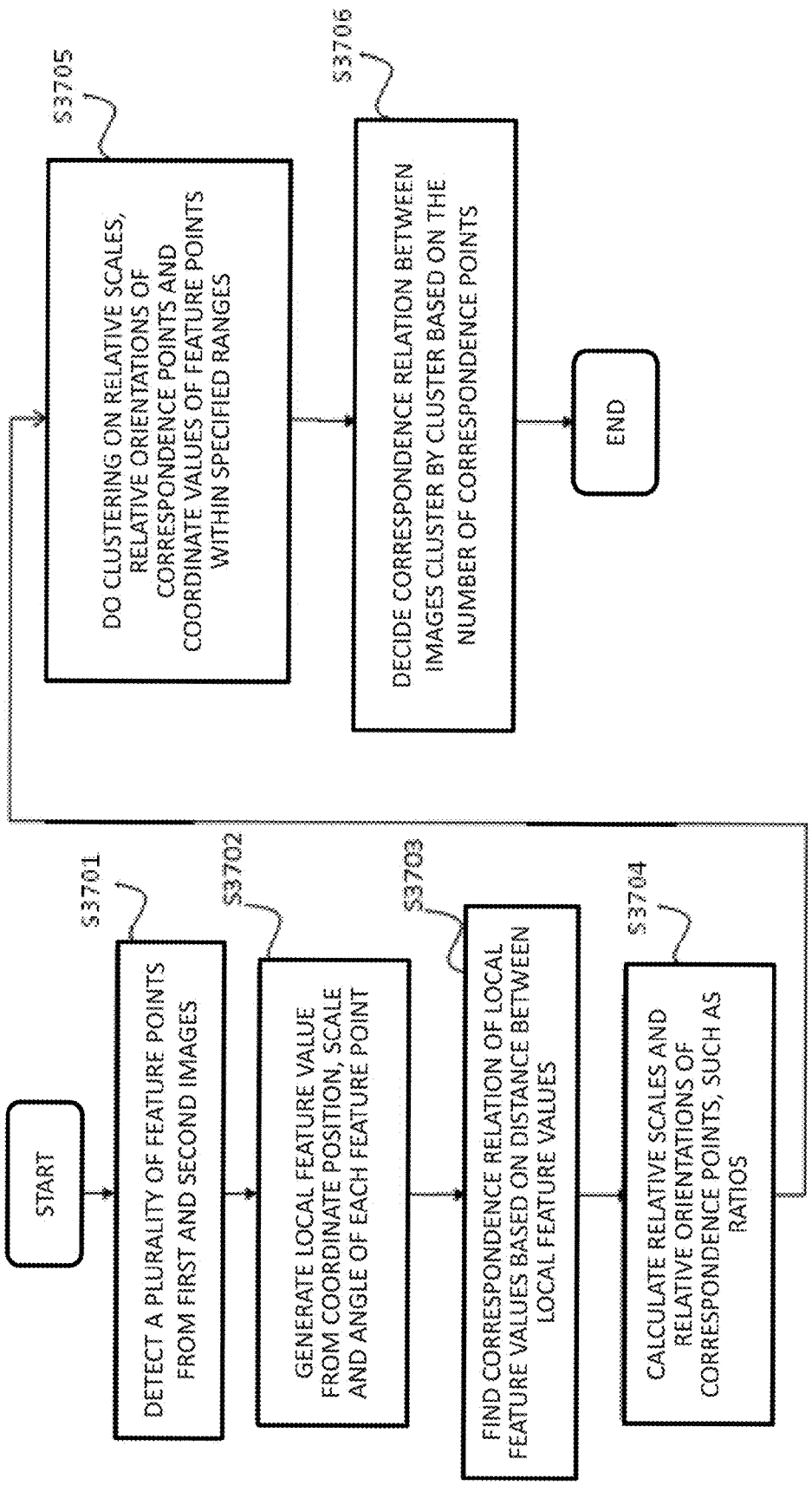
FIG. 37 is a flowchart showing the operation of the modification 12.

After executing the processing of the steps S3701 through S3703, shown in FIG. 37, the relative correspondence point scale size calculation unit 204 calculates scale relationships, using a set of the first scale information, a set of the second scale information and a set of the information about the correspondence points. The relative correspondence point orientation calculation unit 1003 calculates the information about the relative orientations of the correspondence points, based on a set of the first orientation information, a set of the second orientation information and the set of the information about the correspondence points (step S3704). The correspondence point selecting unit 3601 performs clustering on the feature points, based on a set of the information about the relative scale sizes of the correspondence points, a set of the information about the relative orientations of the correspondence points, a set of the information about the first coordinate values, a range of the relative scale sizes, a range of the relative orientations and a range of the relative coordinate values, and selects the feature points based on the results of the clustering (step S3705). Processing then transfers to the step S3706 shown in FIG. 37.

(Advantageous Effects of Modification 12)

With the modification 12, the advantageous effects similar to those of the modification 11 may be obtained. In addition, since clustering is performed only on the feature points having the relative scale size information within the range of the relative scale sizes, the feature points having the relative orientation information within the range of the relative orientations and the feature points having the coordinate value information within the range of the relative coordinate values, the volume of computations may be lesser than that of the modification 11.

[Modification 13]

Figure 38:
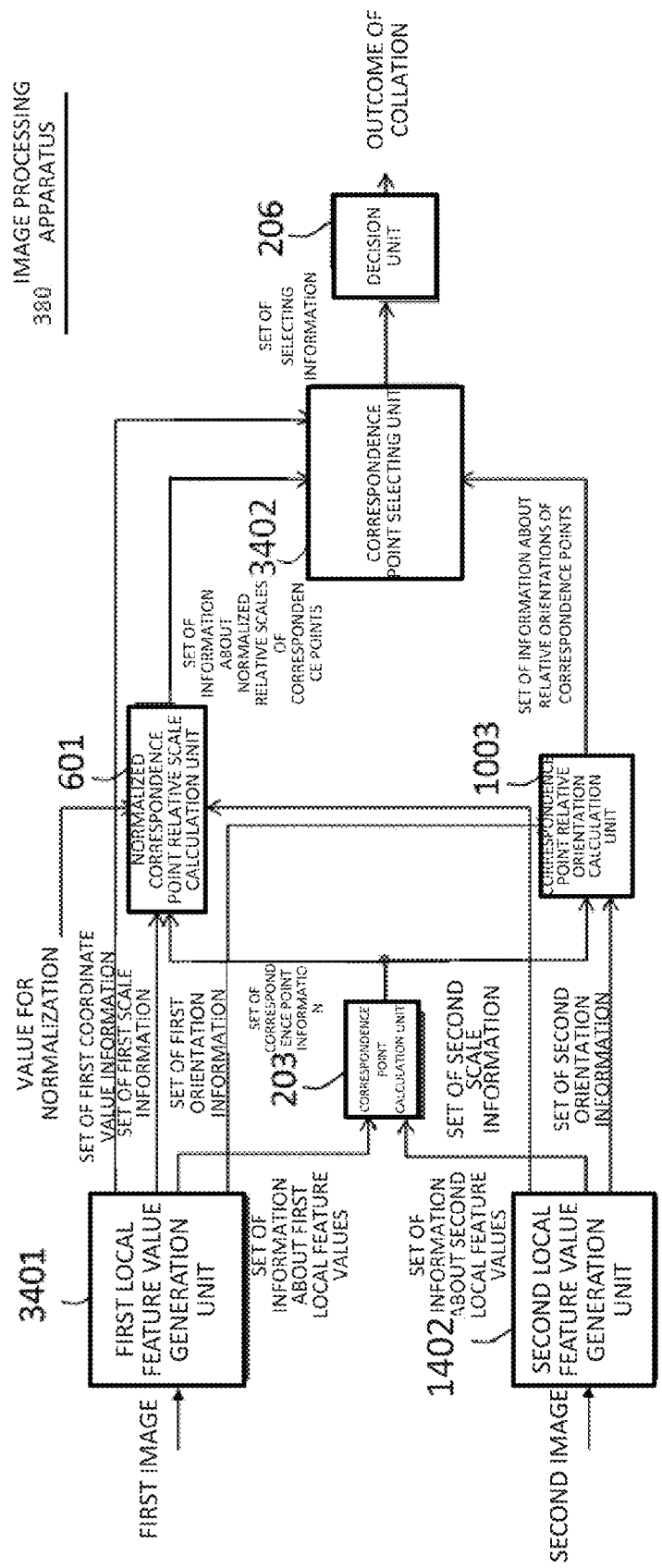
FIG. 38 is a block diagram showing a configuration of a modification 13.

Referring now to FIG. 38, a modification 13 will be illustrated. FIG. 38 depicts a block diagram showing a functional configuration of an image processing apparatus 380 according to the modification 13. Referring to FIG. 38, the image processing apparatus 380 is similar in configuration to the image processing apparatus 340 shown in FIG. 34, with the difference being the configuration as well as the operation of a normalized relative correspondence point scale size calculation unit 601. Since the operation of the normalized relative correspondence point scale size calculation unit 601 is the same as that of the exemplary embodiment 14, a detailed explanation is here not made for simplicity.

(Operation of Modification 13)

The operation of the modification 13 will be described in detail with reference to FIG. 39 which shows a flowchart illustrating the operation. Since the steps S3901 through S3903 and S3906 shown in FIG. 39 are respectively the same as the steps S301 through S303 and S306, shown in FIG. 3, the corresponding explanation is dispensed with.

Figure 39:
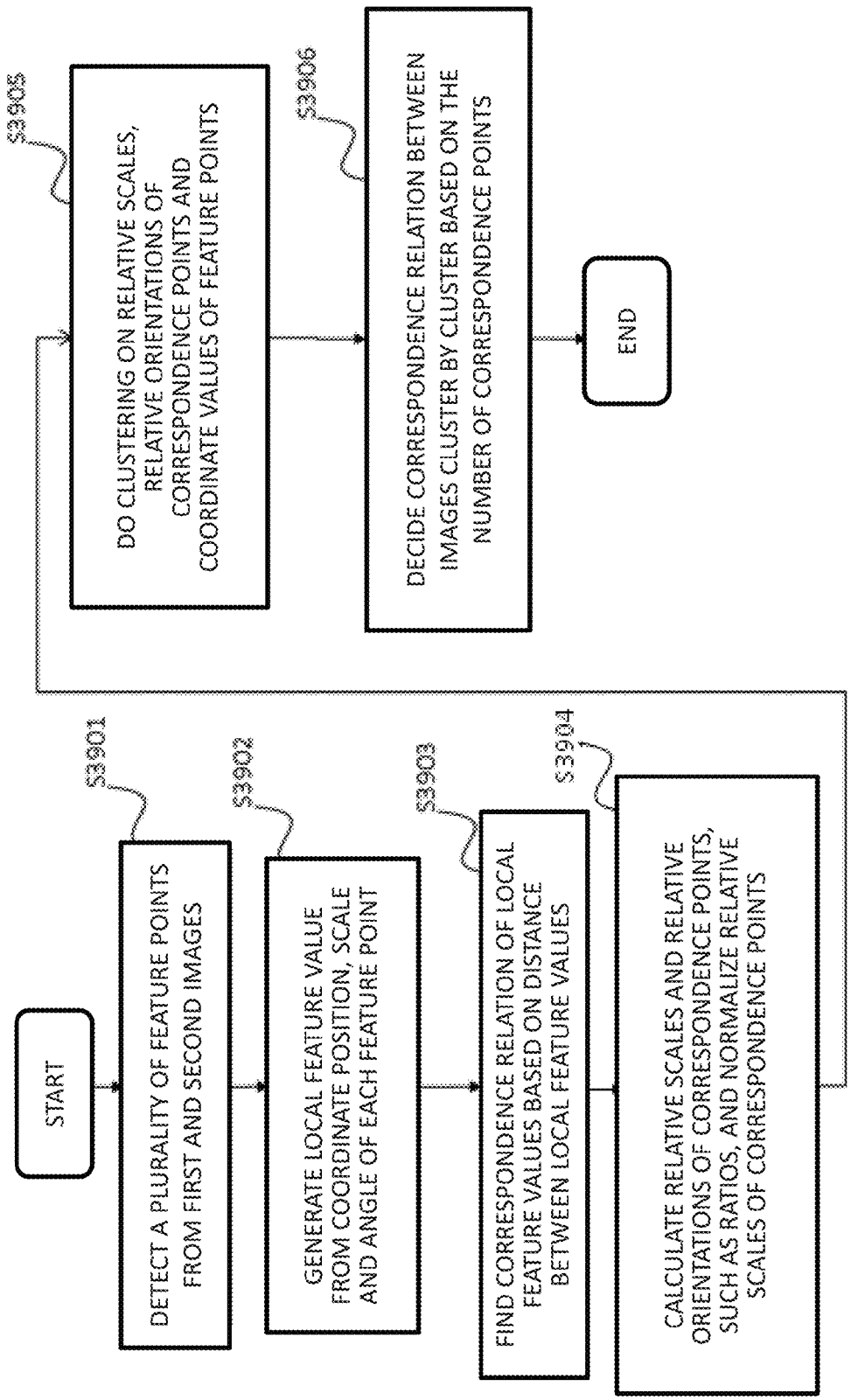
FIG. 39 is a flowchart showing the operation of the modification 13.

After executing the processing of the steps S3901 through S3903, shown in FIG. 39, the normalized relative correspondence point scale size calculation unit 601 calculates scale relationships, based on a set of the first scale information, a set of the second scale information and a set of the information about the correspondence points. A relative correspondence point orientation calculation unit 1003 calculates the information about the relative orientations of the correspondence points, based on a set of the first orientation information, a set of the second orientation information and the set of the information about the correspondence points (step S3904). A correspondence point selecting unit 3402 performs clustering on the feature points, based on a set of the information about the relative scale sizes of the correspondence points, a set of the information about the relative orientations of the correspondence points and on the set of the first coordinate value information, and selects the feature points based on the results of the clustering (step S3905). Processing then transfers to the step S3906 shown in FIG. 39.

(Advantageous Effects of Modification 13)

With the modification 13, the advantageous effects similar to those of the modification 11 may be obtained. In addition, in case the relative scale sizes between the feature points, correctly matched between the images, are normalized, the relative scale sizes of the correspondence points, thus normalized, become constant from one photographic subject in the first image to another. The photographic subjects may thus be identified more precisely than with the modification 11.

[Modification 14]

Figure 40:
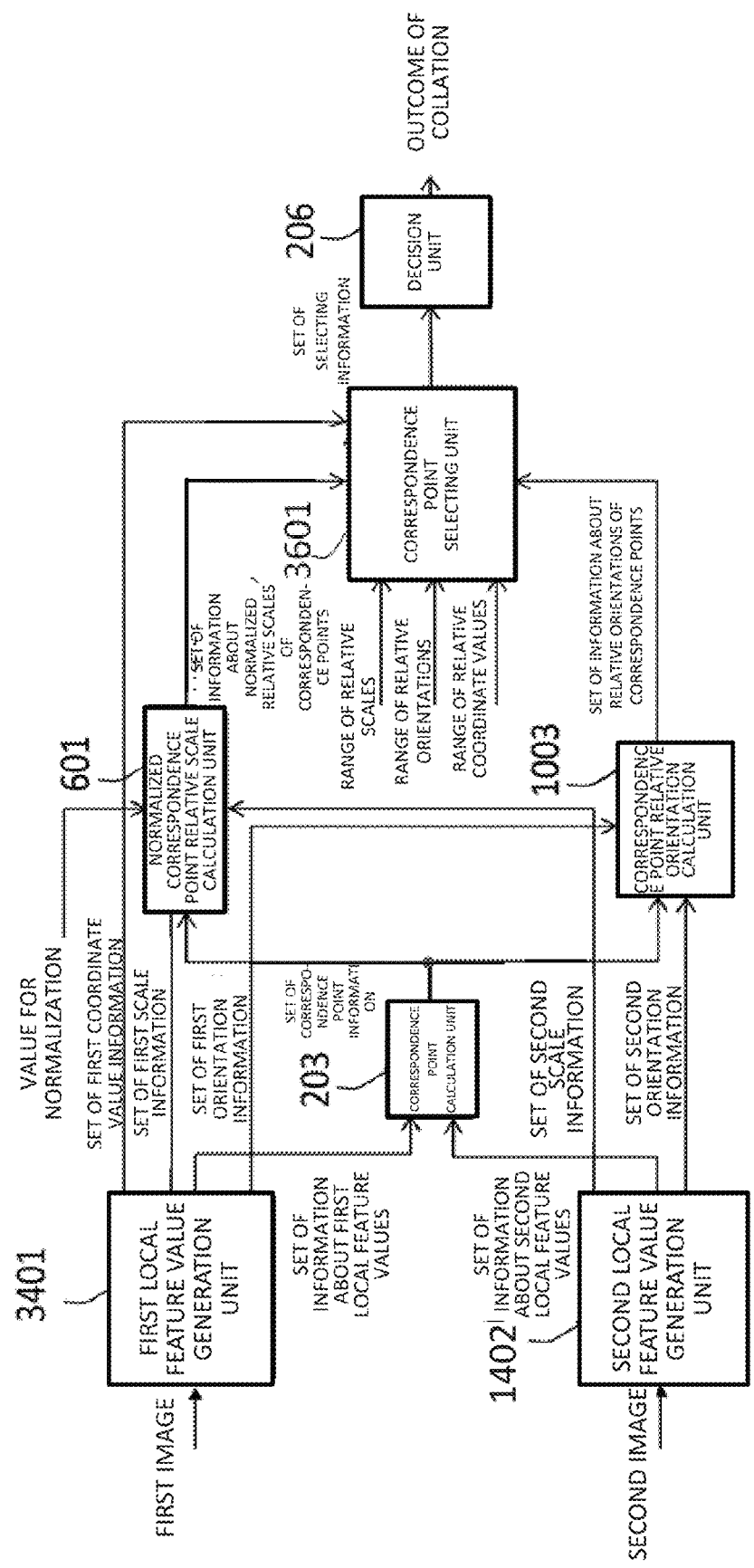
FIG. 40 is a block diagram showing a configuration of a modification 14.

Referring now to FIG. 40, a modification 14 will be illustrated. FIG. 40 depicts a block diagram showing a functional configuration of an image processing apparatus 400 according to the modification 14. Referring to FIG. 40, the image processing apparatus 400 is similar in configuration to the image processing apparatus 380 shown in FIG. 38, with the difference being the configuration as well as the operation of a correspondence point selecting unit 3601. The operation of the correspondence point selecting unit 3601 is the same as that of the exemplary embodiment 12, and hence a detailed explanation is here not made for simplicity.

(Operation of Modification 14)

The operation of the modification 14 will be described in detail with reference to FIG. 41 which shows a flowchart illustrating the operation. Since the steps S4101 through S4103 and S4106 shown in FIG. 41 are respectively the same as the steps S301 through S303 and S306, shown in FIG. 3, the corresponding explanation is dispensed with.

Figure 41:
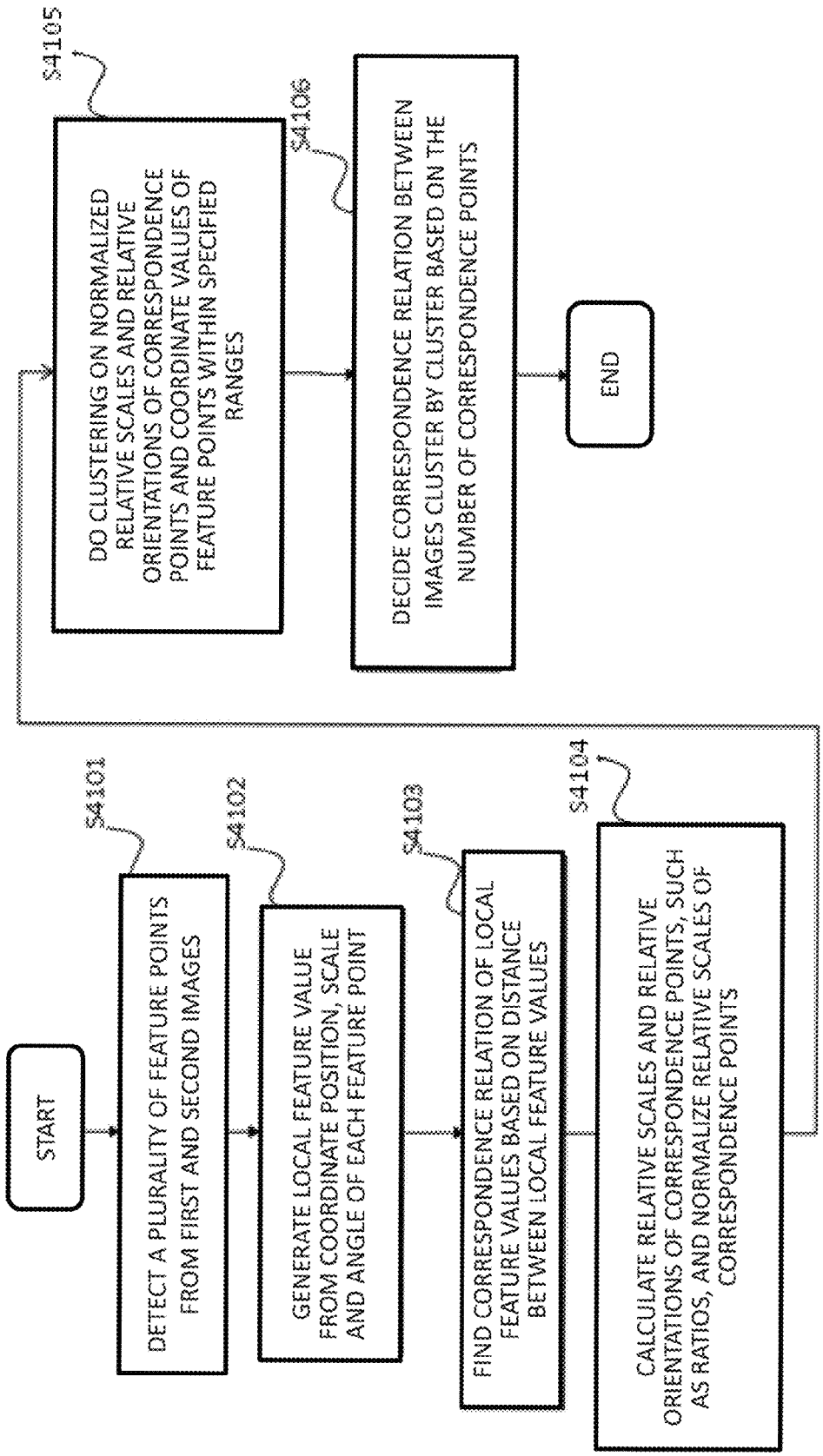
FIG. 41 is a flowchart showing the operation of the modification 14.

After executing the processing of the steps S4101 through S4103, shown in FIG. 41, a normalized relative correspondence point scale size calculation unit 601 calculates scale relationships, using a set of the first scale information, a set of the second scale information and a set of the information about the correspondence points. The normalized relative correspondence point scale size calculation unit 601 also normalizes the scale relationships, thus calculated, based on e.g., an image size or on a real entity size of a photographic subject(s). The relative correspondence point orientation calculation unit 1003 calculates the information about the relative orientations of the correspondence points, using a set of the first orientation information, a set of the second orientation information and the set of the information about the correspondence points (step S4104). The correspondence point selecting unit 3601 performs clustering on the feature points, using a set of the information about the normalized relative scale sizes of the correspondence points, a set of the information about the relative orientations of the correspondence points, a set of the first coordinate value information, a range of the relative scale sizes, a range of the relative orientations and a range of the relative coordinate values, and selects the feature points based on the results of the clustering (step S4105). Processing then transfers to the step S4106 shown in FIG. 41.

(Advantageous Effects of Modification 14)

With the modification 14, the advantageous effects similar to those of the modification 13 may be obtained. In addition, clustering is performed on just the feature points having the normalized relative scale sizes situated within the range of the relative scale sizes, the feature points having the orientation information situated within the range of the relative orientations and the feature points situated within the range of the relative coordinate values. Hence, the volume of computations may be lesser than that of the modification 13.

[Modification 15]

Figure 44:
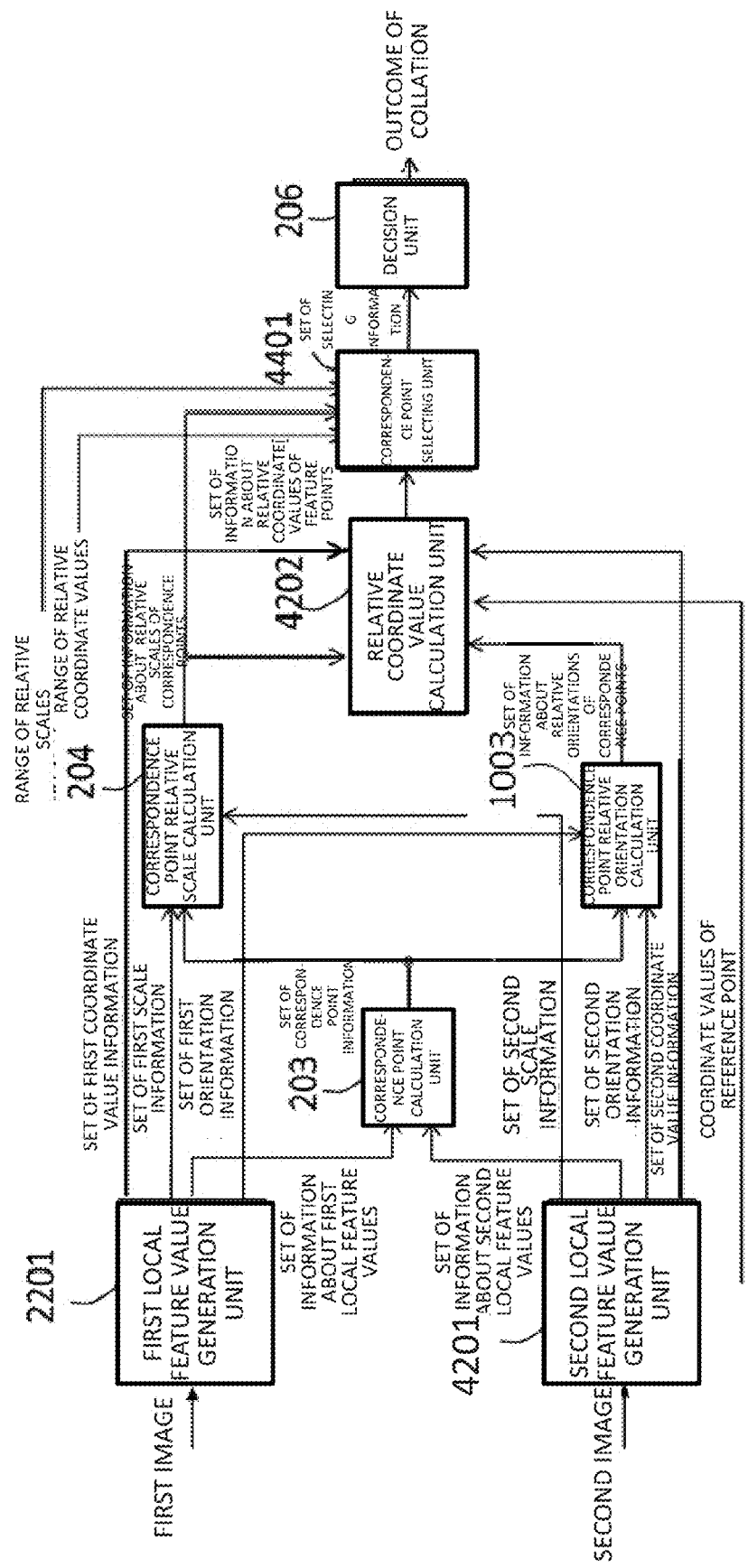
FIG. 44 is a block diagram showing a configuration of a modification 15.

Referring now to FIG. 44, a modification 15 will be illustrated. FIG. 44 depicts a block diagram showing a functional configuration of an image processing apparatus 440 according to the modification 15. Referring to FIG. 44, the image processing apparatus 440 is similar in configuration to the image processing apparatus 420 shown in FIG. 42, with the difference being the configuration as well as the operation of a correspondence point selecting unit 4401.

The correspondence point selecting unit 4401 performs clustering on feature points, using a set of the information about the relative scale sizes of the correspondence points that a relative correspondence point scale size calculation unit 204 has output, a range of relative scale sizes, a set of the information about the relative coordinate values that a relative coordinate value calculation unit 4202 has output, and a range of the relative coordinate values.

(Operation of Modification 15)

The operation of the modification 15 will be described in detail with reference to FIG. 45 which shows a flowchart illustrating the operation. Since the steps S4501 through S4503 and S4507, shown in FIG. 45, are respectively the same as the steps S301 through S303 and S306, shown in FIG. 3, the corresponding explanation is dispensed with.

Figure 45:
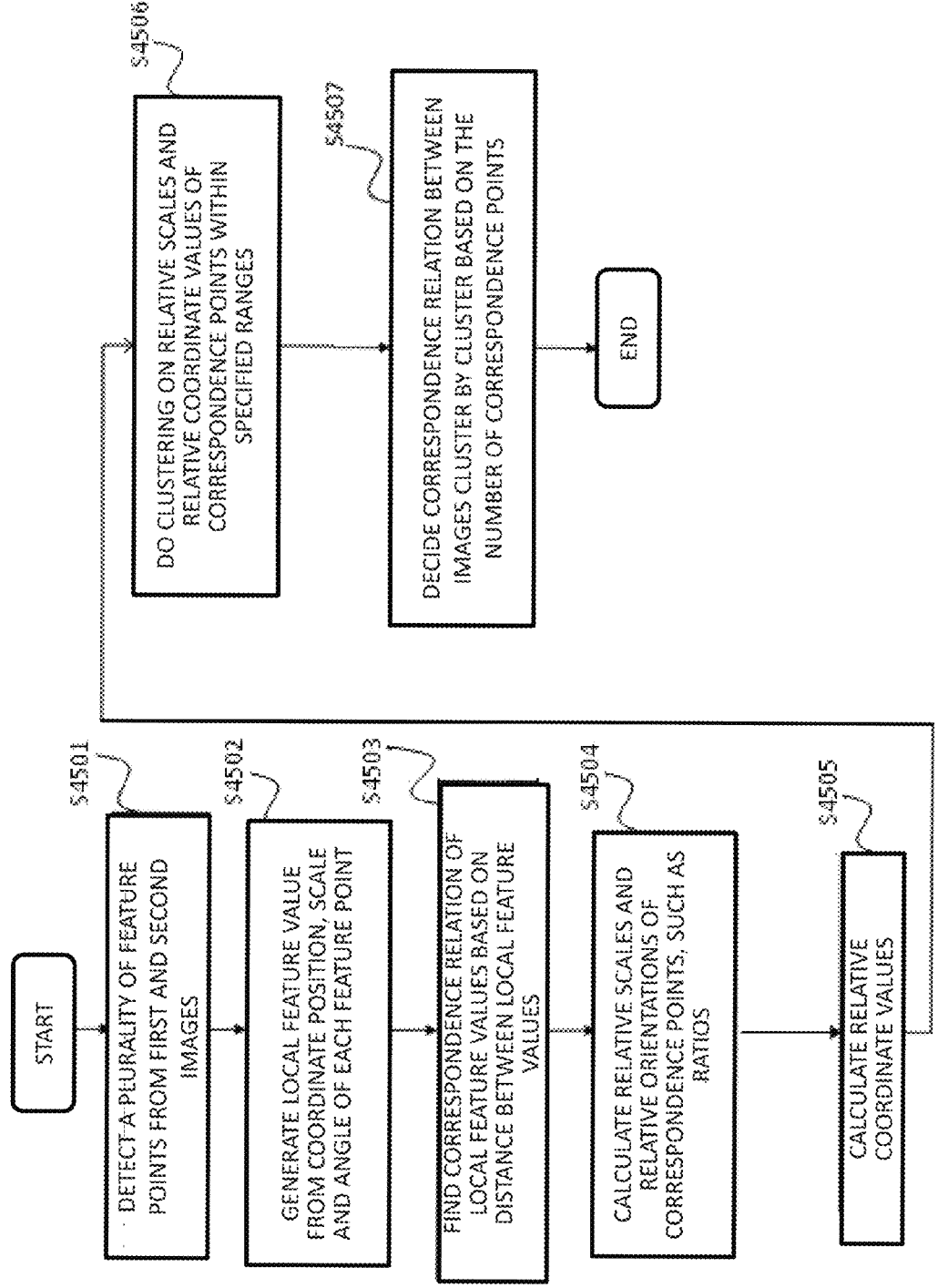
FIG. 45 is a flowchart showing the operation of the modification 15.

After executing the processing of the steps S4501 through S4503, shown in FIG. 45, the relative correspondence point scale size calculation unit 204 calculates the relative scale sizes of the correspondence points, while a relative correspondence point orientation calculation unit 1003 calculates the relative orientations of the correspondence points (step S4504). The relative coordinate value calculation unit 4202 calculates relative coordinate values, using a set of the information about the relative scale sizes of the correspondence points, a set of the information about the relative orientations of the correspondence points, coordinate values of a reference point, a set of the first coordinate value information and a set of the second coordinate value information (step S4505). The correspondence point selecting unit 4401 performs clustering on the feature points, based on the set of the information about the relative scale sizes of the correspondence points, a range of relative scale sizes, a set of the relative coordinate value information and a range of the relative coordinate values, and selects the feature points based on the result of the clustering (step S4506). Processing then transfers to the step S4507 shown in FIG. 45.

With the modification 15, the advantageous effects similar to those of the modification 7 may be obtained. In addition, clustering is performed just on the feature points having the relative scale size values within the range of the relative scale size values and the feature points having the relative coordinate values within the range of the relative coordinate values. Hence, the volume of computations may be lesser than that of the modification 7.

[Modification 16]

Figure 46:
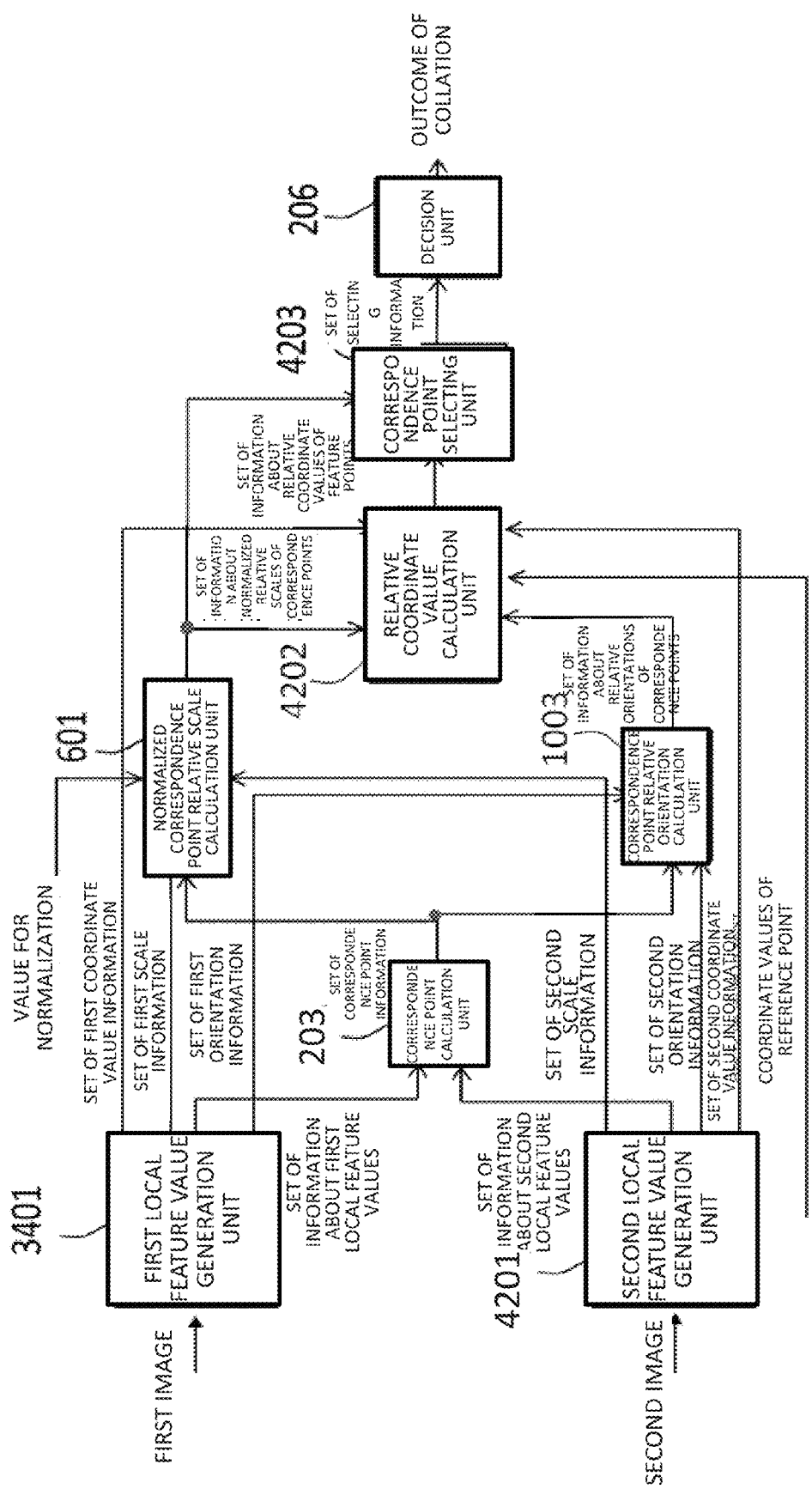
FIG. 46 is a block diagram showing a configuration of a modification 16.

Referring now to FIG. 46, a modification 16 will be illustrated. FIG. 46 depicts a block diagram showing a functional configuration of an image processing apparatus 460 according to the modification 16. Referring to FIG. 46, the image processing apparatus 460 is similar in configuration to the image processing apparatus 420 shown in FIG. 42, with the difference being the configuration as well as the operation of a normalized relative correspondence point scale size calculation unit 601. Since the operation of the normalized relative correspondence point scale size calculation unit 601 is the same as that of the exemplary embodiment 14, a detailed explanation is here not made for simplicity.

(Operation of Modification 16)

The operation of the modification 16 will be described in detail with reference to FIG. 47 which shows a flowchart illustrating the operation. It should be noted that, since the steps S4701 through S4703 and S4707 shown in FIG. 47 are respectively the same as the steps S301 through S303 and S306, shown in FIG. 3, the corresponding explanation is dispensed with.

Figure 47:
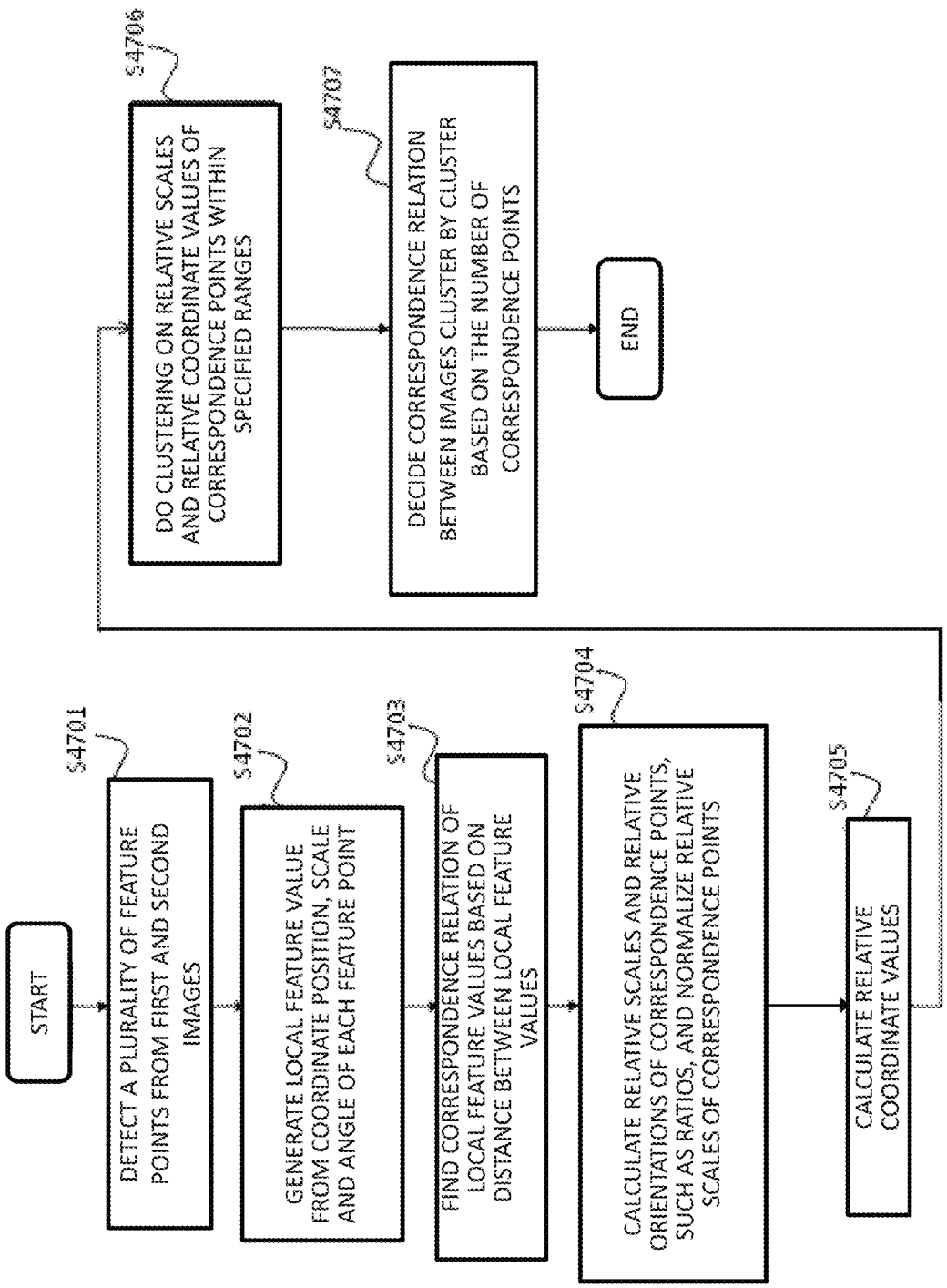
FIG. 47 is a flowchart showing the operation of the modification 16.

After executing the processing of the steps S4701 through S4703, shown in FIG. 47, the normalized relative correspondence point scale size calculation unit 601 calculates scale relationships, using a set of the first scale information, a set of the second scale information and a set of the information about the correspondence points, and normalizes the so calculated scale relationships based e.g., on an image size or an actual size of the photographic subject(s). On the other hand, a relative correspondence point orientation calculation unit 1003 calculates information about the relative orientations of the correspondence points, based on a set of the first orientation information, a set of the second orientation information and the set of the information about the correspondence points (step S4704). A relative coordinate value calculation unit 4202 calculates the relative coordinate values, using a set of the information about the normalized relative scale sizes of the correspondence points, a set of the information about the relative orientations of the correspondence points, coordinate values of a reference point, a set of the first coordinate value information and a set of the second coordinate value information (step S4705). A correspondence point selecting unit 4203 performs clustering on feature points, based on a set of the information about the normalized relative scale sizes of the correspondence points, a range of the relative scale sizes, a set of the relative coordinate value information and a range of the relative coordinate values, and selects the feature points based on the results of the clustering (step S4706). Processing then transfers to the step S4707 shown in FIG. 47.

(Advantageous Effects of Modification 16)

With the modification 16, the same advantageous effects as those of the exemplary embodiment 7 may be obtained. In addition, in case the relative scale sizes between feature points, correctly matched between different images, are normalized, the relative scale sizes of the matching scale become constant from one photographic subject in the first image to another. Consequently, even if the photographic subjects differing in size between the images are involved in the modification 16, in which clustering on the feature points is performed using the normalized relative scale size values of the correspondence points, those photographic subjects may be identified more precisely than in the exemplary embodiment 7.

[Modification 17]

Figure 48:
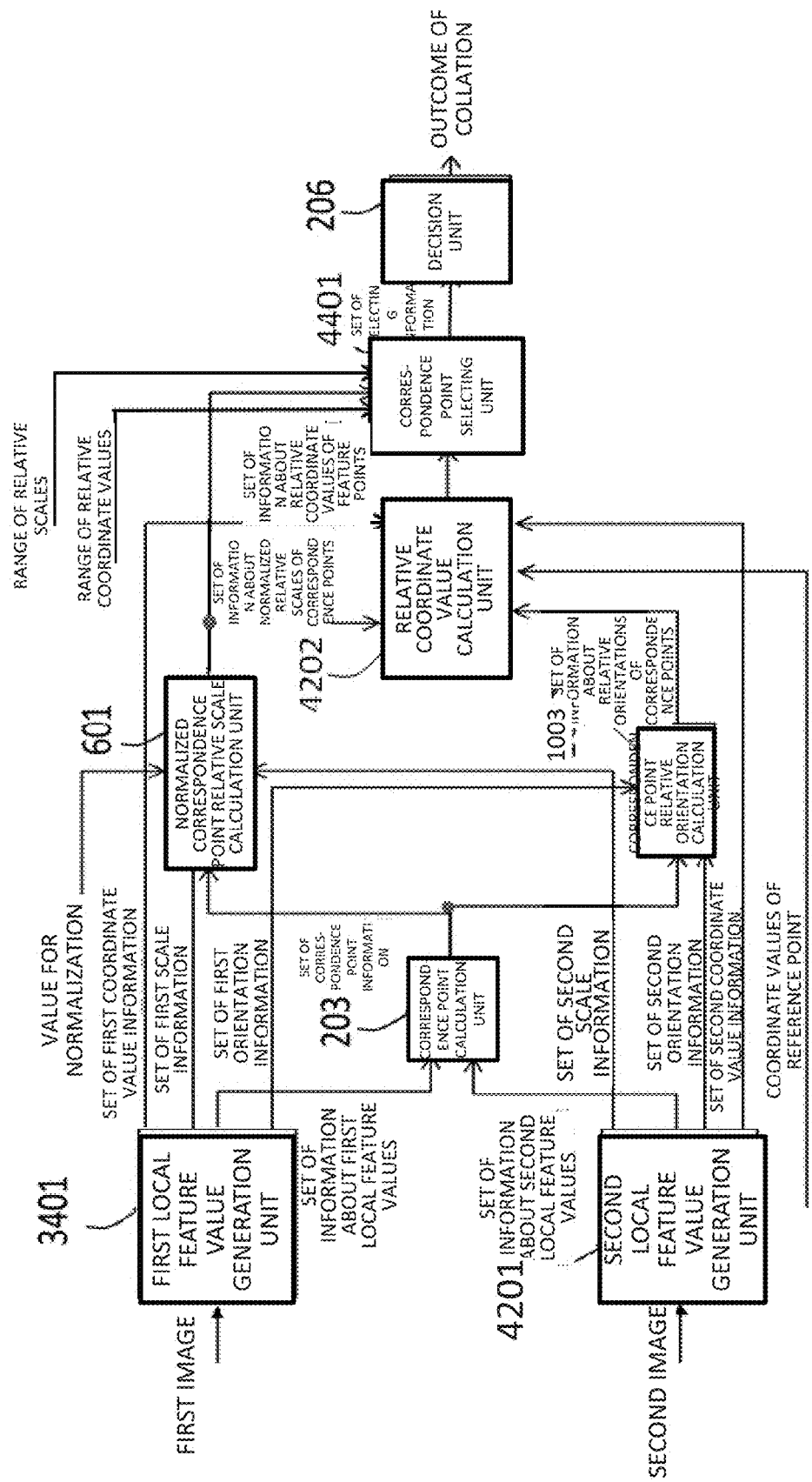
FIG. 48 is a block diagram showing a configuration of a modification 17.

A modification 17 will now be explained with reference to FIG. 48, which is a block diagram showing a functional configuration of an image processing apparatus 480 according to the subject modification. The image processing apparatus 480 is similar in configuration to the image processing apparatus 460, shown in FIG. 46, with the difference residing in the configuration as well as the operation of a correspondence point selecting unit 4401. Since the correspondence point selecting unit 4401 is of a configuration similar to the corresponding component used in the modification 16, a detailed explanation is here dispensed with.

(Operation of Modification 17)

The operation of the modification 17 will be described in detail with reference to FIG. 49 which shows a flowchart illustrating the operation.

Figure 49:
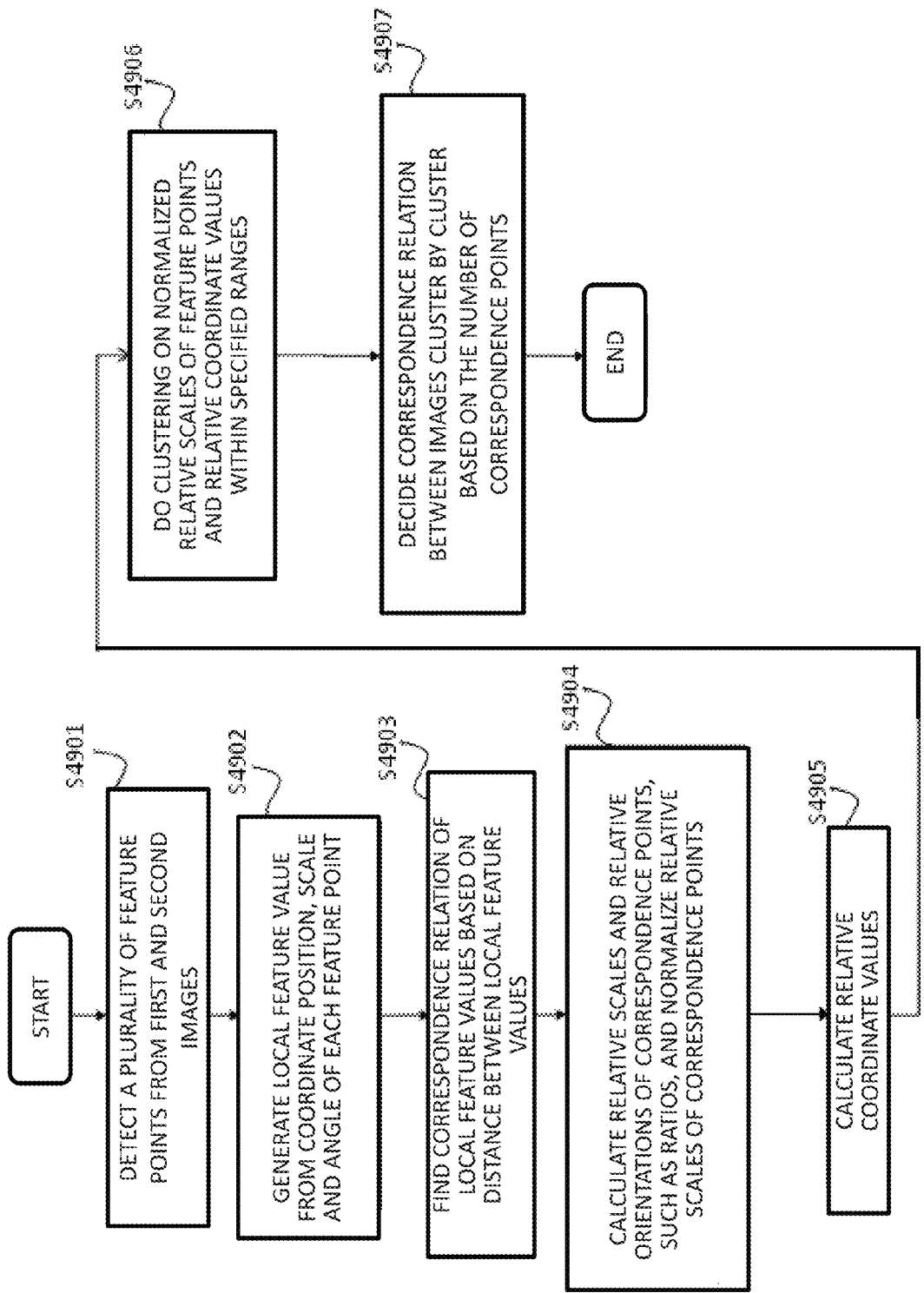
FIG. 49 is a flowchart showing the operation of the modification 17.

Since the steps S4901 through S4903 and S4907 shown in FIG. 49 are respectively the same as the steps S301 through S303 and S306, shown in FIG. 3, a detailed explanation is here not made for simplicity.

After executing the processing of the steps S4901 through S4903, shown in FIG. 49, a normalized relative correspondence point scale size calculation unit 601 calculates scale relationships, based on a set of the first scale information, a set of the second scale information and a set of the information about the correspondence points. The normalized relative correspondence point scale size calculation unit then normalizes the so calculated scale relationships, based on an image size of the photographic subject or its actual size. A relative correspondence point orientation calculation unit 1003 calculates the information about the relative orientations of the correspondence points, based on a set of the first orientation information, a set of the second orientation information and the set of the information about the correspondence points (step S4904). A relative coordinate value calculation unit 4202 calculates relative coordinate values, using a set of the information about the normalized relative scale sizes of the correspondence points, a set of the information about the relative orientations of the correspondence points, coordinate values of the reference point, a set of the first coordinate value information and a set of the second coordinate value information (step S4905). The correspondence point selecting unit 4401 performs clustering on the feature points, based on a set of the information about the relative scale sizes of the correspondence points, a range of the relative scale sizes, a set of the information about the relative coordinate values and a range of the relative coordinate values, and selects the feature points based on the result of the clustering (step S4906). Processing then transfers to the step S4907 shown in FIG. 49.

(Advantageous Effects of Modification 17)

With the modification 17, the same advantageous effects as those of the exemplary embodiment 15 may be obtained. In addition, since the normalized relative scale sizes of the correspondence points become constant from one photographic subject in the first image to another, the advantageous effects similar to those of the modification 16 may be obtained by performing clustering on the feature points based on the normalized relative scale size values of the correspondence points. Moreover, in the present exemplary embodiment, clustering is performing on just the feature points having the relative scale size values within the range of the relative scale sizes and the feature points having the relative coordinate values within the range of the relative coordinate values. Hence, the volume of computations may be lesser than in the modification 16.

[Modification 18]

Figure 50:
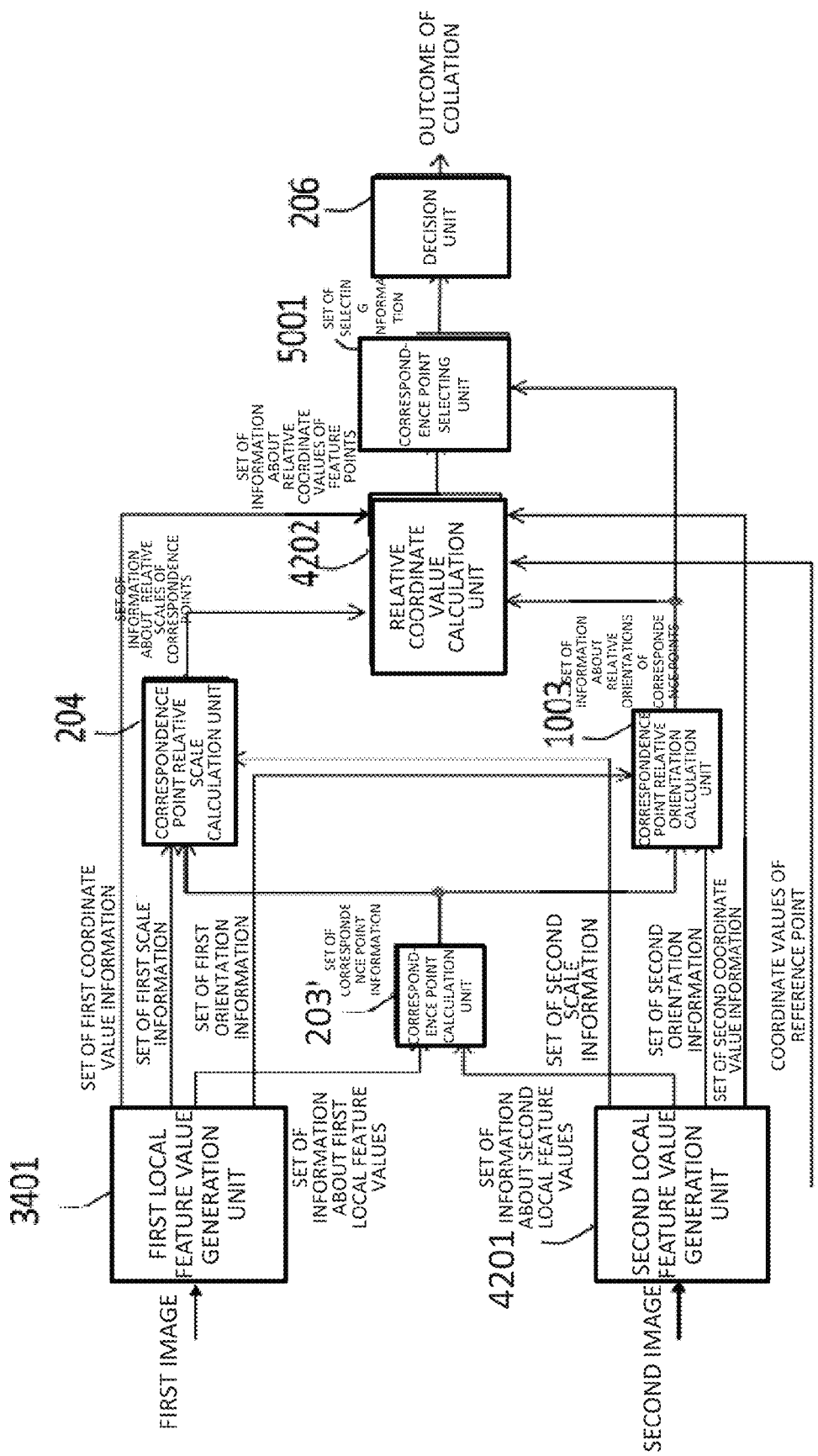
FIG. 50 is a block diagram showing a configuration of a modification 18.

A modification 18 will be illustrated with reference to FIG. 50 showing a block diagram illustrating a functional configuration of an image processing apparatus 500 according to the modification 18. Referring to FIG. 50, the image processing apparatus 500 is similar in configuration to the image processing apparatus 340 shown in FIG. 34, with the difference being the configuration as well as the operation of a second local feature value generation unit 4201, a relative coordinate value calculation unit 4202 and a correspondence point selecting unit 5001. The second local feature value generation unit 4201 and the relative coordinate value calculation unit 4202 are similar to the corresponding components used in the modification 17 in the configuration as well as in the operation and hence a detailed explanation is here not made for simplicity.

The correspondence point selecting unit 5001 performs clustering on the feature points, using a set of the relative coordinate value information that the relative coordinate value calculation unit 4202 has output, and a set of the information about the relative orientations of the correspondence points that the relative correspondence point orientation calculation unit 1003 has output, and selects the feature point based on the result of the clustering.

The operation of the modification 18 will be described in detail with reference to FIG. 51 which shows a flowchart illustrating the operation. Since the steps S5101 through S5103 and S5107 shown in FIG. 51 are respectively the same as the steps S301 through S303 and S306, shown in FIG. 3, a detailed explanation is here made for simplicity.

Figure 51:
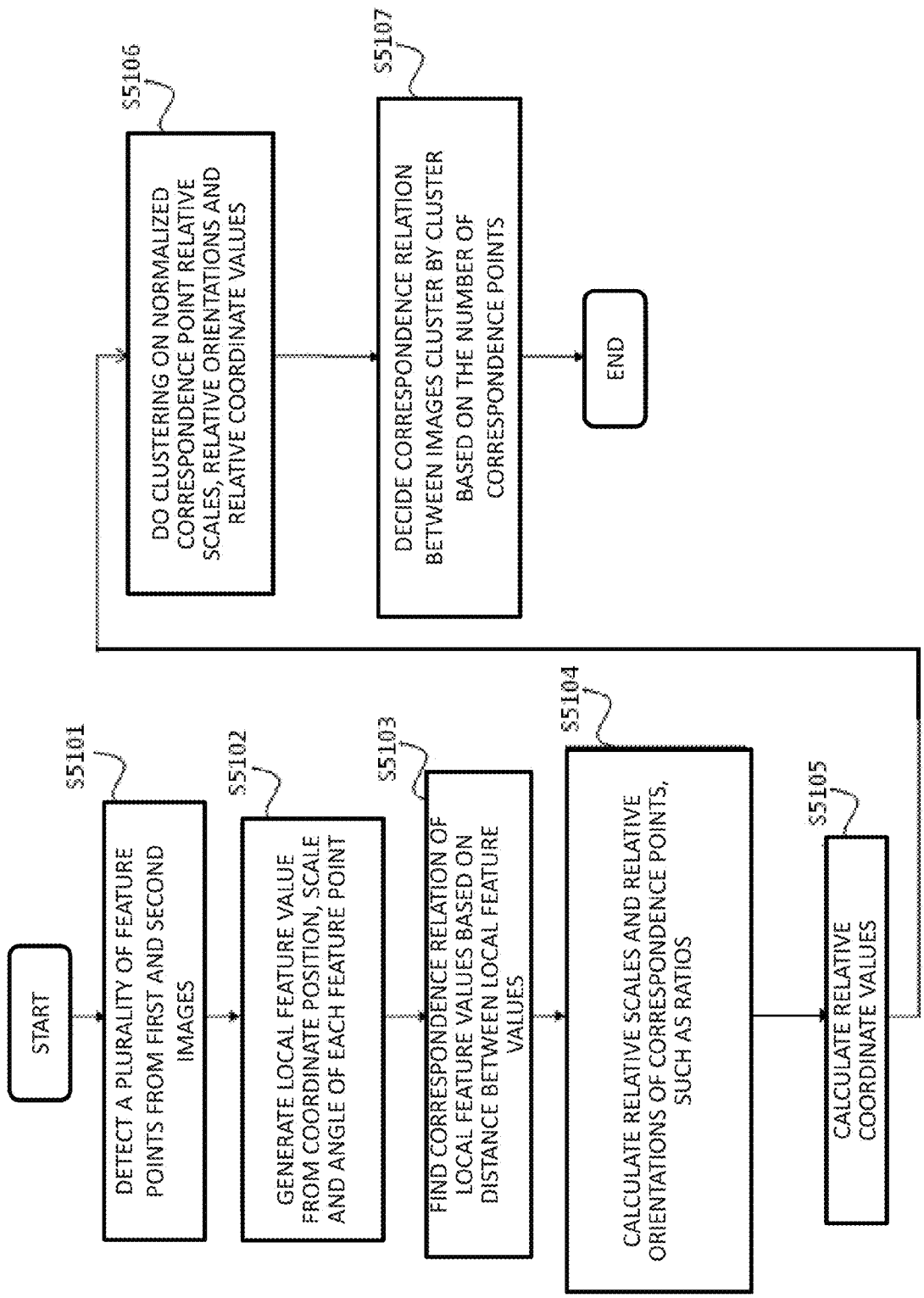
FIG. 51 is a flowchart showing the operation of the modification 18.

After executing the processing of the steps S5101 through S5103, shown in FIG. 51, a relative correspondence point scale size calculation unit 204 calculates scale relationships, based on a set of the first scale information, a set of the second scale information and a set of the information about the correspondence points. The relative correspondence point orientation calculation unit 1003 calculates the information about the relative orientations of the correspondence points, based on a set of the first orientation information, a set of the second orientation information and the set of the information about the correspondence points (step S5104). The relative coordinate value calculation unit 4202 calculates relative coordinate values, using a set of the information about the relative scale sizes of the correspondence points, a set of the information about the relative orientations of the correspondence points, coordinate values of the reference point, a set of the first coordinate value information and a set of the second coordinate value information (step S5105). The correspondence point selecting unit 5001 performs clustering on the feature points, based on a set of the information about the relative orientations of the correspondence points and a set of the information about the relative coordinate values, and selects the feature points based on an outcome of the clustering (step S5106). Processing then transfers to the step S5107 shown in FIG. 51.

(Advantageous Effects of Modification 18)

With the modification 18, the advantageous effects similar to those with the modification 11 may be obtained. In addition, the feature points of the first image are collected about the center of the photographic subject before proceeding to clustering, so that clustering precision may be higher than with the modification 11. Consequently, the same or similar photographic subjects within an image can be identified more precisely than is possible with the modification 11.

[Modification 19]

Figure 52:
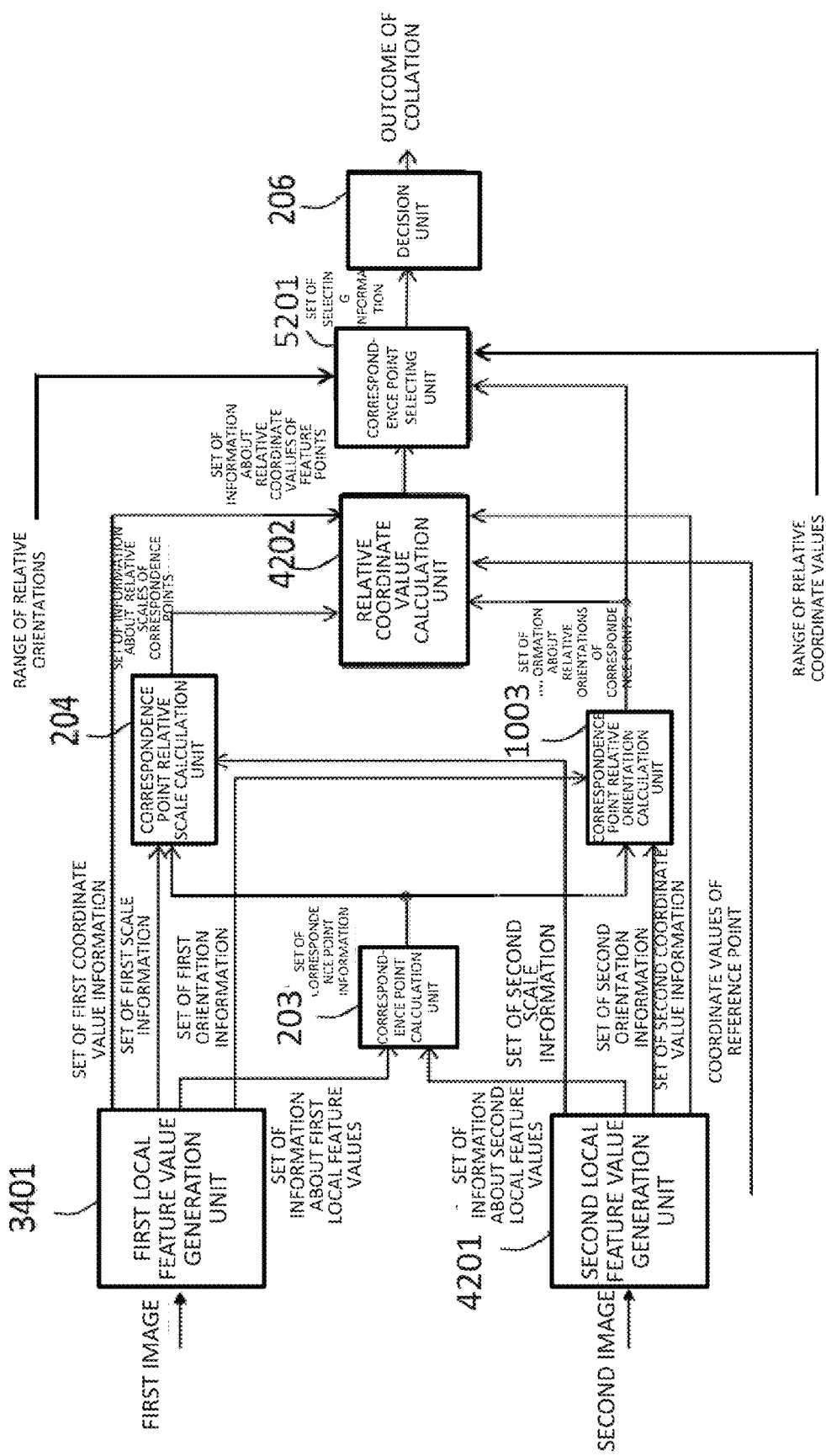
FIG. 52 is a block diagram showing a configuration of a modification 19.

A modification 19 will be illustrated with reference to FIG. 52 showing a block diagram illustrating a functional configuration of an image processing apparatus 520 according to the modification 19. Referring to FIG. 52, the image processing apparatus 520 is similar in configuration to the image processing apparatus 500 shown in FIG. 50, with the difference being the configuration as well as the operation of a correspondence point selecting unit 5201.

The correspondence point selecting unit 5201 performs clustering on the feature points, using a set of the relative coordinate value information that a relative coordinate value calculation unit 4202 has output, a range of the relative coordinate values, a set of the information about the relative orientations of the correspondence points that a relative correspondence point orientation calculation unit 1003 has output, and a range of the relative orientations.

(Operation of Modification 19)

The operation of the modification 19 will be described in detail with reference to FIG. 53 which shows a flowchart illustrating the operation. It should be noted that, since the steps S5301 through S5303 and S5307 shown in FIG. 53 are respectively the same as the steps S301 through S303 and the step S306, shown in FIG. 3, the corresponding illustration here is dispensed with.

Figure 53:
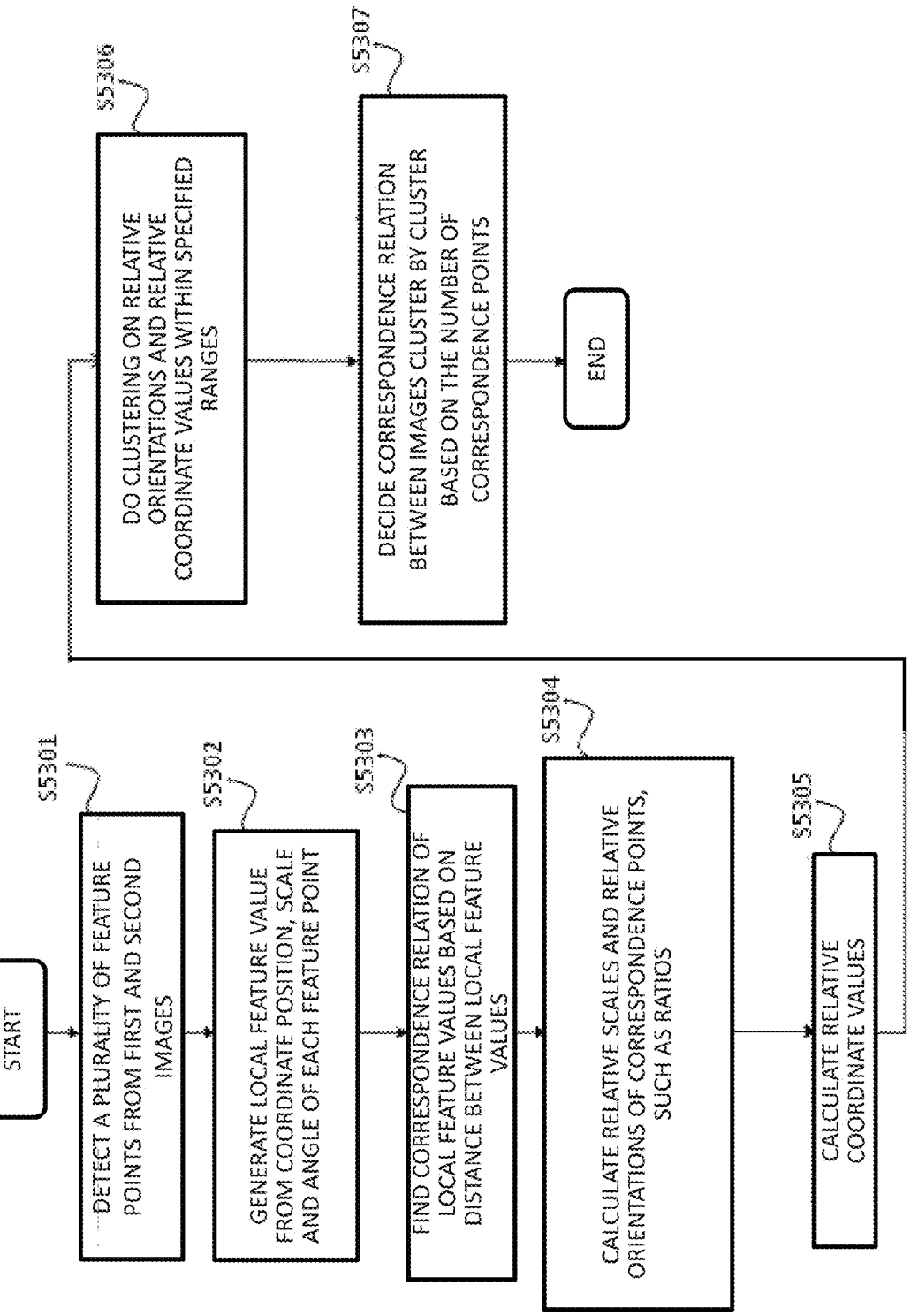
FIG. 53 is a flowchart showing the operation of the modification 19.

After executing the processing of the steps S5301 through S5303, shown in FIG. 53, a relative correspondence point scale size calculation unit 204 calculates scale relationships, based on a set of the first scale information, a set of the second scale information and a set of the information about the correspondence points, while the relative correspondence point orientation calculation unit 1003 calculates the information about the relative orientations of the correspondence points, based on a set of the first orientation information, a set of the second orientation information and the set of the information about the correspondence points (step S5304). A relative coordinate value calculation unit 4202 calculates the relative coordinate values, using a set of the information about the relative scale sizes of the correspondence points, a set of the information about the relative orientations of the correspondence points, coordinate values of the reference point, a set of the first coordinate value information and a set of the second coordinate value information (step S5305). The correspondence point selecting unit 5201 performs clustering on the feature points, based on a set of the information about the relative orientations of the correspondence points, a set of the relative coordinate value information, a range of the relative orientations and a range of the relative coordinate values, and selects the feature points based on an outcome of the clustering (step S5306). Processing then transfers to the step S5307 shown in FIG. 53.

(Advantageous Effects of Modification 19)

With the modification 19, the advantageous effects similar to those of the modification 18 may be obtained. In addition, clustering is performed on just the feature points having the relative orientation values within the range of the relative orientations and the feature points having the relative coordinate values within the range of the relative coordinate values. Hence, the computational volume may be lesser than with the modification 18.

[Modification 20]

Figure 54:
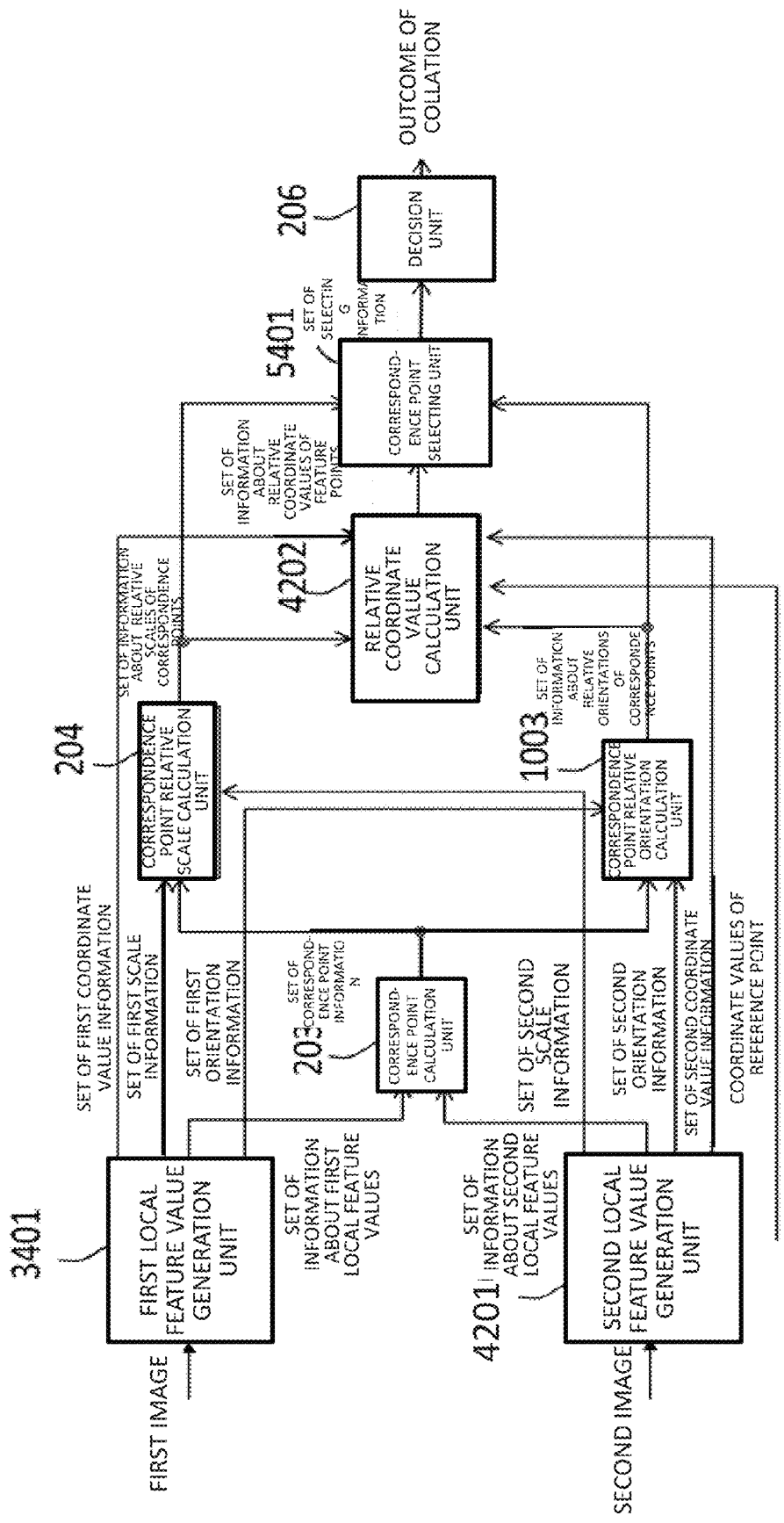
FIG. 54 is a block diagram showing a configuration of a modification 20.

A modification 20 will be illustrated with reference to FIG. 54 that depicts a block diagram showing a functional configuration of an image processing apparatus 540 according to the modification 20. Referring to FIG. 54, the image processing apparatus 540 is similar in configuration to the image processing apparatus 420 shown in FIG. 42, with the difference being the configuration as well as the operation of a correspondence point selecting unit 5401.

The correspondence point selecting unit 5401 performs clustering on the feature points, using a set of the information about the relative coordinate values that a relative coordinate value calculation unit 4202 has output, a set of the information about the relative scale sizes of the correspondence points that a relative correspondence point scale size calculation unit 204 has output, and a set of the information about the relative orientations of the correspondence points that a relative correspondence point orientation calculation unit 1003 has output.

(Operation of Modification 20)

The operation of the modification 20 will be described in detail with reference to FIG. 55 which shows a flowchart illustrating the operation. It should be noted that, since the steps S5501 through S5503 and S5507, shown in FIG. 55, are respectively the same as the steps S301 through S303 and the step S306, shown in FIG. 3, the corresponding illustration here is dispensed with.

Figure 55:
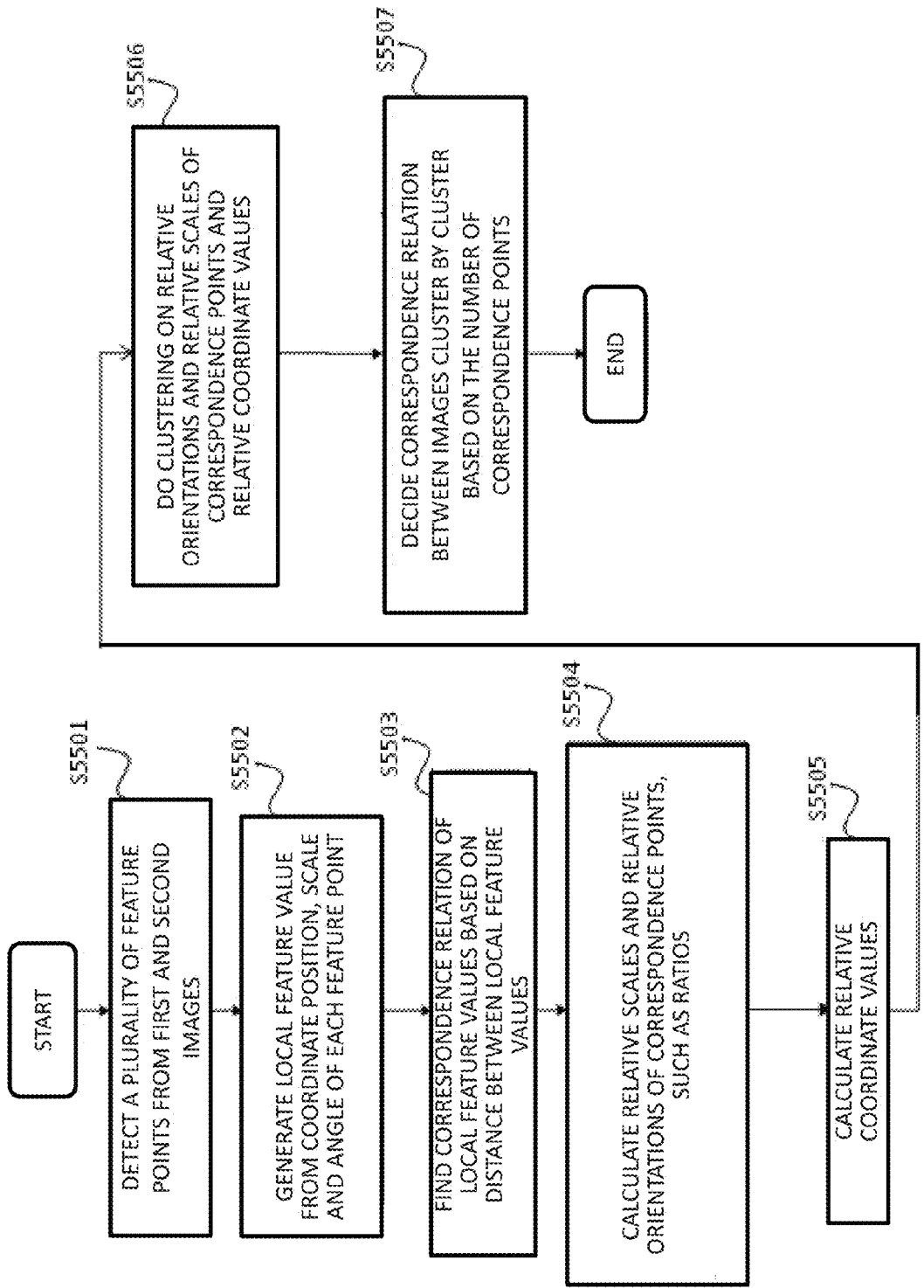
FIG. 55 is a flowchart showing the operation of the modification 20.

After executing the processing of the steps S5501 through S5503, shown in FIG. 55, the relative correspondence point scale size calculation unit 204 calculates scale relationships, based on a set of the first scale information, a set of the second scale information and a set of the information about the correspondence points, while the relative correspondence point orientation calculation unit 1003 calculates the information about the relative orientations of the correspondence points, based on a set of the first orientation information, a set of the second orientation information and the set of the information about the correspondence points (step S5504). The relative coordinate value calculation unit 4202 calculates relative coordinate values, using a set of the information about the relative scale sizes of the correspondence points, a set of the information about the relative orientations of the correspondence points, coordinate values of the reference point, a set of the first coordinate value information and a set of the second coordinate value information (step S5505). The correspondence point selecting unit 5401 performs clustering on feature points, based on the set of the information about the relative scale sizes of the correspondence points, the set of the information about the relative orientations of the correspondence points and the set of the relative coordinate value information, and selects the feature points based on an outcome of the clustering (step S5506). Processing then transfers to the step S5507 shown in FIG. 55.

(Advantageous Effects of Modification 20)

With the modification 20, the same advantageous effects as those of the exemplary embodiment 7 may be obtained. In addition, the relative orientations between the feature points, correctly matched between different images, become constant from one photographic subject to another, so that, by clustering on the feature points based on the information about the relative orientations of the correspondence points, it is possible to eliminate mistaken matching events between the feature point of the first image and the feature point of the second image. Thus, with the present exemplary embodiment, it is possible to identify the same or analogous photographic subjects in an image more precisely than is possible with the exemplary embodiment 7.

[Modification 21]

Figure 56:
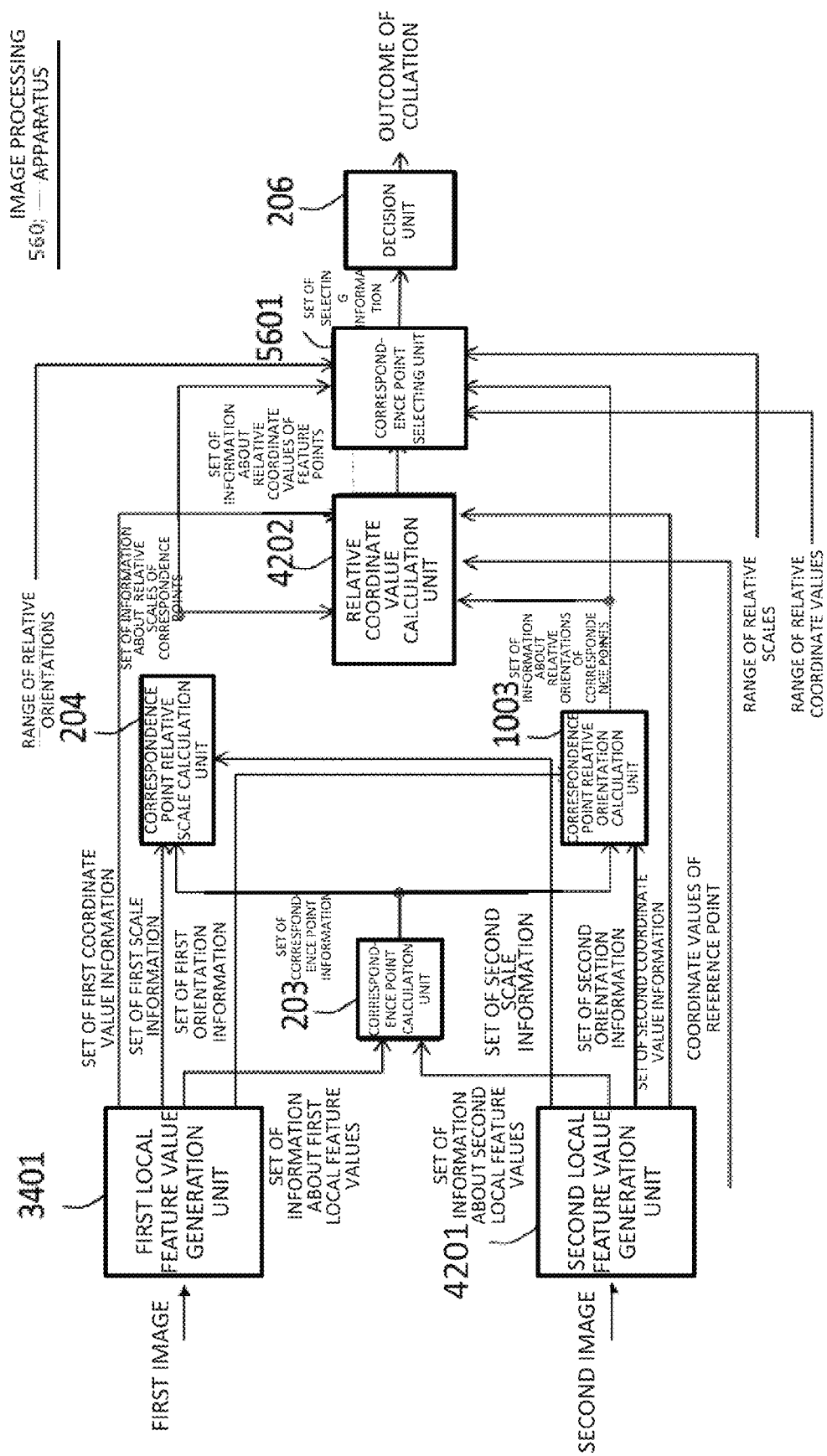
FIG. 56 is a block diagram showing a configuration of a modification 21.

A modification 21 will now be explained with reference to FIG. 56, which is a block diagram showing a functional configuration of an image processing apparatus 560 according to the modification 21. Referring to FIG. 56, the image processing apparatus 560 is similar in configuration to the image processing apparatus 540, shown in FIG. 54, with the difference residing in the configuration as well as the operation of a correspondence point selecting unit 5601.

The correspondence point selecting unit 5601 performs clustering on the feature points, using a set of the relative coordinate value information that a relative coordinate value calculation unit 4202, a range of the relative coordinate values has output, a set of the information about the relative scale sizes of the correspondence points that a relative correspondence point scale size calculation unit 204 has output, a range of the relative scale sizes, a set of the information about the relative orientations of the correspondence points that a relative correspondence point orientation calculation unit 1003 has output, and a range of the relative orientations.

(Operation of Modification 21)

The operation of the modification 21 will be described in detail with reference to FIG. 57 which shows a flowchart illustrating the operation. It should be noted that the steps S5701 through S5703 and S5707, shown in FIG. 57, are respectively the same as the steps S301 through S303 and the step S306, shown in FIG. 3, and hence a detailed explanation here is dispensed with.

Figure 57:
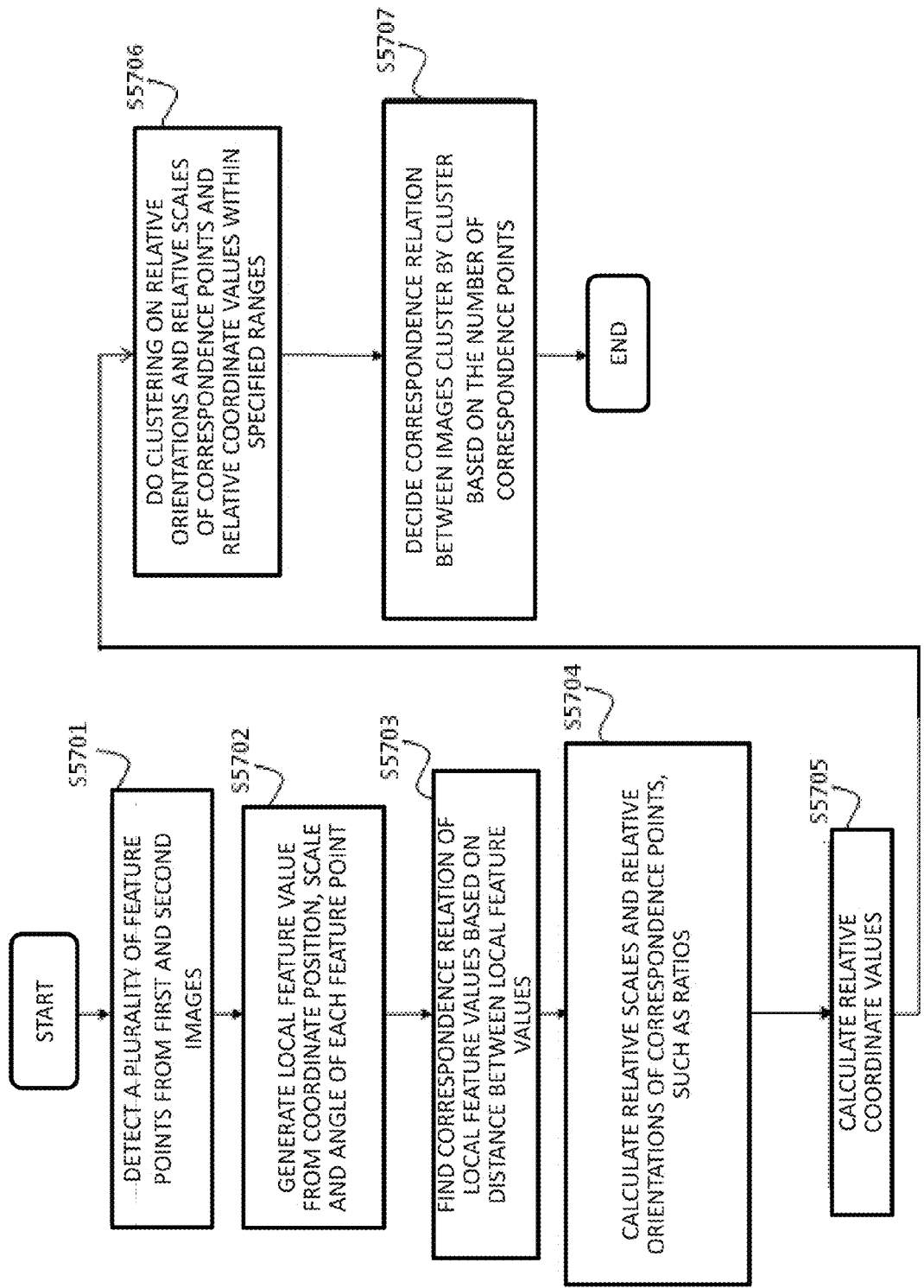
FIG. 57 is a flowchart showing the operation of the modification 21.

After executing the processing of the steps S5701 through S5703, shown in FIG. 57, the relative correspondence point scale size calculation unit 204 calculates scale relationships, based on a set of the first scale information, a set of the second scale information and a set of the information about the correspondence points, while the relative correspondence point orientation calculation unit 1003 calculates the information about the relative orientations of the correspondence points, based on a set of the first orientation information, a set of the second orientation information and the set of the information about the correspondence points (step D5704). A relative coordinate value calculation unit 4202 calculates relative coordinate values, using a set of the information about the relative scale sizes of the correspondence points, a set of the information about the relative orientations of the correspondence points, coordinate values of the reference point, a set of the first coordinate value information and a set of the second coordinate value information (step S5705). The correspondence point selecting unit 5601 performs clustering on feature points, based on a set of the information about the relative scale sizes of the correspondence points, a set of the information about the relative orientations of the correspondence points, a set of the relative coordinate value information, a range of the relative scale sizes, a range of the relative orientations and a range of the relative coordinate values, and selects the feature points based on an outcome of the clustering (step S5706). Processing then transfers to the step S5707 shown in FIG. 57.

(Advantageous Effects of Modification 21)

With the modification 21, the advantageous effects similar to those of the modification 20 may be obtained. In addition, since clustering is performed on just the feature points having relative scale size values within the range of the relative scale sizes, the feature points having the orientation information within the range of the relative orientations and the feature points having relative coordinate values within the range of the relative coordinate values, the computational volume may be lesser than with the modification 20.

[Modification 22]

Figure 58:
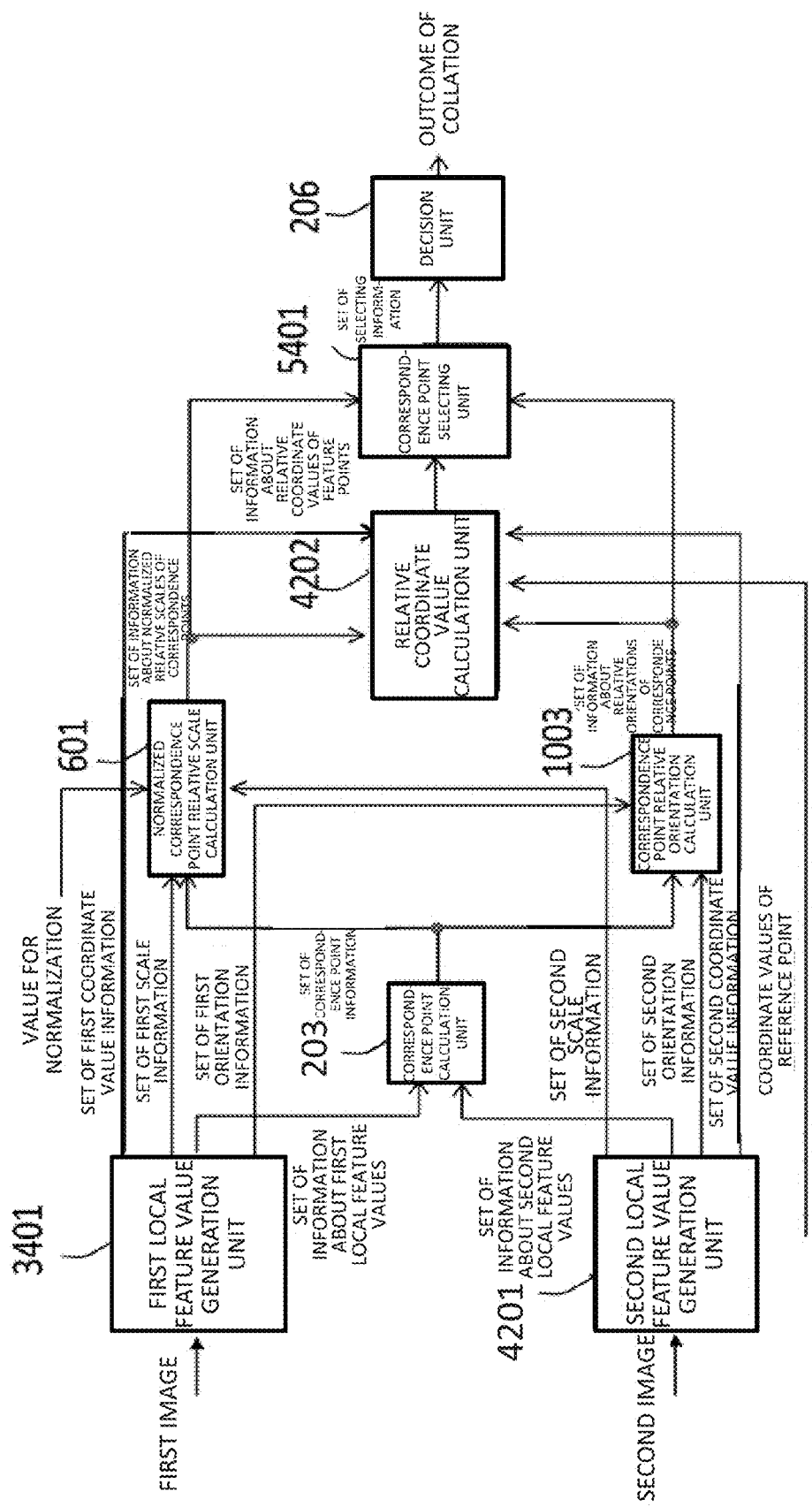
FIG. 58 is a block diagram showing a configuration of a modification 22.

A modification 22 will be illustrated with reference to FIG. 58 that depicts a block diagram showing a functional configuration of an image processing apparatus 580 according to the modification 22. Referring to FIG. 58, the image processing apparatus 580 is similar in configuration to the image processing apparatus 540 shown in FIG. 54, with the difference being the configuration as well as the operation of a normalized relative correspondence point scale size calculation unit 601. Since the operation of the normalized relative correspondence point scale size calculation unit 601 is the same as that of the modification 17, a detailed explanation is here not made for simplicity.

(Operation of Modification 22)

The operation of the modification 22 will be described in detail with reference to FIG. 59 which shows a flowchart illustrating the operation. It should be noted that, since the steps S5901 through S5903 and S5907, shown in FIG. 59, are respectively the same as the steps S301 through S303 and the step S306, shown in FIG. 3, the corresponding explanation here is dispensed with.

Figure 59:
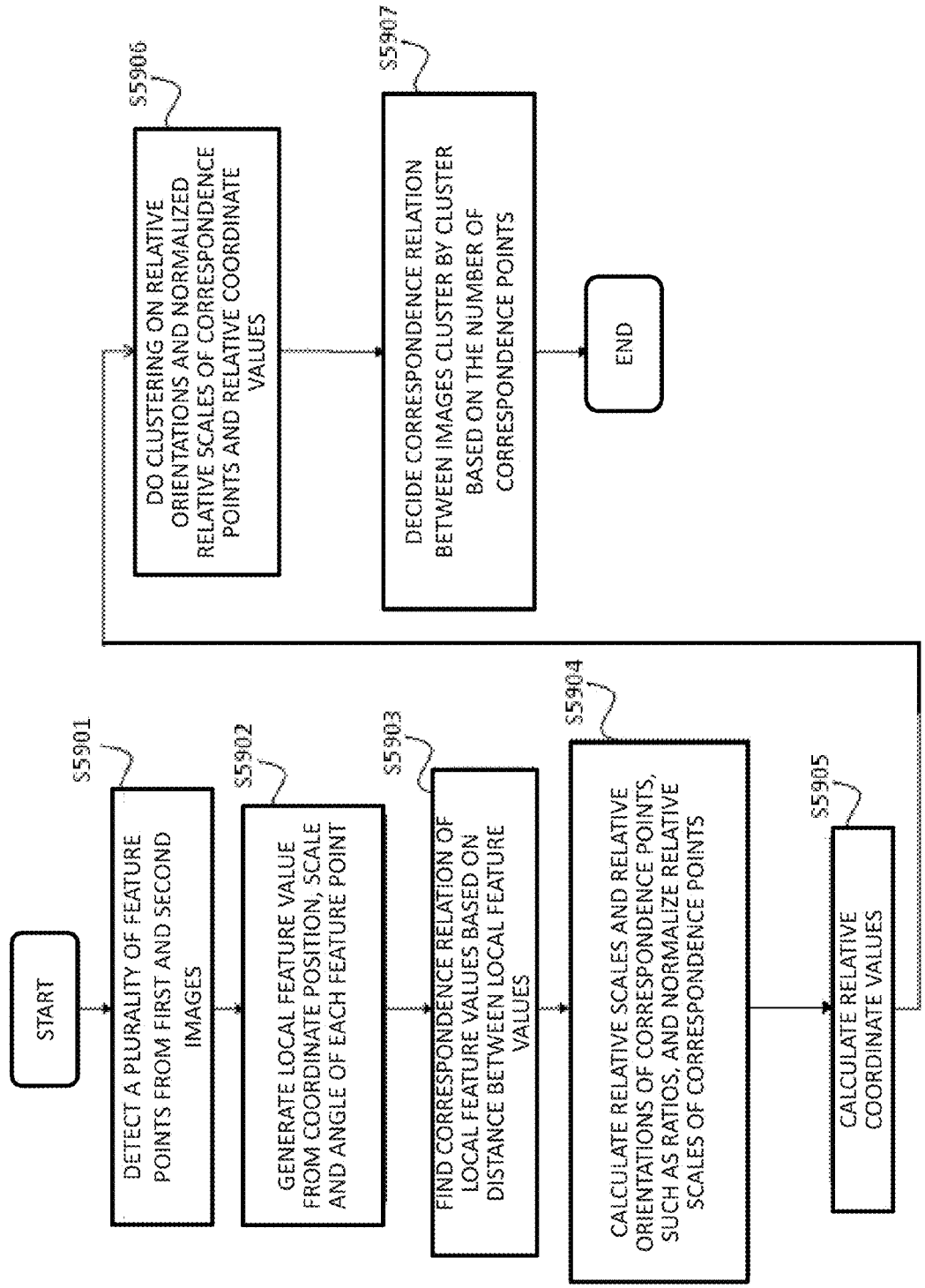
FIG. 59 is a flowchart showing the operation of the modification 22.

After executing the processing of the steps S5901 through S5903, shown in FIG. 59, the normalized relative correspondence point scale size calculation unit 601 calculates scale relationships, based on a set of the first scale information, a set of the second scale information and a set of the information about the correspondence points, and normalizes the so calculated scale relationships based on an image size or an actual size of the photographic subject. A relative correspondence point orientation calculation unit 1003 calculates the information about the relative orientations of the correspondence points, using a set of the first orientation information, a set of the second orientation information and the set of the information about the correspondence points (step S5904). A relative coordinate value calculation unit 4202 calculates relative coordinate values, using a set of the information about the relative scale sizes of the correspondence points, a set of the information about the relative orientations of the correspondence points, coordinate values of a reference point, a set of the first coordinate value information and a set of the second coordinate value information (step S5905). A correspondence point selecting unit 5401 performs clustering on feature points, based on the set of the information about the relative scale sizes of the correspondence points, the set of the information about the relative orientations of the correspondence points and a set of information about the relative coordinate values, and selects the feature points based on an outcome of the clustering (step S5906). Processing then transfers to the step S5907 shown in FIG. 59.

(Advantageous Effects of Modification 22)

With the modification 22, the same advantageous effects as those of the exemplary embodiment 20 may be obtained. In addition, in case the relative scale sizes between feature points, correctly matched between different images, are normalized, the matching scale relative scale sizes become constant from one photographic subject in the first image to another. Consequently, if the photographic subjects, differing in size between the images, are involved in the modification 22, in which clustering is performed on the feature points based on the normalized relative scale size values of the correspondence points, it is possible to identify the photographic subjects more precisely than in the exemplary embodiment 20.

[Modification 23]

Figure 60:
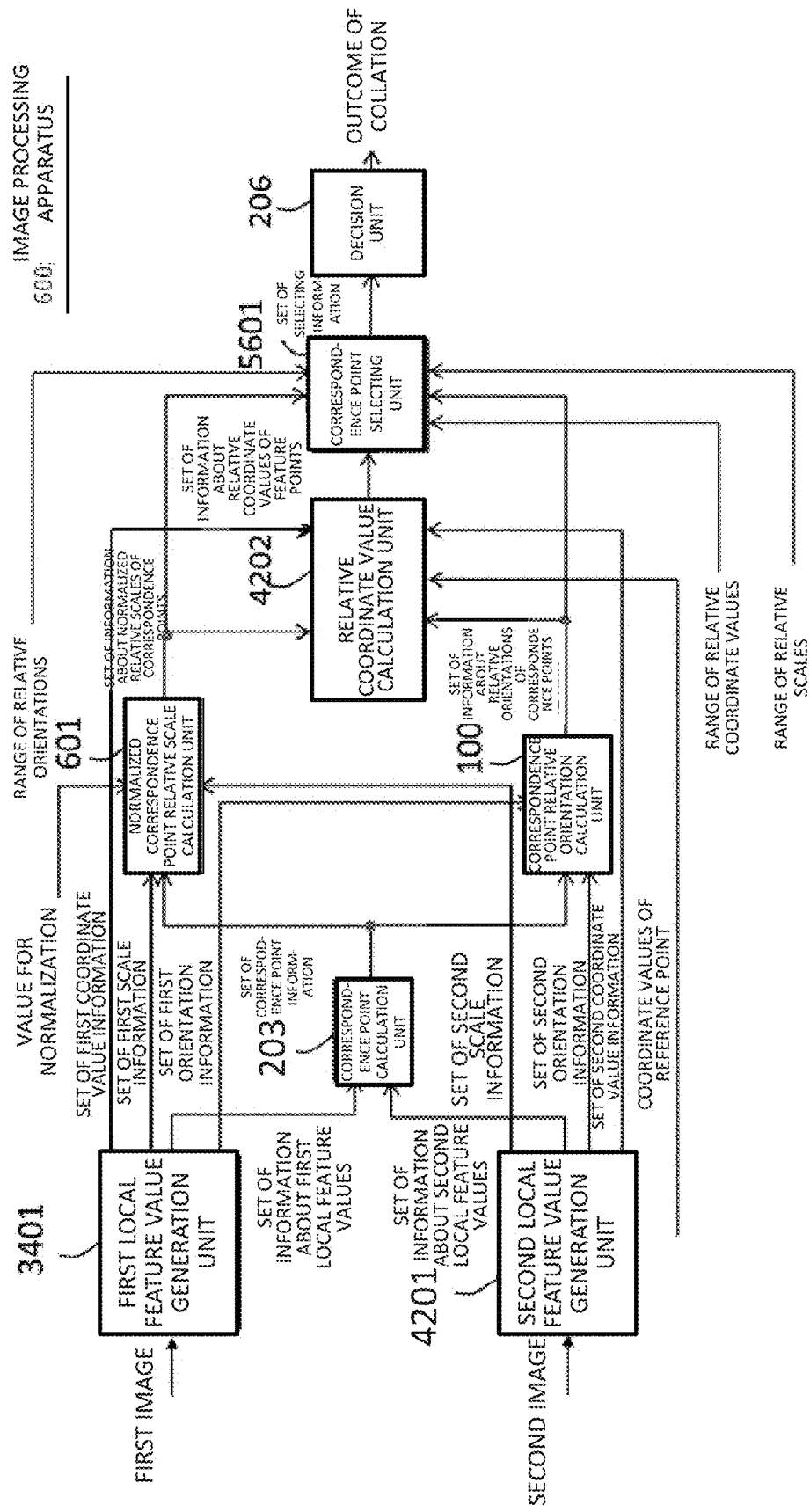
FIG. 60 is a block diagram showing a configuration of a modification 23.

A modification 23 will be illustrated with reference to FIG. 60 that depicts a block diagram showing a functional configuration of an image processing apparatus 600 according to the modification 23. Referring to FIG. 60, the image processing apparatus 600 is similar in configuration to the image processing apparatus 580, shown in FIG. 58, with the difference being the configuration as well as the operation of a correspondence point selecting unit 5601. Since the operation of the correspondence point selecting unit 5601 is the same as that of the modification 21, a detailed explanation is dispensed with.

(Operation of Modification 23)

The operation of the modification 23 will be described in detail with reference to FIG. 61 which shows a flowchart illustrating the operation. It should be noted that, since the steps S6101 through S6103 and S6107, shown in FIG. 61, are respectively the same as the steps S301 through S303 and the step S306, shown in FIG. 3, the corresponding explanation here is dispensed with.

Figure 61:
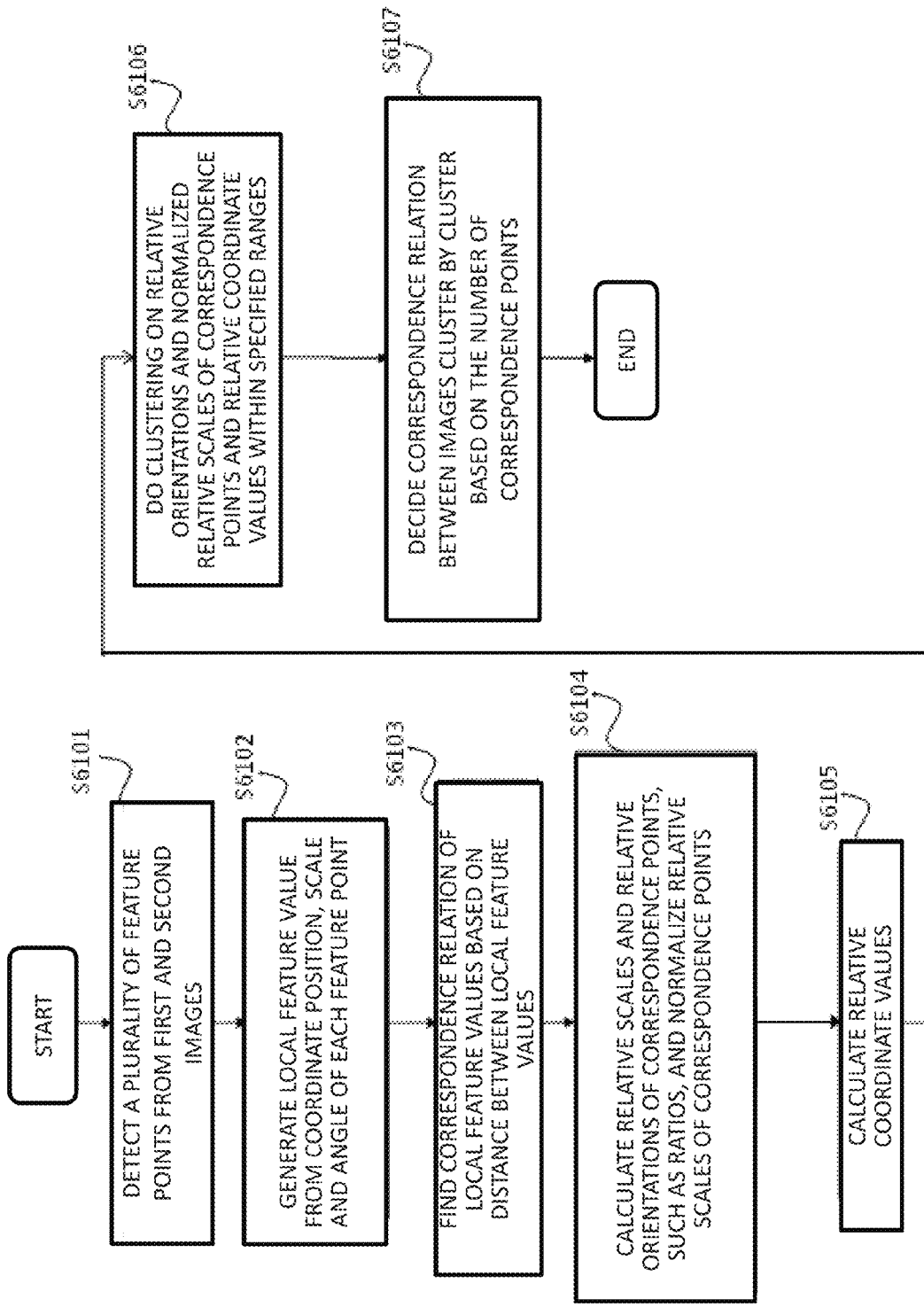
FIG. 61 is a flowchart showing the operation of the modification 23.

After executing the processing of the steps S6101 through S6103, shown in FIG. 61, the normalized relative correspondence point scale size calculation unit 601 calculates scale relationships, based on a set of the first scale information, a set of the second scale information and a set of the information about the correspondence points, and normalizes the scale relationships calculated, using an image size, an actual size of the photographic subject and so on. A relative correspondence point orientation calculation unit 1003 calculates the information about the relative orientations of the correspondence points, based on a set of the first orientation information, a set of the second orientation information and the set of the information about the correspondence points (step S6104). A relative coordinate value calculation unit 4202 calculates relative coordinate values, using a set of the information about the relative scale sizes of the correspondence points, a set of the information about the relative orientations of the correspondence points, coordinate values of a reference point, a set of the first coordinate value information and a set of the second coordinate value information (step S6105). The correspondence point selecting unit 5601 performs clustering on feature points, based on a set of the information about the relative scale sizes of the correspondence points, a set of the information about the relative orientations of the correspondence points, a set of the information about the relative coordinate values, a range of the relative scale sizes, a range of the relative orientations and a range of the relative coordinate values, and selects the feature point based on an outcome of the clustering (step S6106). Processing then transfers to the step S6107 shown in FIG. 61.

(Advantageous Effects of Modification 23)

With the modification 23, the same advantageous effects as those of the exemplary embodiment 22 may be obtained. In addition, clustering is performed on just the feature points having relative scale size values within the range of the relative scale sizes, feature points having the relative orientation information within the range of the relative orientations, and feature points having relative coordinate values within the range of the relative coordinate values. Hence, the computational volume may be lesser than with the modification 22.

Part or all of the above described exemplary embodiments may be expressed as in the modes below, though not in a restrictive way.

[Mode 1]

The mode 1 is the same as the image processing apparatus according to the first aspect.

[Mode 2]

An image processing apparatus, comprising:

a first local feature value generation unit that detects one or more of first feature points from a first image, and calculates, from a region of a preset range encompassing each first feature point detected, a set of information about first local feature values corresponding to each first feature point;

a correspondence point calculation unit that calculates, as information about correspondence point(s), a correspondence relation between the first feature point(s) and a second feature point(s) contained in a set of information about second local feature values calculated from a second image;

a relative correspondence point orientation calculation unit that calculates, as information about relative orientations of the correspondence points, a relationship between an orientation of the first feature point(s) and an orientation of the second feature point(s), based on the set of the information about the first local feature values, the set of information about the second local feature values and the information about correspondence points;

a correspondence point selecting unit that, based on the information about relative orientations of the correspondence points, performs clustering on at least one out of the first feature point(s) and the second feature point(s), and selects at least one feature point based on an outcome of the clustering; and a decision unit that, based on the feature point(s) selected by the correspondence point selecting unit, compares the first image and the second image with each other, from cluster to cluster, and decides on possible photographic subject identity.

[Mode 3]

The image processing apparatus according to mode 1, wherein, the relative correspondence point scale size calculation unit normalizes the information about the relative scale sizes of the correspondence points.

[Mode 4]

The image processing apparatus according to any one of modes 1 to 3, wherein, the correspondence point selecting unit performs clustering on the first feature point(s) based on the relative correspondence point information and on coordinate values of the first feature point(s).

[Mode 5]

The image processing apparatus according to any one of modes 1 to 4, wherein, the correspondence point selecting unit generates selecting information that correlates the information about the correspondence points of the feature points selected and one or more of cluster information with each other.

[Mode 6]

The image processing apparatus according to any one of modes 1 to 5, further comprising: a relative coordinate value calculation unit that selects a reference point from the second image, and calculates relationship between the first feature point(s) and the reference point(s), as relative coordinate information, based on the first feature point(s), second feature point(s) and the relative correspondence point information.

[Mode 7]

The image processing apparatus according to any one of modes 1 to 6, wherein, the correspondence point selecting unit performs clustering on at least one out of the first feature point(s) and the second feature point(s), based on the relative correspondence point information and a preset range of the relative correspondence point information.

[Mode 8]

The mode 8 is the same as the photographic subject identifying method according to the second aspect.

[Mode 9]

A method for identifying a photographic subject, comprising:

detecting one or more of first local feature points from a first image, calculating, from a region of a preset range encompassing each first feature point detected, a set of information about first local feature values corresponding to each first feature point;

calculating, as information about correspondence point(s), a correspondence relation between the first feature point(s) and a second feature point(s) contained in a set of information about second local feature values calculated from a second image;

calculating, as information about relative orientations of correspondence points, a relationship between an orientation of the first feature point(s) and an orientation of the second feature point(s), based on the set of information about the first local feature values, the set of information about the second local feature values and the information about correspondence points;

performing clustering on at least one out of the first feature point(s) and the second feature point(s), based on the information about the relative orientations of the correspondence points, and selecting at least one feature point based on an outcome of the clustering; and comparing the first image and the second image with each other, based on the feature point(s) selected, from cluster to cluster, and deciding on possible photographic subject identity.

[Mode 10]

The mode 10 is the same as the non-transitory computer readable storage medium storing the program according to the third aspect.

[Mode 11]

A non-transitory computer readable storage medium storing a program that causes a computer controlling an image processing apparatus to perform the processing of:

detecting one or more of first feature points from a first image to calculate, from a region of a preset range encompassing each first feature point detected, a set of information about first local feature values corresponding to each first feature point;

calculating, as information about correspondence point(s), a correspondence relation between the first feature point(s) and a second feature point(s) contained in a set of information about second local feature value(s) calculated from a second image;

calculating, as information about the relative orientations of correspondence points, a relationship between an orientation of the first feature point(s) and an orientation of the second feature point(s), based on the set of information about the first local feature values, the set of the information about the second local feature values and the information about the correspondence points;

performing clustering on at least one out of the first feature point(s) and the second feature point(s), based on the information about the relative orientations of the correspondence points, and selecting at least one feature point based on an outcome of the clustering; and comparing the first image and the second image with each other, based on the feature point(s) selected, from cluster to cluster, and deciding on possible photographic subject identity.

The disclosures of the above cited Patent Literatures are to be incorporated herein by reference. It should be noted that the exemplary embodiments and Examples may be modified or adjusted within the concept of the total disclosures of the present invention, inclusive of claims, based on the fundamental technical concept of the invention. A diversity of combinations or selections of elements herein disclosed, including elements of claims, Examples or exemplary embodiments and drawings, may be made within the context of the total disclosures of the present invention. It should be understood that the present invention may include a wide variety of changes or corrections that may occur to those skilled in the art in accordance with the total disclosures inclusive of the claims as well as the technical concept of the invention. In particular, any optional numerical figures or sub-ranges contained in the ranges of numerical values set out herein ought to be construed to be specifically stated even in the absence of explicit statements.

10, 20, 40, 60, 80, 100, 120, 140, 160, 180, 200, 220, 240, 260, 280, 300, 320, 340, 360, 380, 400, 420, 440, 460, 480, 500, 520, 540, 560, 580, 600 image processing apparatus
11 first local feature value generation unit
13 correspondence point calculation unit
14 relative correspondence point scale size calculation unit
15 correspondence point selecting unit
16 decision unit
101, 201, 1001, 1401, 2201, 3001, 3401 first local feature value generation units
102, 202, 1002, 1402, 4201 second local feature value generation units
103, 203 correspondence point calculation units
104, 206 decision units
204 relative correspondence point scale size calculation unit
205, 401, 1004, 1201, 1403, 1601, 2202, 2401, 3002, 3201, 3402, 3601,
4203, 4401, 5001, 5201, 5401, 5601 correspondence point selecting units
601 normalized relative correspondence point scale size calculation unit
1003 relative correspondence point orientation calculation unit
4202 relative coordinate value calculation unit
10001, 10002, 10011, 10012 images

What is claimed is:

1. An image processing apparatus, comprising:
a first local feature value generation unit that detects one or more of first feature points from a first image, and calculates, from a region of a preset range encompassing each first feature point detected, a set of information about first local feature values corresponding to each first feature point;
a correspondence point calculation unit that calculates, as information about correspondence point(s), a correspondence relation between the first feature point(s) and a second feature point(s) contained in a set of information about second local feature values calculated from a second image;
a relative correspondence point scale size calculation unit that calculates, as information about relative scale sizes of correspondence points, a relationship between a scale(s) of the first feature point(s) and a scale(s) of the second feature point(s), based on the set of the information about the first local feature values, the set of the information about the second local feature values and the information about correspondence points;
a correspondence point selecting unit that, based on the information about the relative scale sizes of the correspondence points, performs clustering on at least one out of the first feature point(s) and the second feature point, and selects at least one feature point based on an outcome of the clustering; and
a decision unit that, based on the feature point(s) selected by the correspondence point selecting unit, compares the first image and the second image with each other, from cluster to cluster, and decides on possible photographic subject identity.

2. An image processing apparatus, comprising:
a first local feature value generation unit that detects one or more of first feature points from a first image, and calculates, from a region of a preset range encompassing each first feature point detected, a set of information about first local feature values corresponding to each first feature point;
a correspondence point calculation unit that calculates, as information about correspondence point(s), a correspondence relation between the first feature point(s) and a second feature point(s) contained in a set of information about second local feature values calculated from a second image;
a relative correspondence point orientation calculation unit that calculates, as information about relative orientations of the correspondence points, a relationship between an orientation of the first feature point(s) and an orientation of the second feature point(s), based on the set of the information about the first local feature values, the set of information about the second local feature values and the information about correspondence points;
a correspondence point selecting unit that, based on the information about relative orientations of the correspondence points, performs clustering on at least one out of the first feature point(s) and the second feature point(s), and selects at least one feature point based on an outcome of the clustering; and
a decision unit that, based on the feature point(s) selected by the correspondence point selecting unit, compares the first image and the second image with each other, from cluster to cluster, and decides on possible photographic subject identity.

3. The image processing apparatus according to claim 1, wherein,
the relative correspondence point scale size calculation unit normalizes the information about the relative scale sizes of the correspondence points.

4. The image processing apparatus according to claim 1, wherein,
the correspondence point selecting unit performs clustering on the first feature point(s) based on the relative correspondence point information and on coordinate values of the first feature point(s).

5. The image processing apparatus according to claim 1, wherein,
the correspondence point selecting unit generates selecting information that correlates the information about the correspondence points of the feature points selected and one or more of cluster information with each other.

6. The image processing apparatus according to claim 1, further comprising:
a relative coordinate value calculation unit that selects a reference point from the second image, and calculates relationship between the first feature point(s) and the reference point(s), as relative coordinate information, based on the first feature point(s), second feature point(s) and the relative correspondence point information.

7. The image processing apparatus according to claim 1, wherein,
the correspondence point selecting unit performs clustering on at least one out of the first feature point(s) and the second feature point(s), based on the relative correspondence point information and a preset range of the relative correspondence point information.

8. A method for identifying a photographic subject, comprising:
detecting one or more of first local feature points from a first image, calculating, from a region of a preset range encompassing each first feature point detected, a set of information about first local feature values corresponding to each first feature point;
calculating, as information about correspondence points, a correspondence relation between the first feature point(s) and a second feature point(s) contained in a set of information about second local feature values calculated from a second image;

calculating, as information about relative scale sizes of correspondence points, a relationship between a scale of the first feature point(s) and a scale of the second feature point(s), based on the set of the information about first local feature values, the set of information about second local feature values and the information about correspondence points;

performing clustering on at least one out of the first feature point(s) and the second feature point(s), based on the information about the relative scale sizes of the correspondence points, and selecting at least one feature point based on an outcome of the clustering; and comparing the first image and the second image with each other, based on the feature point(s) selected, from cluster to cluster, and deciding on possible photographic subject identity.

9. A method for identifying a photographic subject, comprising:

detecting one or more of first local feature points from a first image, calculating, from a region of a preset range encompassing each first feature point detected, a set of information about first local feature values corresponding to each first feature point;

calculating, as information about correspondence point(s), a correspondence relation between the first feature point(s) and a second feature point(s) contained in a set of information about second local feature values calculated from a second image;

calculating, as information about relative orientations of correspondence points, a relationship between an orientation of the first feature point(s) and an orientation of the second feature point(s), based on the set of information about the first local feature values, the set of information about the second local feature values and the information about the correspondence points;

performing clustering on at least one out of the first feature point(s) and the second feature point(s), based on the information about the relative orientations of the correspondence points, and selecting at least one feature point based on an outcome of the clustering; and comparing the first image and the second image with each other, based on the feature point(s) selected, from cluster to cluster, and deciding on possible photographic subject identity.

10. A non-transitory computer readable storage medium storing a program that causes a computer controlling an image processing apparatus to perform the processing of:

detecting one or more of first feature points from a first image to calculate, from a region of a preset range encompassing each first feature point detected, a set of information about first local feature values corresponding to each first feature point;

calculating, as information about correspondence points, a correspondence relation between the first feature point(s) and a second feature point(s) contained in a set of information about second local feature values calculated from a second image;

calculating, as information about the relative scale sizes of the correspondence points, a relationship between a scale of the first feature point(s) and a scale of the second feature point(s), based on the set of information about the first local feature values, the set of the information about the second local feature values and the information about correspondence points;

performing clustering on at least one out of the first feature point(s) and the second feature point(s), based on the information about the relative scale sizes of the correspondence points, and selecting at least one feature point based on an outcome of the clustering; and comparing the first image and the second image with each other, based on the feature point(s) selected, from cluster to cluster, deciding on possible photographic subject identity.

* * * * *